US009459434B2

(12) United States Patent
Ohashi

(10) Patent No.: US 9,459,434 B2
(45) Date of Patent: Oct. 4, 2016

(54) ZOOM LENS AND IMAGING APPARATUS

(71) Applicant: Kazuyasu Ohashi, Chiba (JP)

(72) Inventor: Kazuyasu Ohashi, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 43 days.

(21) Appl. No.: 14/468,807

(22) Filed: Aug. 26, 2014

(65) Prior Publication Data

US 2015/0062718 A1 Mar. 5, 2015

(30) Foreign Application Priority Data

Aug. 28, 2013 (JP) .................................. 2013-176342
Aug. 30, 2013 (JP) .................................. 2013-179441

(51) Int. Cl.
*G02B 15/14* (2006.01)
*G02B 15/173* (2006.01)
*G02B 27/00* (2006.01)
*G02B 27/42* (2006.01)

(52) U.S. Cl.
CPC ......... *G02B 15/173* (2013.01); *G02B 27/0062* (2013.01); *G02B 27/4211* (2013.01)

(58) Field of Classification Search
CPC ....... G02B 15/14; G02B 15/16; G02B 15/20
USPC ....... 359/688, 681, 682, 686, 676, 747, 745, 359/746
See application file for complete search history.

(56) References Cited

U.S. PATENT DOCUMENTS

| | | | |
|---|---|---|---|
| 5,153,779 A | 10/1992 | Ohashi | |
| 5,398,135 A | 3/1995 | Ohashi | |
| 5,499,141 A * | 3/1996 | Ohtake | ................. G02B 15/17 359/676 |
| 5,576,891 A | 11/1996 | Ohashi | |
| 5,579,168 A * | 11/1996 | Aoki | .................... G02B 15/173 359/653 |
| 5,581,319 A | 12/1996 | Ohashi | |

(Continued)

FOREIGN PATENT DOCUMENTS

| | | |
|---|---|---|
| JP | 4-95910 A | 3/1992 |
| JP | 10-054937 | 2/1998 |

(Continued)

OTHER PUBLICATIONS

Extended European Search Report issued Jan. 26, 2015 in Patent Application No. 14182518.2.

(Continued)

*Primary Examiner* — James Greece
*Assistant Examiner* — Travis Fissel
(74) *Attorney, Agent, or Firm* — Oblon, McClelland, Maier & Neustadt, L.L.P

(57) ABSTRACT

A zoom lens includes a first lens group with a diffraction optical element and having positive refractive power, a second lens group having negative refractive power, a third lens group having negative refractive power, and a fourth lens group having positive refractive power, which are sequentially arranged from an object side to an image side. The second lens group and the third lens group are moved in accordance with zooming between a wide angle end and a telephoto end such that the second lens group is positioned to the object-most side at the wide angle end, and the third lens group is positioned to the image-most side at the telephoto end. At least one of the second lens group and the third lens group includes a negative lens satisfying the conditional expressions: $1.50 < nd < 1.75$; $60.0 < vd < 75.0$; and $\theta_{C,A} - 0.0015 \times vd < 0.2550$.

20 Claims, 33 Drawing Sheets

(56) References Cited

U.S. PATENT DOCUMENTS

| | | | |
|---|---|---|---|
| 5,617,254 A | 4/1997 | Ohashi | |
| 5,630,188 A | 5/1997 | Ohashi | |
| 5,687,401 A | 11/1997 | Kawamura et al. | |
| 5,815,322 A | 9/1998 | Enomoto et al. | |
| 5,930,056 A | 7/1999 | Ohashi | |
| 6,353,506 B1 | 3/2002 | Ohashi | |
| 8,238,044 B2* | 8/2012 | Wada | G02B 13/18 359/683 |
| 8,743,469 B2* | 6/2014 | Nakamura | G02B 15/173 359/676 |
| 8,941,926 B2* | 1/2015 | Mihara | G02B 15/14 359/683 |
| 2002/0024745 A1 | 2/2002 | Ohashi | |
| 2002/0060855 A1 | 5/2002 | Ohashi | |
| 2002/0101665 A1 | 8/2002 | Ohashi et al. | |
| 2003/0210473 A1 | 11/2003 | Ohashi | |
| 2004/0004772 A1 | 1/2004 | Ohashi et al. | |
| 2004/0008420 A1 | 1/2004 | Ohashi | |
| 2004/0136088 A1 | 7/2004 | Ohashi | |
| 2005/0036208 A1 | 2/2005 | Ohashi | |
| 2005/0094002 A1 | 5/2005 | Ohashi | |
| 2005/0094285 A1 | 5/2005 | Ohashi | |
| 2005/0122596 A1 | 6/2005 | Ohashi | |
| 2005/0190457 A1 | 9/2005 | Ohashi | |
| 2005/0270663 A1 | 12/2005 | Ohashi | |
| 2006/0193062 A1 | 8/2006 | Ohashi | |
| 2006/0262422 A1 | 11/2006 | Ohashi | |
| 2007/0097517 A1 | 5/2007 | Ohashi | |
| 2007/0297068 A1 | 12/2007 | Ohashi | |
| 2008/0106799 A1 | 5/2008 | Ohashi | |
| 2008/0151385 A1 | 6/2008 | Ohashi | |
| 2008/0198477 A1 | 8/2008 | Ohashi | |
| 2008/0204894 A1 | 8/2008 | Ohashi | |
| 2009/0080088 A1 | 3/2009 | Ohashi | |
| 2009/0091841 A1 | 4/2009 | Ohashi | |
| 2010/0007967 A1 | 1/2010 | Ohashi | |
| 2010/0027136 A1 | 2/2010 | Ohashi et al. | |
| 2010/0271710 A1 | 10/2010 | Ohashi | |
| 2011/0310496 A1 | 12/2011 | Kubota et al. | |
| 2011/0317285 A1 | 12/2011 | Ohashi et al. | |
| 2012/0026604 A1* | 2/2012 | Aoi | G02B 15/173 359/687 |
| 2012/0162482 A1* | 6/2012 | Yoshinaga | G02B 13/18 348/240.1 |
| 2012/0212838 A1 | 8/2012 | Ohashi | |
| 2013/0194488 A1 | 8/2013 | Kubota et al. | |
| 2013/0194681 A1 | 8/2013 | Ohashi et al. | |
| 2013/0265649 A1 | 10/2013 | Ohashi | |
| 2013/0321936 A1 | 12/2013 | Ohashi | |
| 2014/0016214 A1 | 1/2014 | Kubota et al. | |
| 2014/0078605 A1 | 3/2014 | Ohashi | |
| 2014/0126072 A1 | 5/2014 | Ohashi et al. | |
| 2014/0139932 A1 | 5/2014 | Ohashi | |

FOREIGN PATENT DOCUMENTS

| | | |
|---|---|---|
| JP | 2000-221402 A | 8/2000 |
| JP | 2004-309704 A | 11/2004 |
| JP | 2006-084971 | 3/2006 |
| JP | 2008-197534 | 8/2008 |
| JP | 2008-241884 | 10/2008 |
| JP | 2012-185272 | 9/2012 |
| JP | 2013-024936 | 2/2013 |

OTHER PUBLICATIONS

"Abbe Diagram" In: "Schott Optical Glass Description of Properties", XP055160667, Jan. 1, 2011, p. 111 and cover page.

"Schott Optical Glass Data Sheets", XP055160675, Apr. 25, 2013, 5 pages, Retrieved from the Internet: URL:http://www.schott.com/advanced_optics/us/abbe_datasheets/schott_datasheet_all_us.pdf.

* cited by examiner

ZOOM LENS AND IMAGING APPARATUS

CROSS-REFERENCE TO RELATED APPLICATIONS

This patent application is based on and claims priority pursuant to 35 U.S.C. §119 to Japanese Patent Application Nos. 2013-176342, filed on Aug. 28, 2013, and 2013-179441, filed on Aug. 30, 2013, in the Japan Patent Office, the entire disclosure of which is hereby incorporated by reference herein.

BACKGROUND

1. Technical Field

The present invention relates to a lens having a zooming function, and an imaging apparatus using such a zoom lens as an imaging optical system.

2. Description of the Related Art

For video cameras and TV cameras, there are requests over various fields from users. Among them, high image quality and a small size/light weight have been constantly requested from users and occupy large weights of the requests from the users. Accordingly, implementation of both high performance and a small size/light weight is requested also for zoom lenses that are used as imaging optical systems of such cameras.

Particularly, in video cameras for monitoring, such as in monitoring cameras, there are cases where imaging requiring sensitivity of up to a near-infrared region having a wavelength of about 900 nm or less is performed. For example, an operation is performed such that a precise color image is acquired using only visible light by cutting off near-infrared light at day time when the amount of light is sufficient, the amount of light is earned by allowing all the light of the visible region to the near-infrared region to be transmitted at the time of bad weather, at dusk, or at dawn when the amount of light tends to decrease, and infrared light having a wavelength of about 850 nm is transmitted for illumination by cutting off visible light at night time.

Accordingly, for imaging lenses, such as zoom lenses used as imaging optical systems, the correction of chromatic aberration of not only the visible region but also up to the near-infrared region is required. The reason for this is that, in a case where correction of the chromatic aberration of up to the near-infrared region described above is not performed, focusing needs to be performed again at the time of switching between visible light and near-infrared light, or sufficient resolving power cannot be acquired in a case where all the light of the visible region to the near-infrared region is transmitted so as to be used.

In addition, it is preferable that the zoom ratio should be as high as can be. For a relatively-long distance monitoring use, a relatively-small zoom lens having a zoom ratio of over 25 times and being close to 30 times is supported by the market as one option.

As zoom lenses that are appropriate to such monitoring video cameras, several types may be considered. Among them, a zoom lens that is suitable for a high zoom ratio is formed by sequentially arranging a first lens group having a positive focal length such as positive refractive power, a second lens group having a negative focal length such as negative refractive power, a third lens group having a negative focal length such as negative refractive power, and a fourth lens group having a positive focal length such as positive refractive power from the object side to the image side. There are zoom lenses in which the second lens group and the third lens group are moved in accordance with a zooming operation such that the second lens group is positioned on the most object side at the wide angle end, and the third lens group is positioned on the most image side at the telephoto end when the zooming operation is performed.

In a zoom lens of this type, in order to sufficiently correct the chromatic aberration, generally, a special low-dispersion glass material that is represented by OHARA S-FPL51 or OHARA S-FPL53 (both are glass materials manufactured by Ohara Inc.) is used for the first lens group in which the marginal ray height on the axis increases on the telescopic side and the fourth lens group in which the marginal ray height on the axis increases on the wide angle side. In addition, it has been proposed that a diffraction optical element is disposed in the first lens group, and the chromatic aberration is corrected using negative dispersion of the diffraction optical element.

While various zoom lenses are available, there is no zoom lens in which the above-described needs are sufficiently satisfied at the same time.

SUMMARY

In one aspect of the present invention, the present invention have realized a need for a zoom lens, in which, from the object side to the image side, a first lens group having positive refractive power, a second lens group having negative refractive power, a third lens group having negative refractive power, and a fourth lens group having positive refractive power are arranged, and the second and third lens groups are moved in accordance with a zooming operation, having a zoom ratio of over 25 times, a small number of constituent lenses, the chromatic aberration of the visible region to the near-infrared region being sufficiently corrected, and having resolving power corresponding to an imaging device of two million pixels or more.

According to an embodiment of the present invention, there is provided a zoom lens including, a first lens group provided with a diffraction optical element and having positive refractive power, a second lens group having negative refractive power, a third lens group having negative refractive power, and a fourth lens group having positive refractive power, which are sequentially arranged from an object side to an image side. The second lens group and the third lens group are moved in accordance with zooming between a wide angle end and a telephoto end such that the second lens group is positioned to the object-most side at the wide angle end, and the third lens group is positioned to the image-most side at the telephoto end. At least one of the second lens group and the third lens group includes a negative lens satisfying the following conditional expressions:

$$1.50 < nd < 1.75 \quad [1]$$

$$60.0 < vd < 75.0 \quad [2]$$

$$\theta_{C,A'} - 0.0015 \times vd < 0.2550 \quad [3]$$

in which nd denotes refractive index of a material composing the negative lens, vd denotes the Abbe number of the material composing the negative lens, and $\theta_{C,A'}$ denotes partial dispersion ratio of the material composing the negative lens. The partial dispersion ratio $\theta_{C,A'}$ is represented as $\theta_{C,A'} = (n_C - n_{A'})/(n_F - n_C)$ with the refractive indices of the material composing the negative lens for an F line, a C line, and an A' line being denoted by $n_F$, $n_C$, and $n_{A'}$.

According to another embodiment of the present invention, there is provided a zoom lens including, a first lens group provided with a diffraction optical element and having positive refractive power, a second lens group having negative refractive power, a third lens group having negative refractive power, and a fourth lens group having positive refractive power, which are sequentially arranged from an object side to an image side. The zoom lens further includes an extender lens group causing the focal length of the entire system to transit to the longer side without changing distances between each lens group of the first lens group to the fourth lens group, having an image surface being arranged to be insertable/detachable to/from the image side of the fourth lens group. The second lens group and the third lens group are moved in accordance with zooming between a wide angle end and a telephoto end such that the second lens group is positioned to the object-most side at the wide angle end, and the third lens group is positioned to the image-most side at the telephoto end. At least one of the second lens group and the third lens group includes a negative lens satisfying the following conditional expressions [1], [2], and [3].

$$1.50 < nd < 1.75; \quad [1]$$

$$60.0 < vd < 75.0; \text{ and} \quad [2]$$

$$\theta_{C,A'} - 0.0015 \times vd < 0.2550, \quad [3]$$

in which nd denotes refractive index of a material composing the negative lens, vd denotes the Abbe number of the material composing the negative lens, and $\theta_{C,A'}$ denotes the partial dispersion ratio of the material composing the negative lens, and the partial dispersion ratio $\theta_{C,A'}$ is represented as $\theta_{C,A'} = (n_C - n_{A'})/(n_F - n_C)$ with the refractive indices of the material composing the negative lens for an F line, a C line, and an A' line being denoted by $n_F$, $n_c$, and $n_{A'}$.

BRIEF DESCRIPTION OF THE SEVERAL
VIEWS OF THE DRAWINGS

FIG. 1 is a diagram that schematically illustrates the configuration of an optical system in a no-extender state (a state in which an extender is not inserted) of a zoom lens according to Example 1 that is a first embodiment of the present invention and a zoom locus accompanied with zooming. FIG. 1 illustrates respectively cross-sectional views at a wide angle end (short focus end), an intermediate focal length, and a telephoto end (long focus end) along the optical axis;

Figure 5:
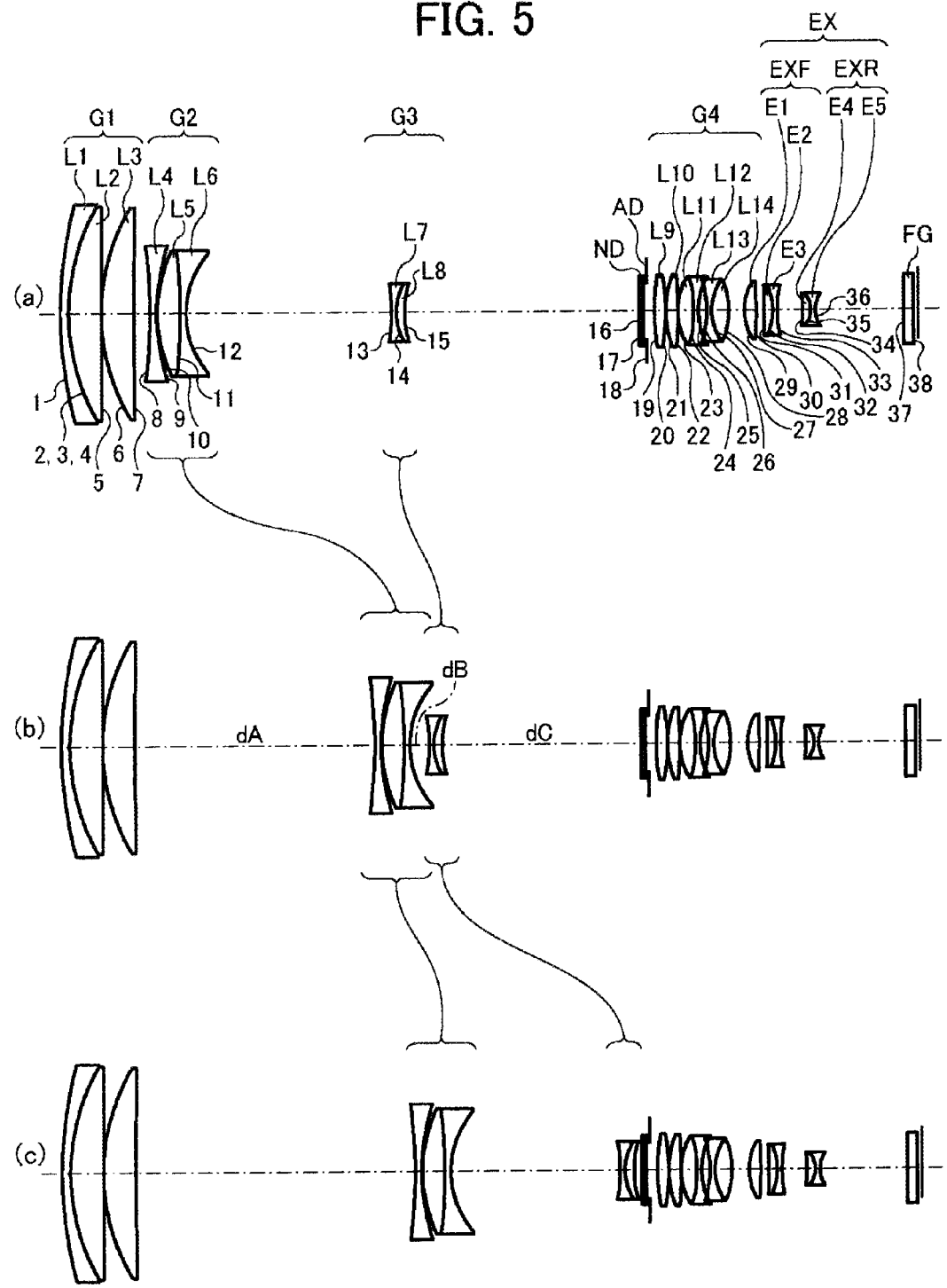
Figure 6:
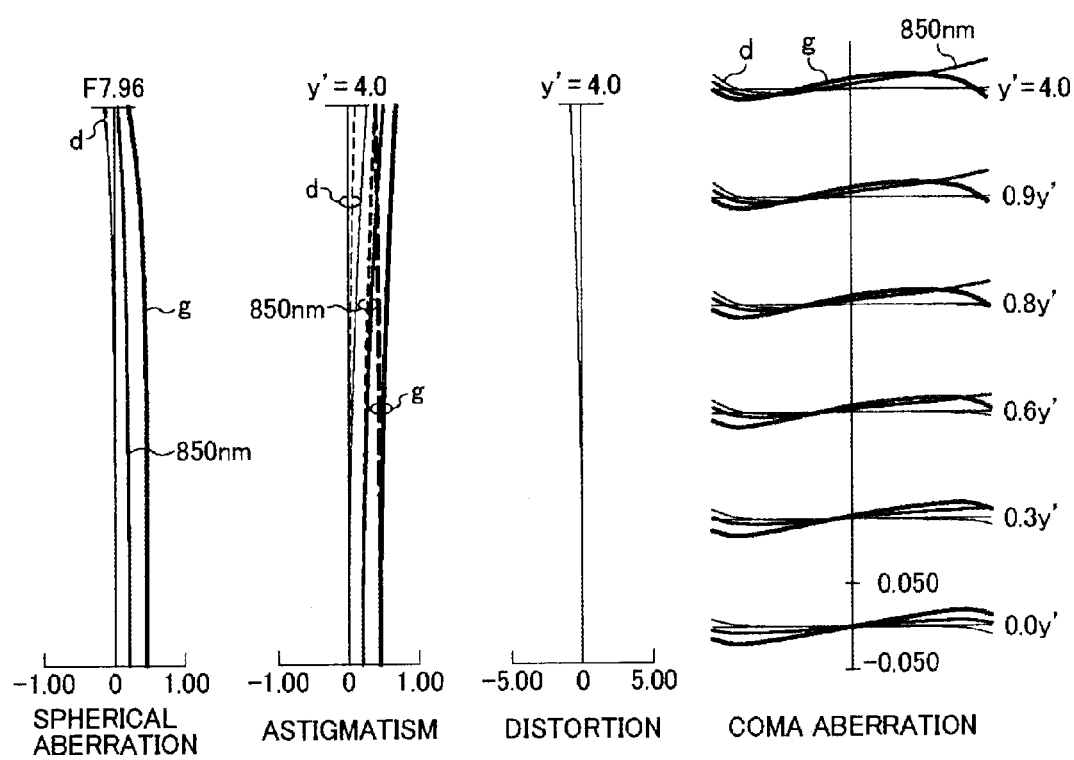
Figure 7:
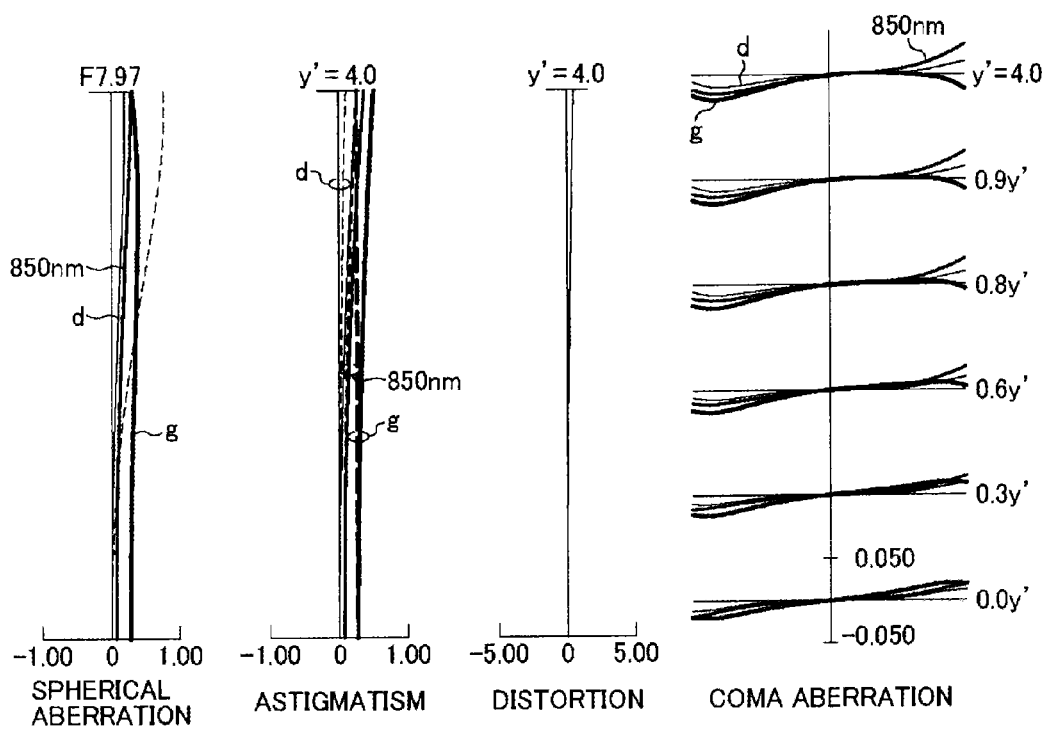
Figure 8:
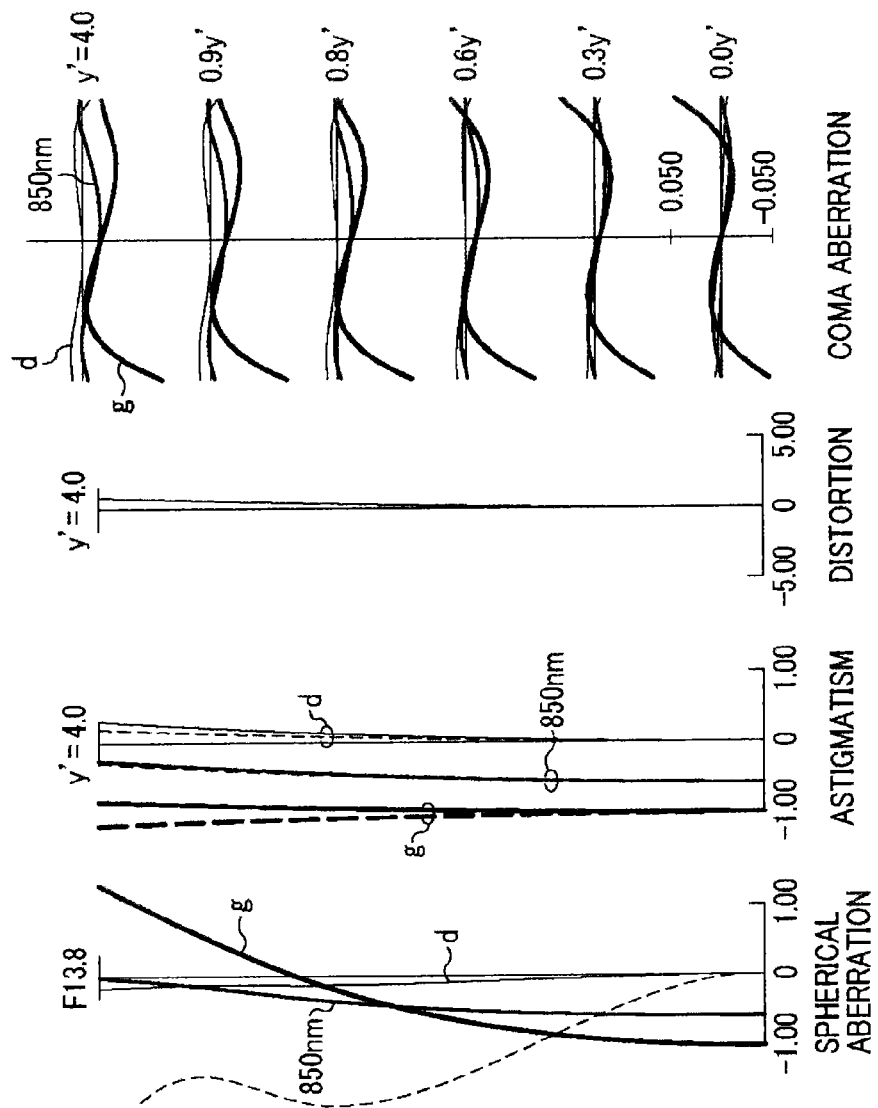
Figure 9:
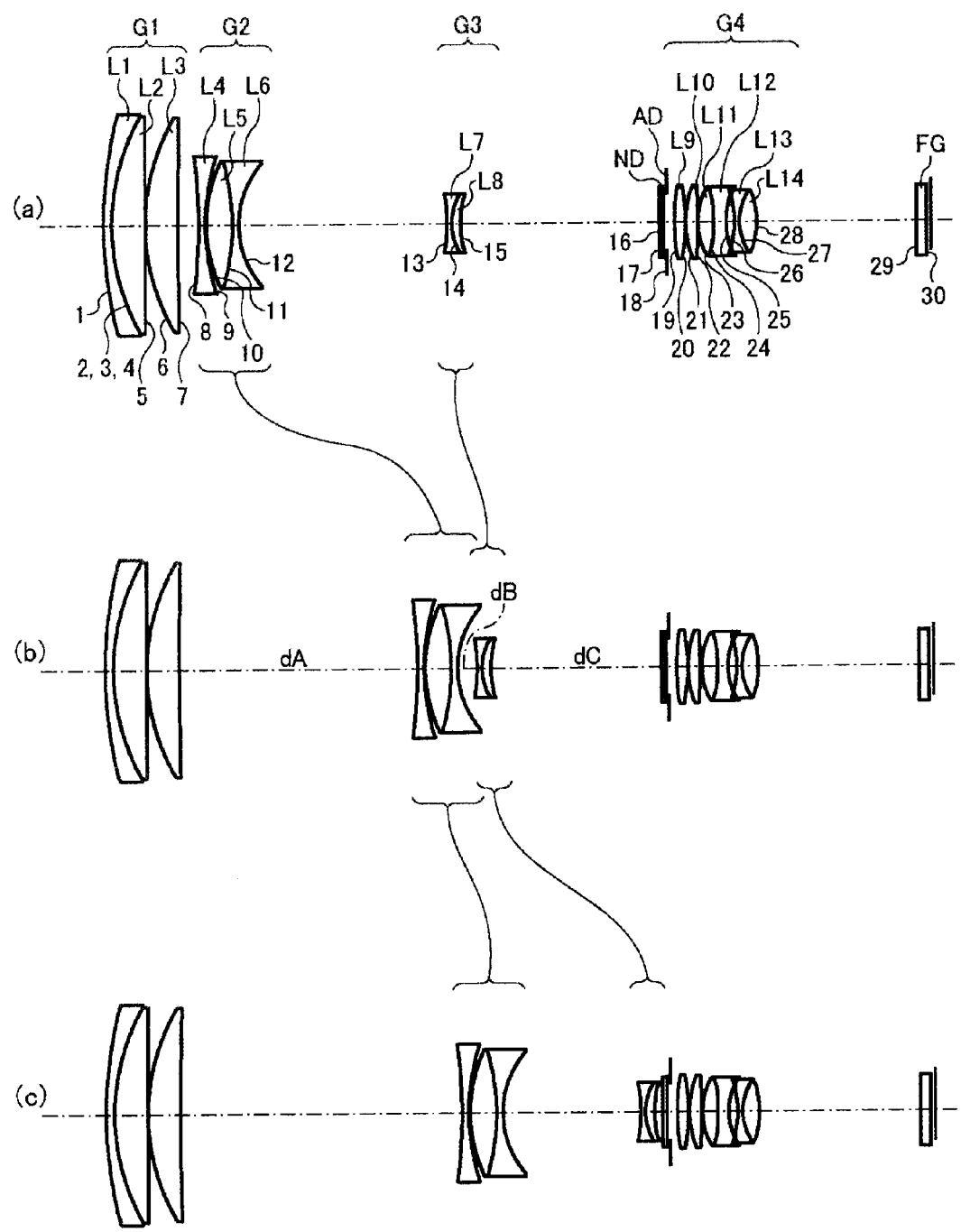
Figure 10:
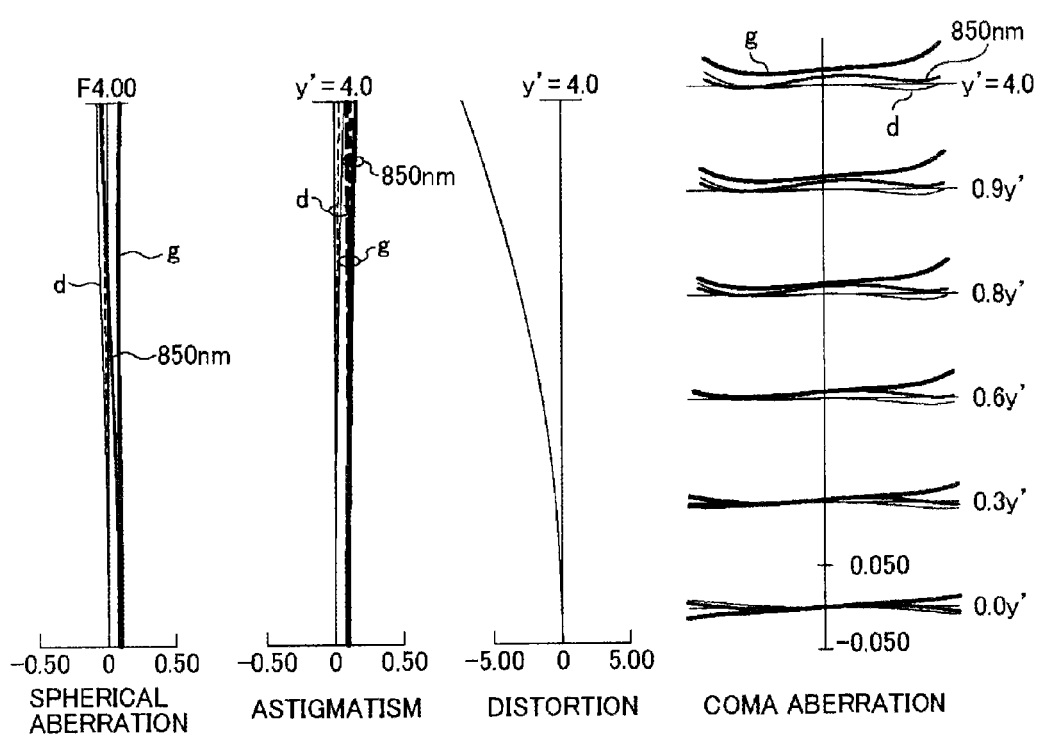
Figure 11:
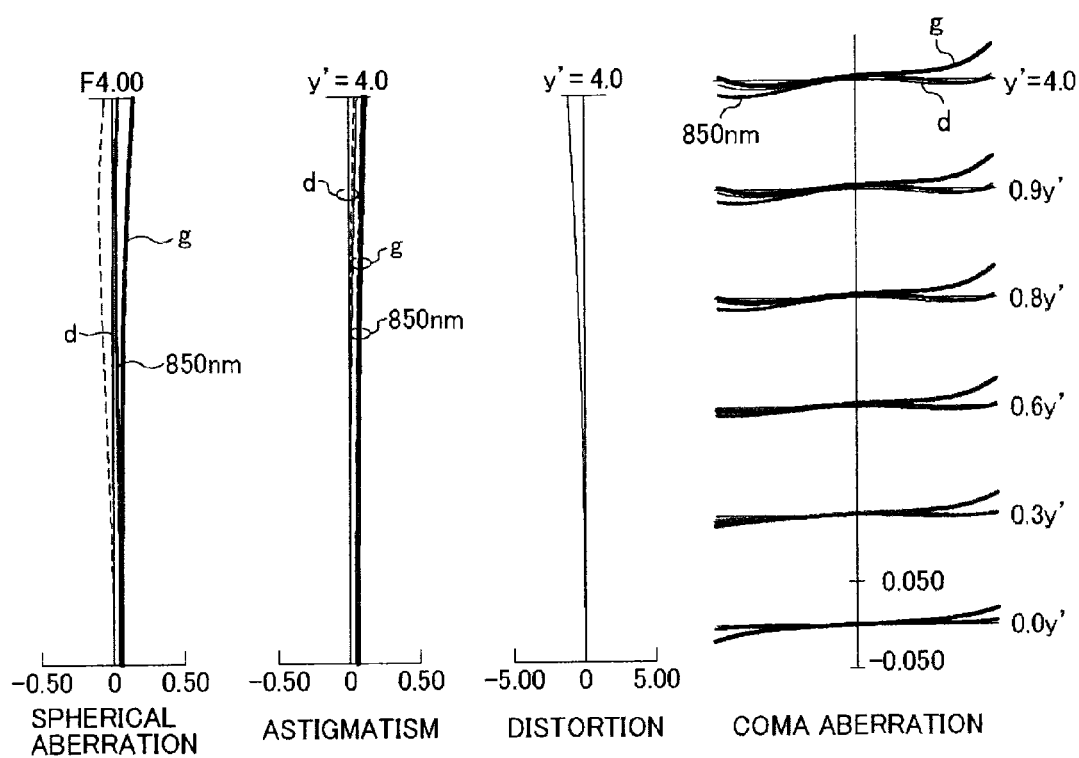
Figure 12:
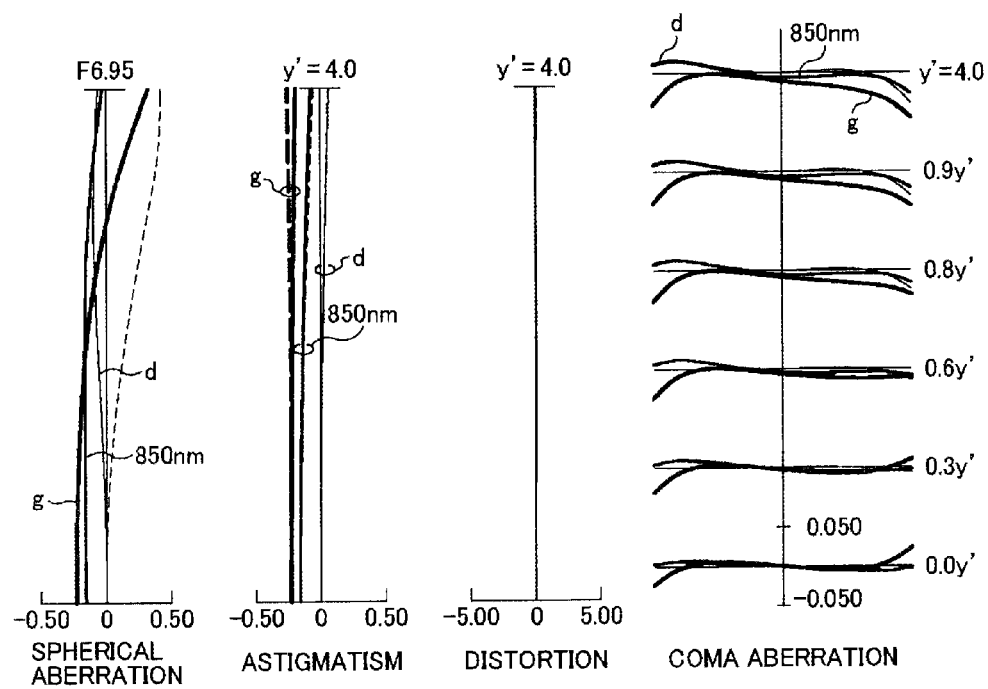
Figure 13:
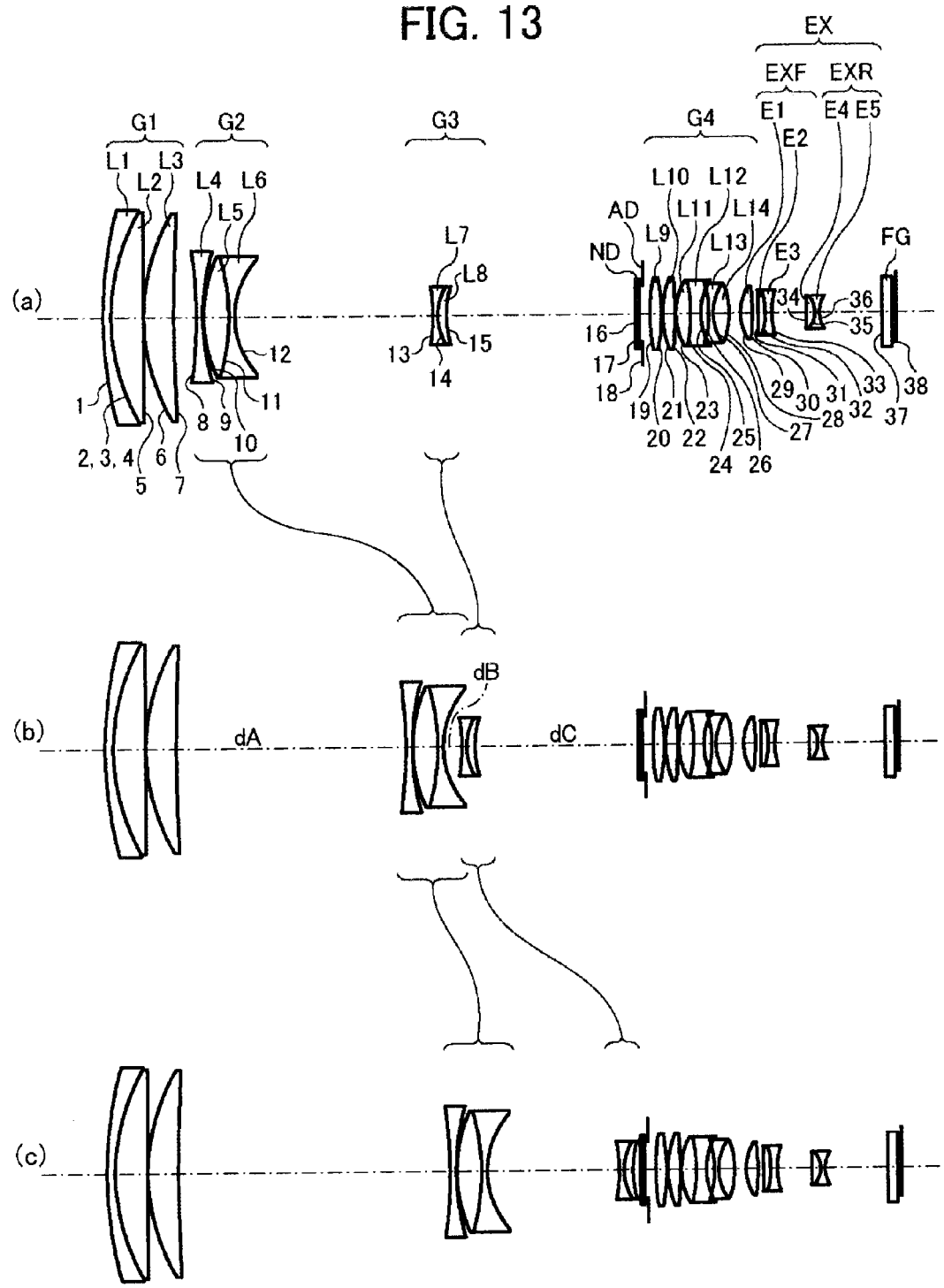
Figure 14:
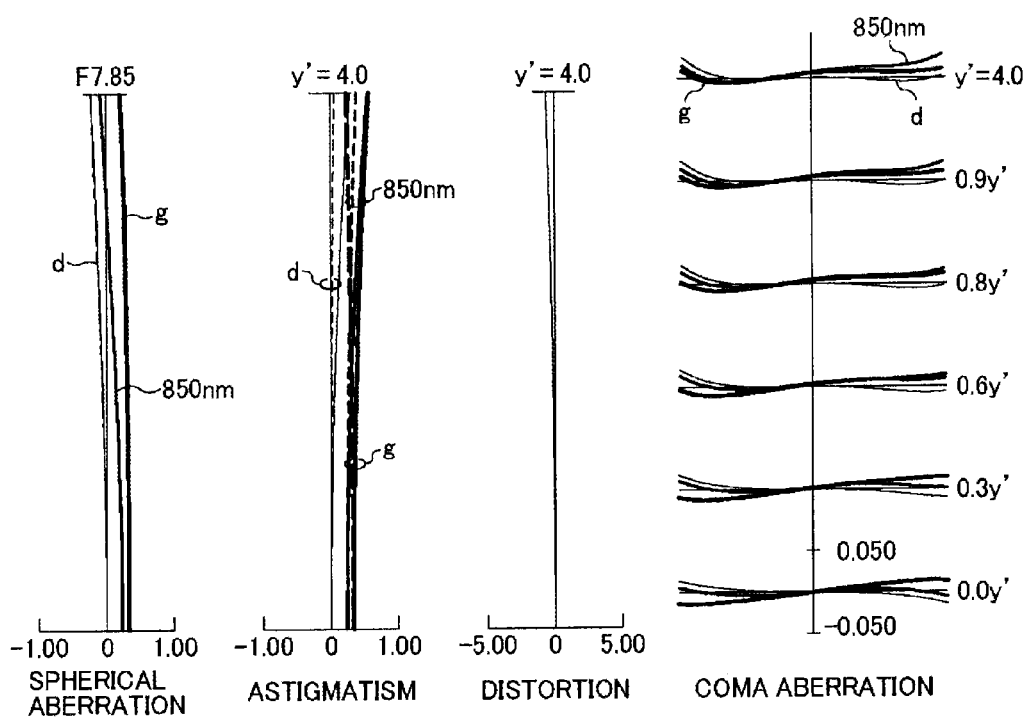
Figure 15:
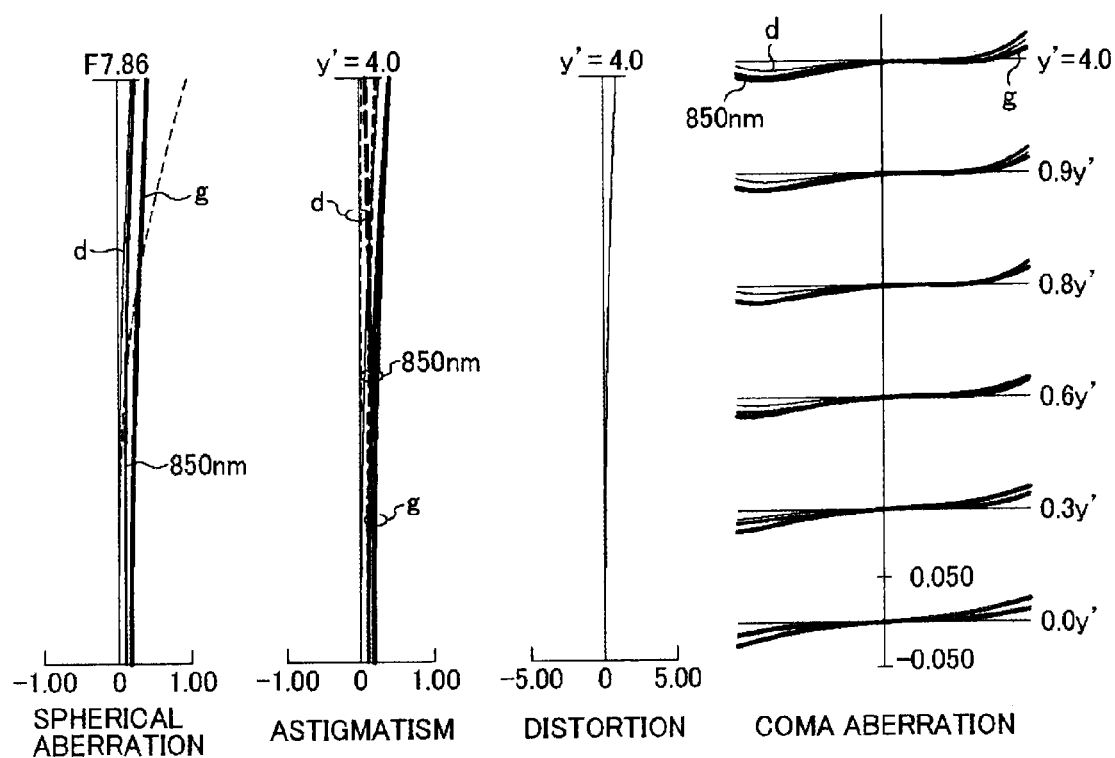
Figure 16:
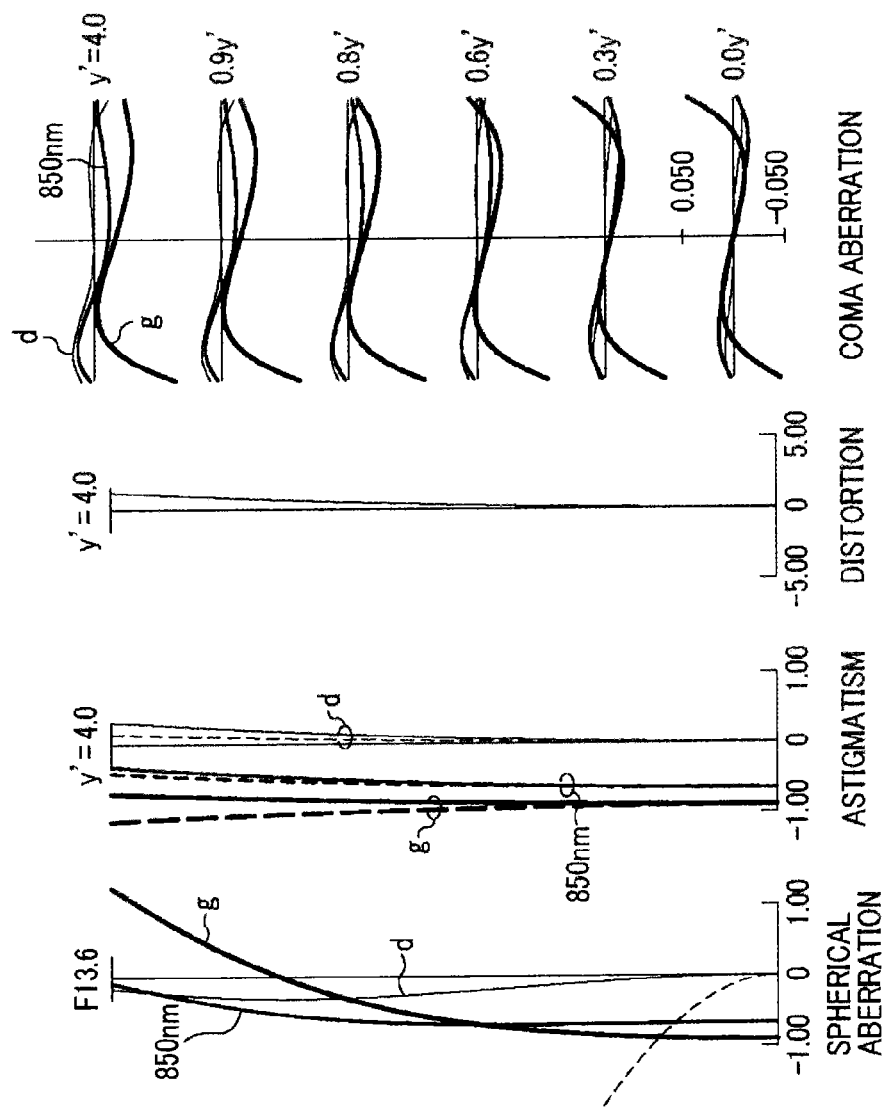
Figure 17:
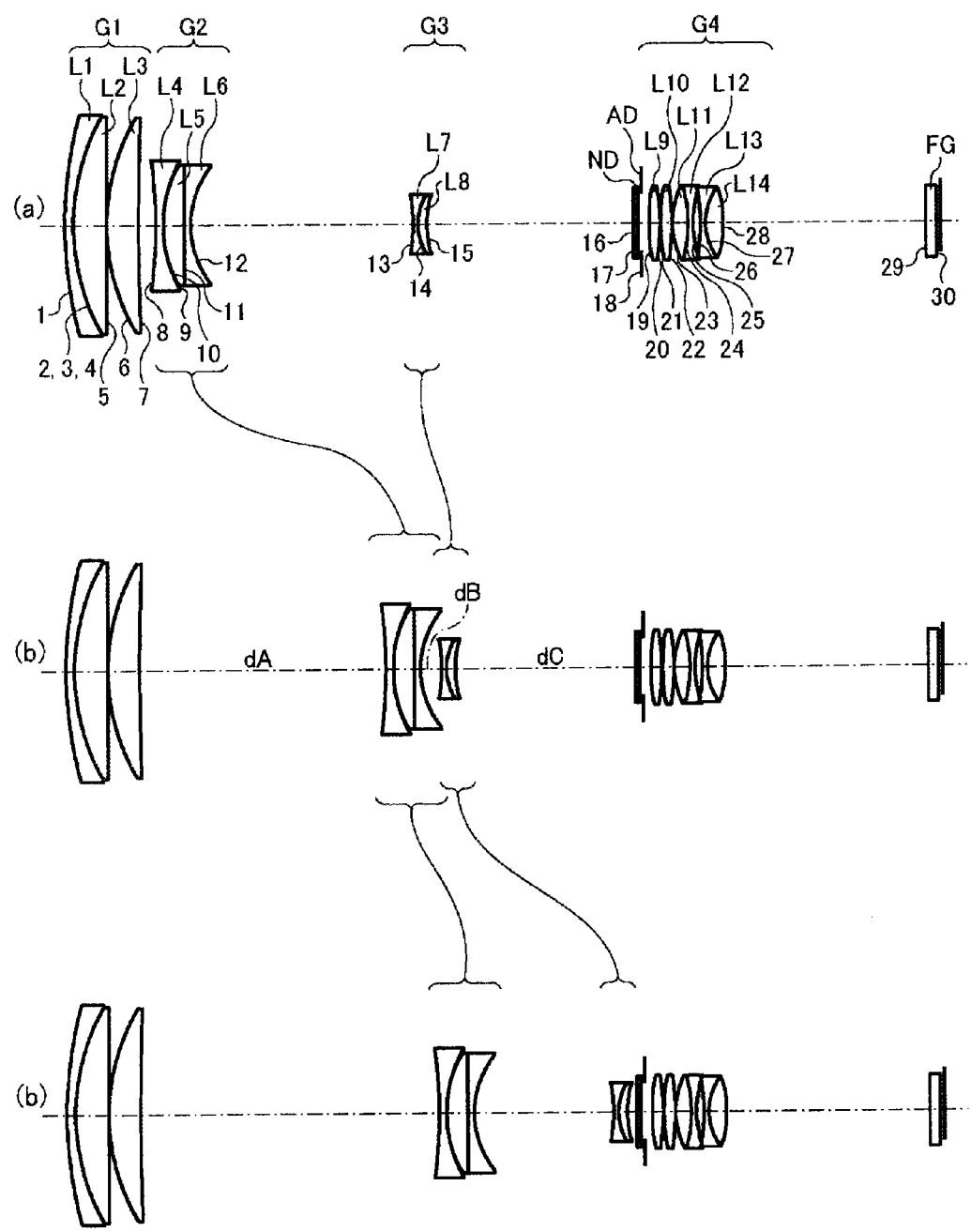
Figure 18:
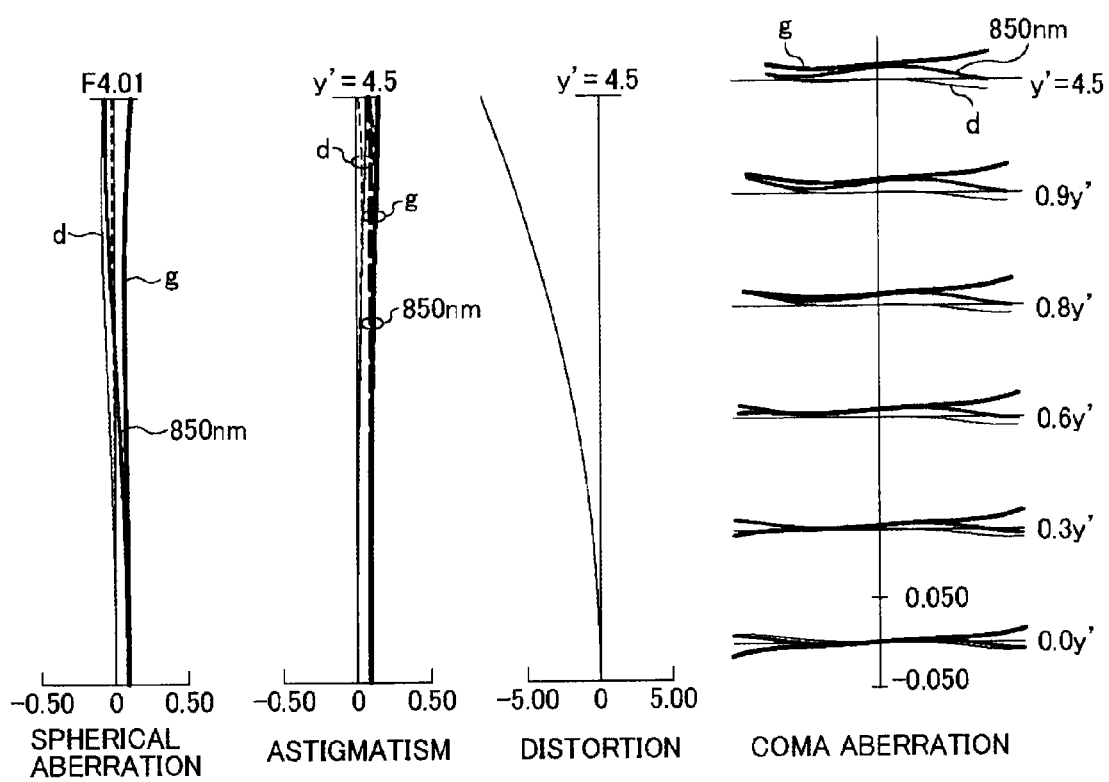
Figure 19:
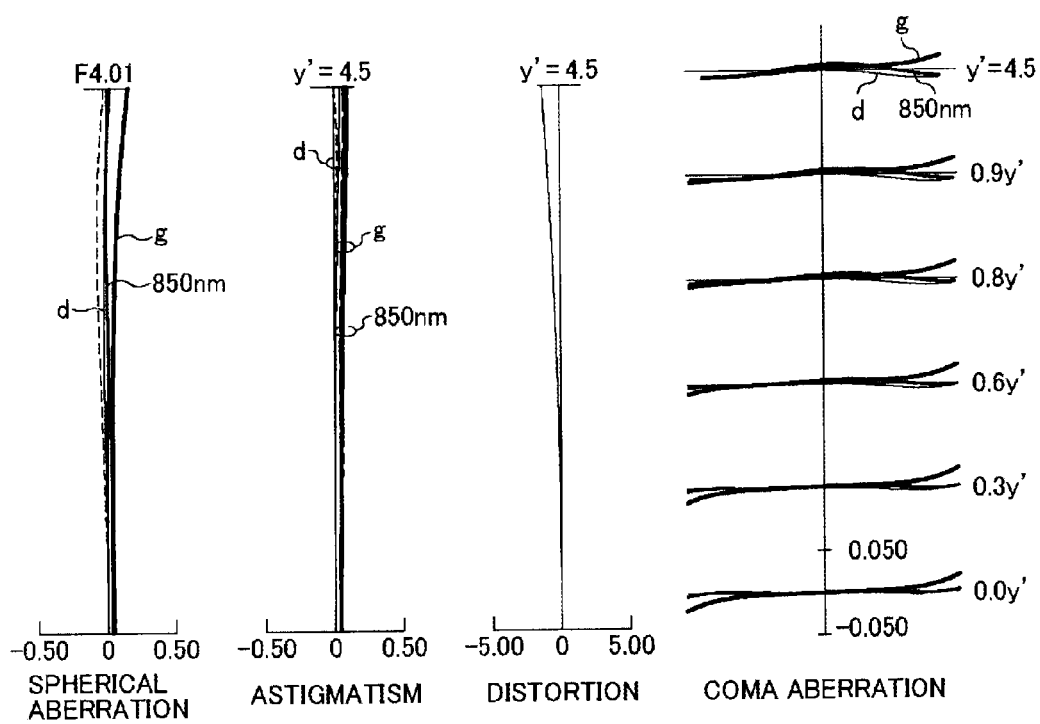
Figure 20:
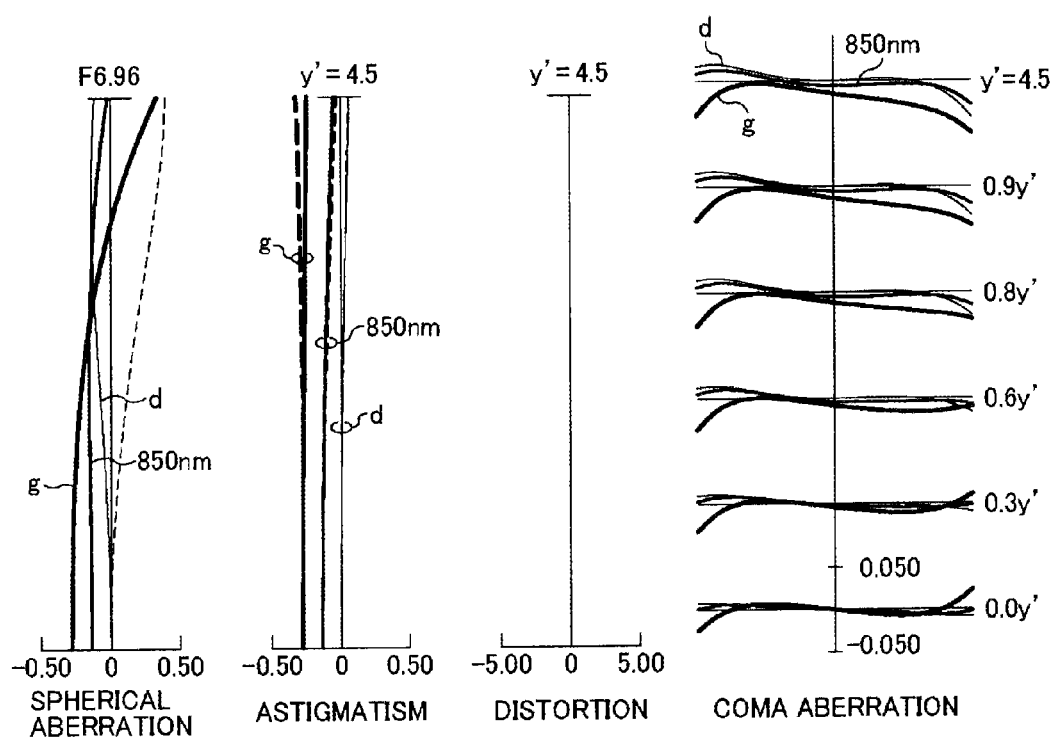
Figure 21:
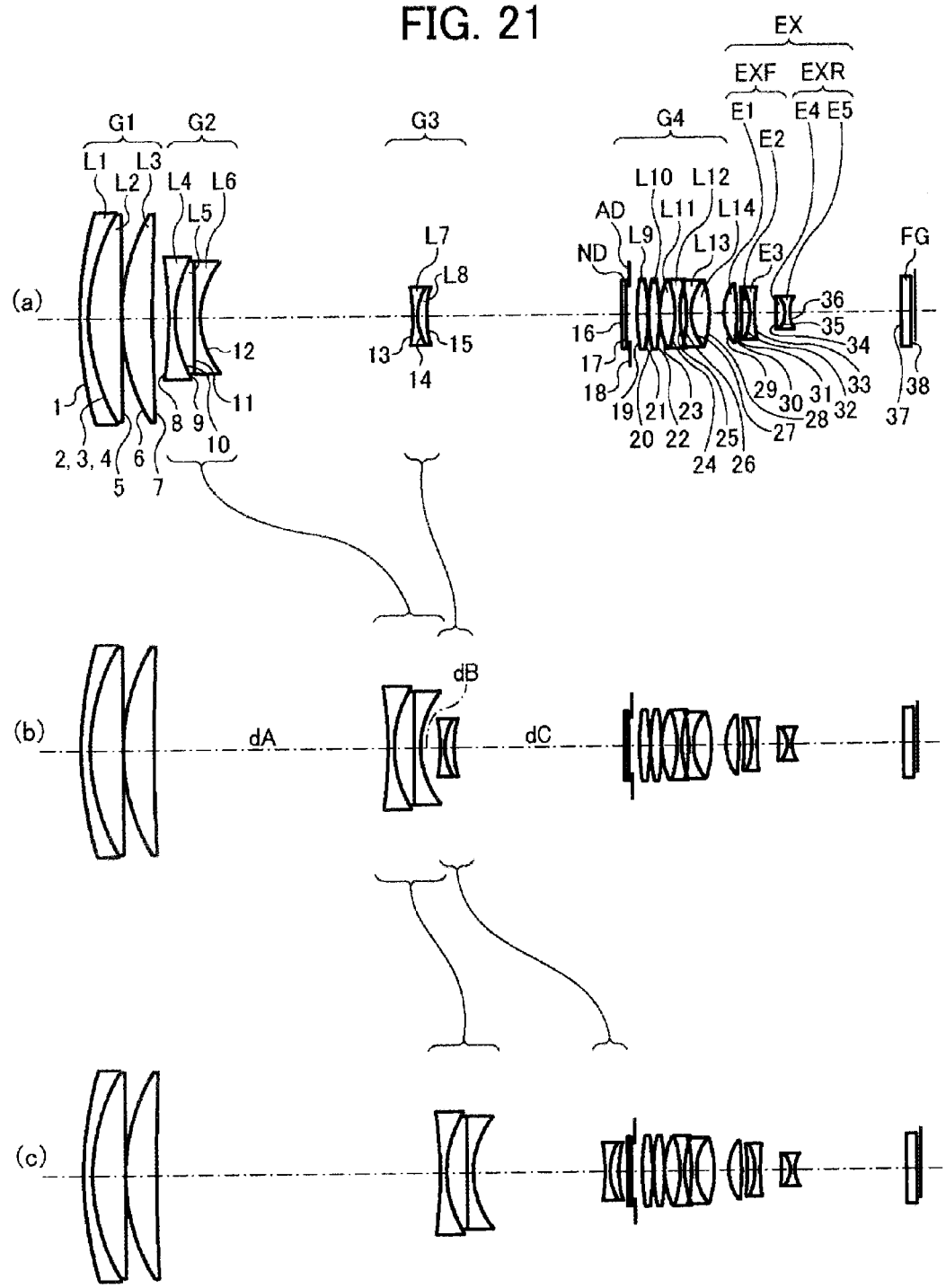
Figure 22:
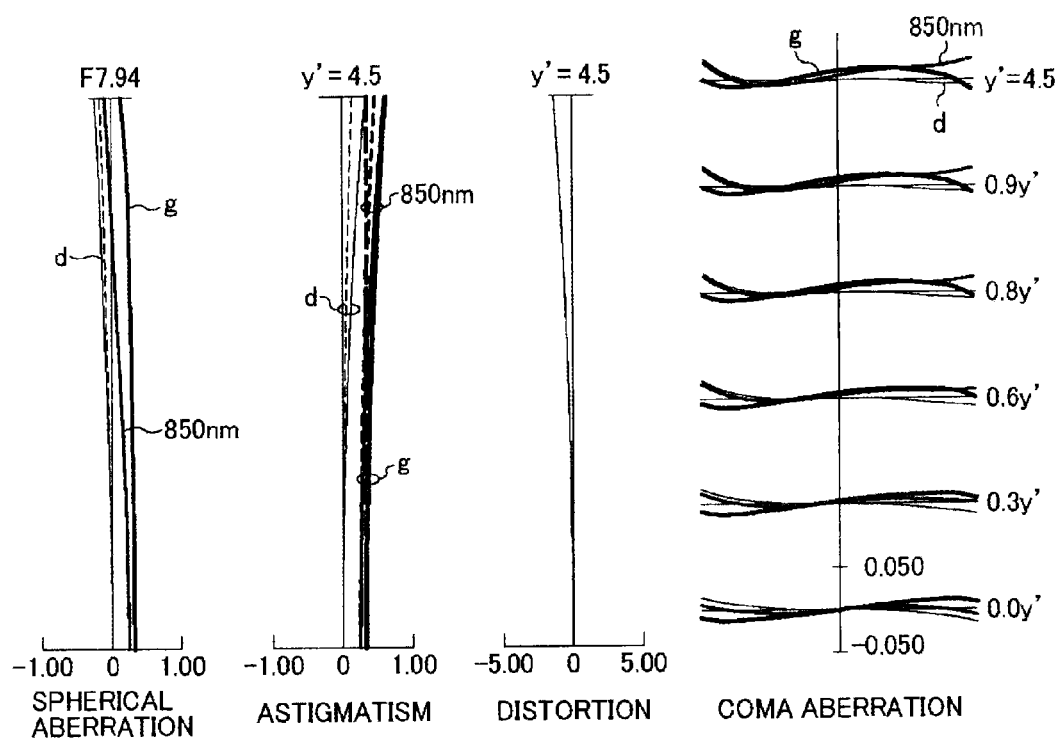
Figure 23:
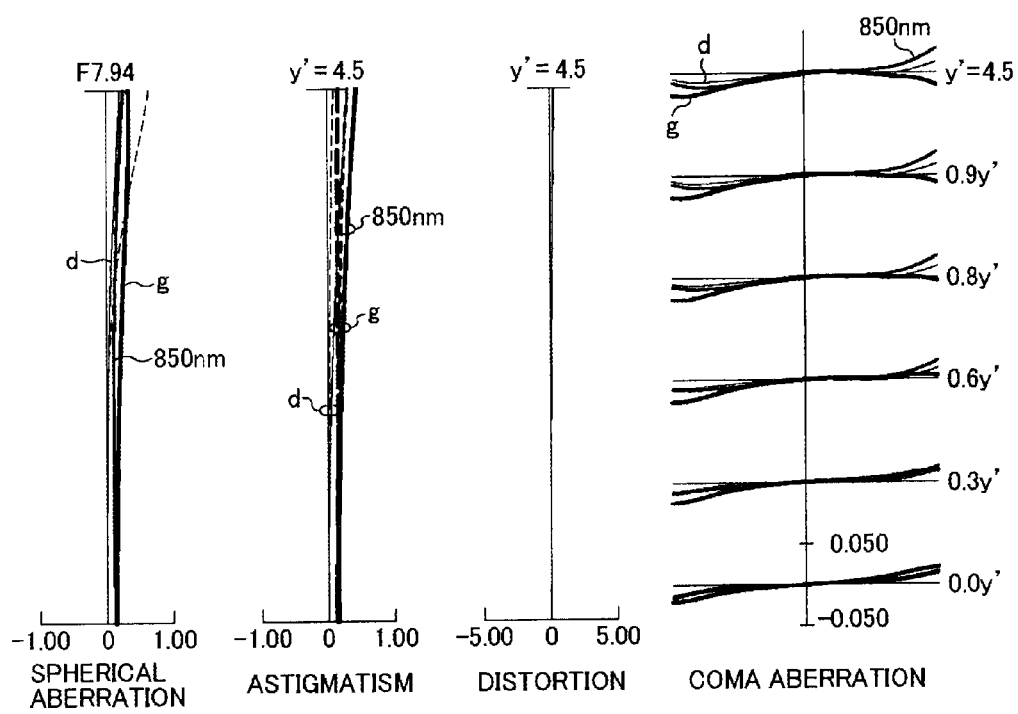
Figure 24:
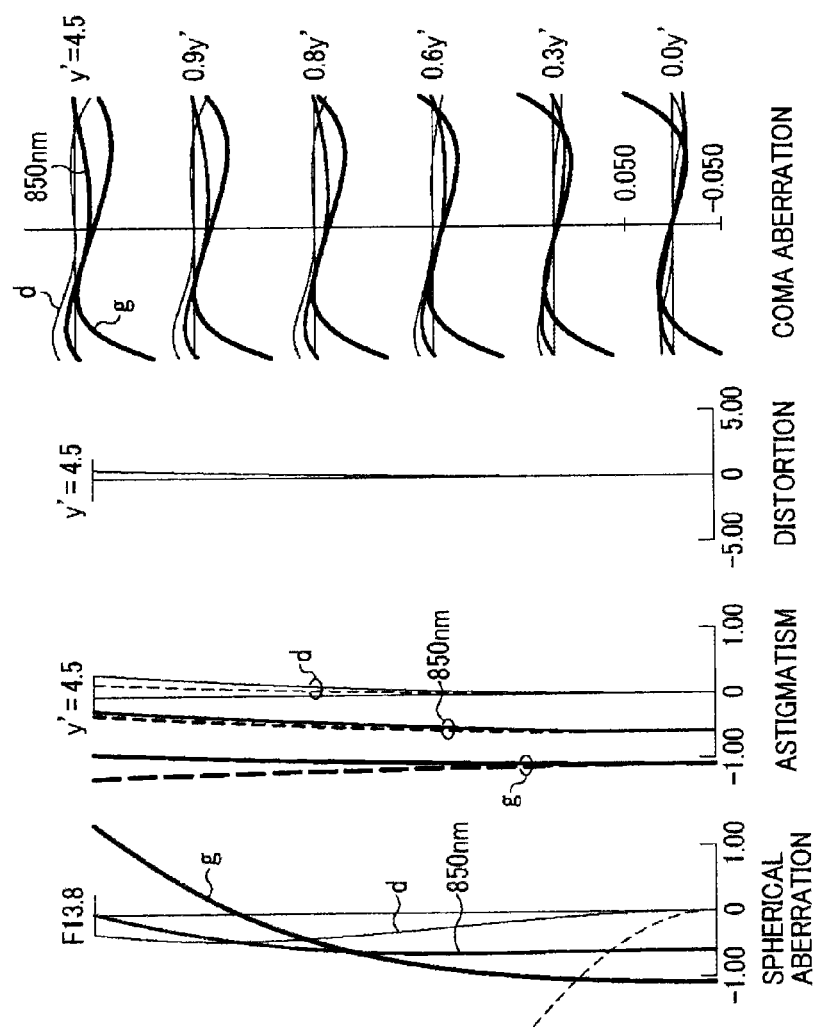
Figure 25:
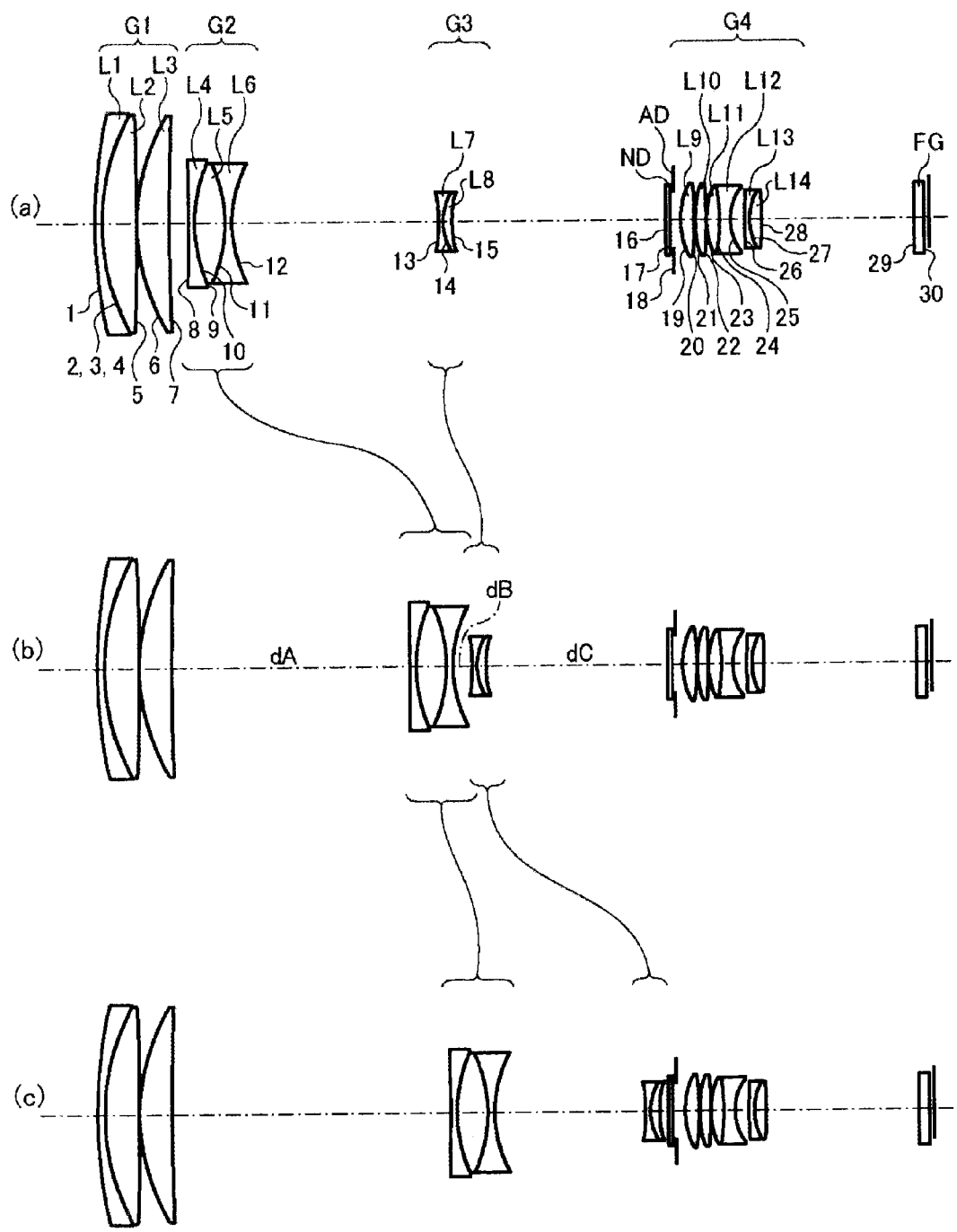
Figure 26:
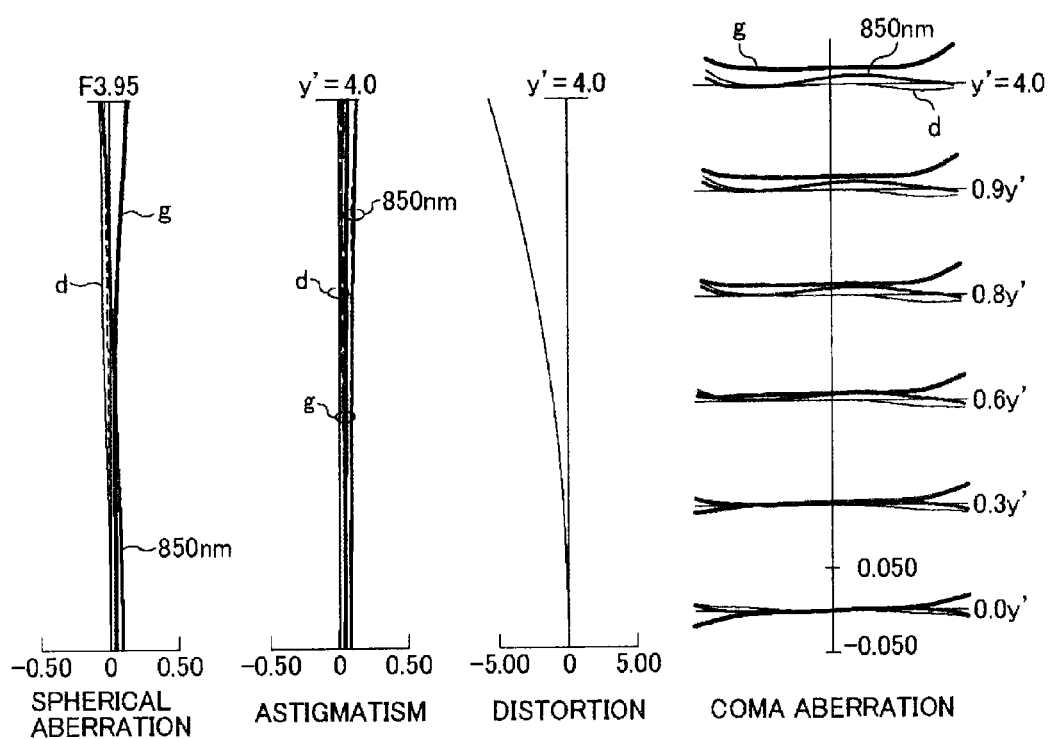
Figure 27:
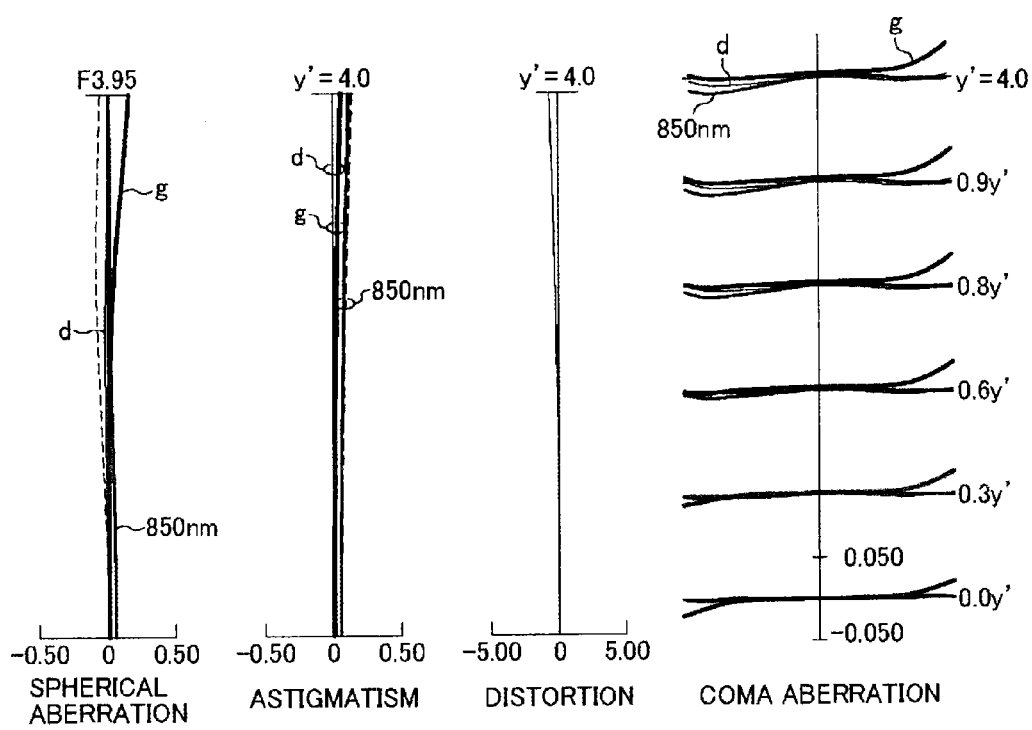
Figure 28:
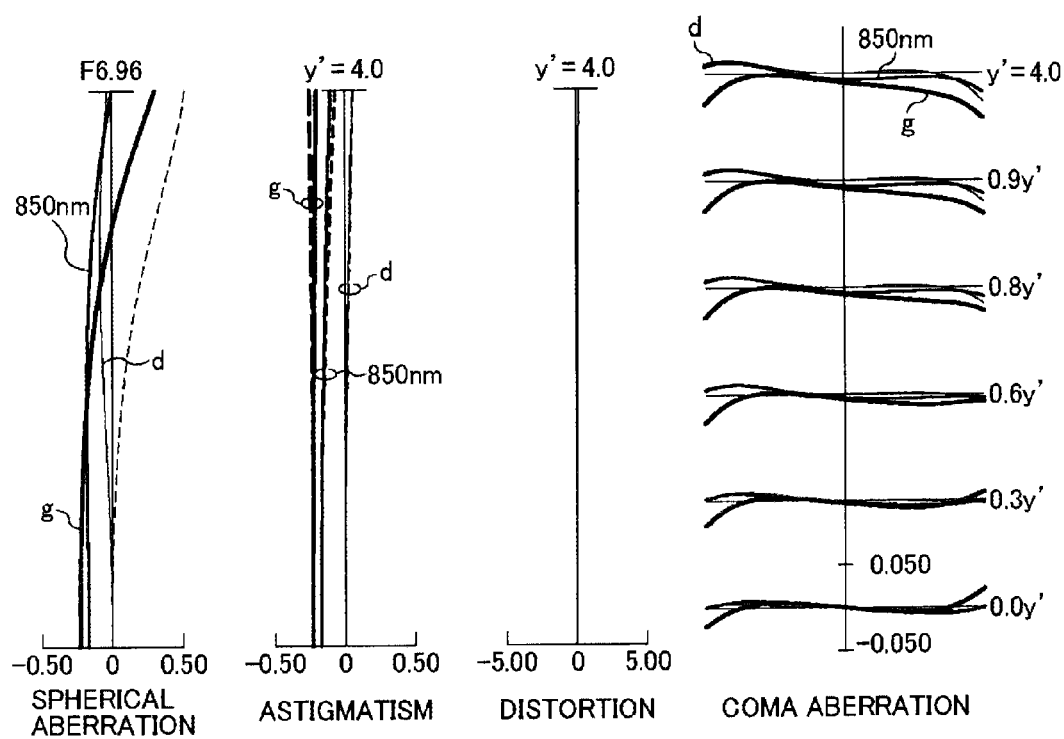
Figure 29:
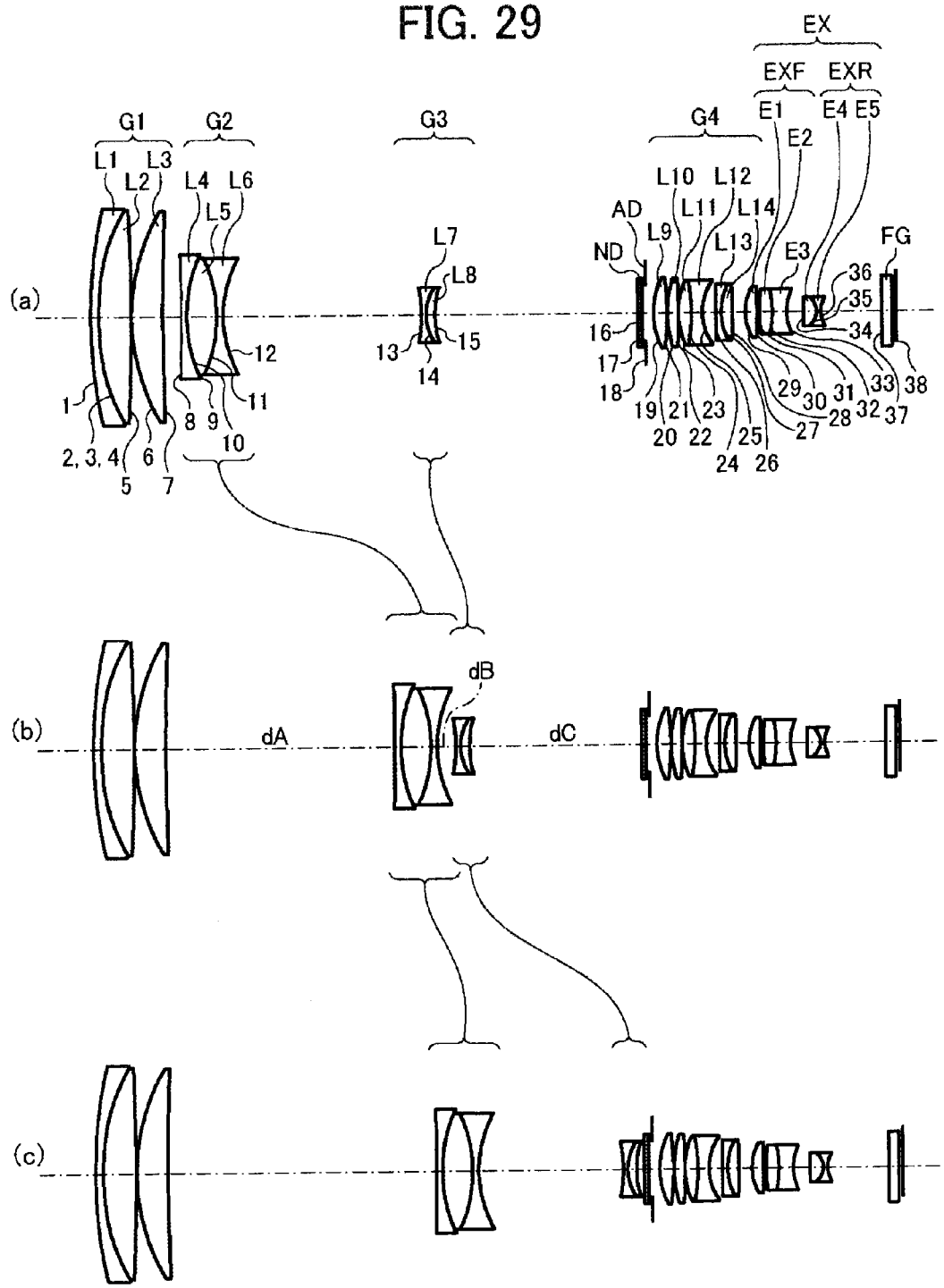
Figure 30:
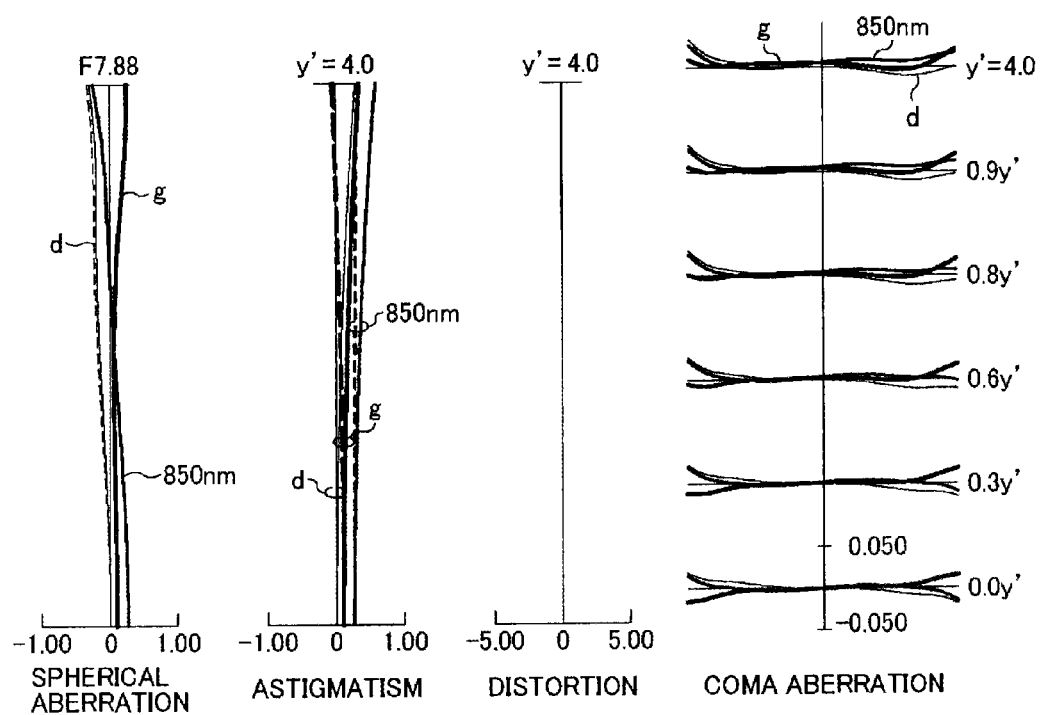
Figure 31:
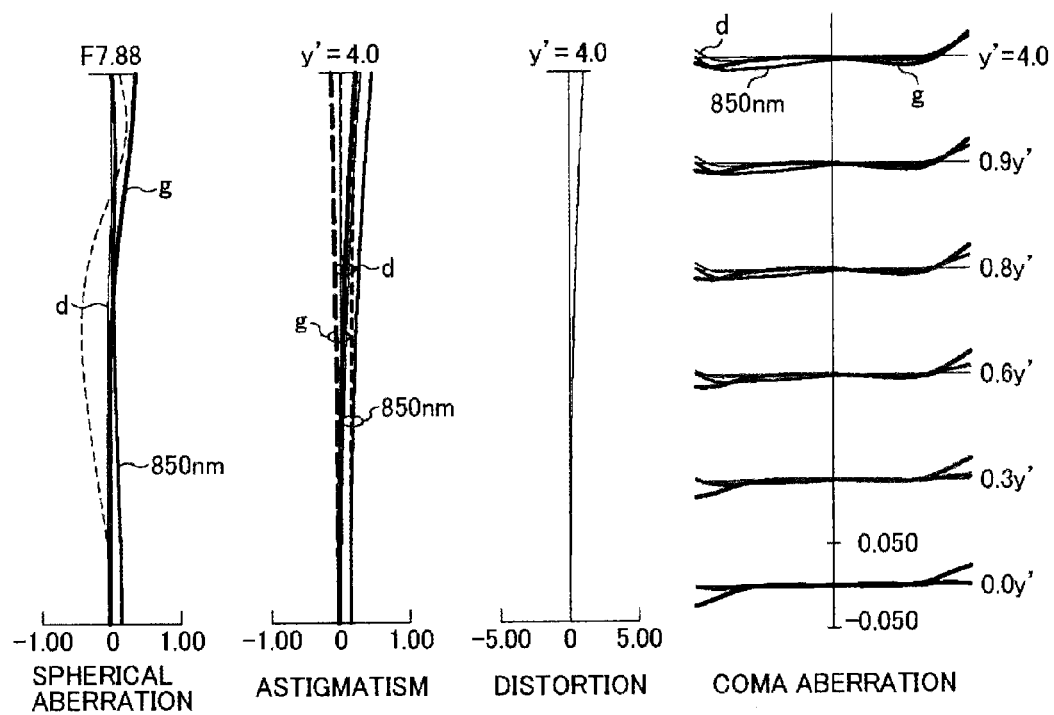
Figure 32:
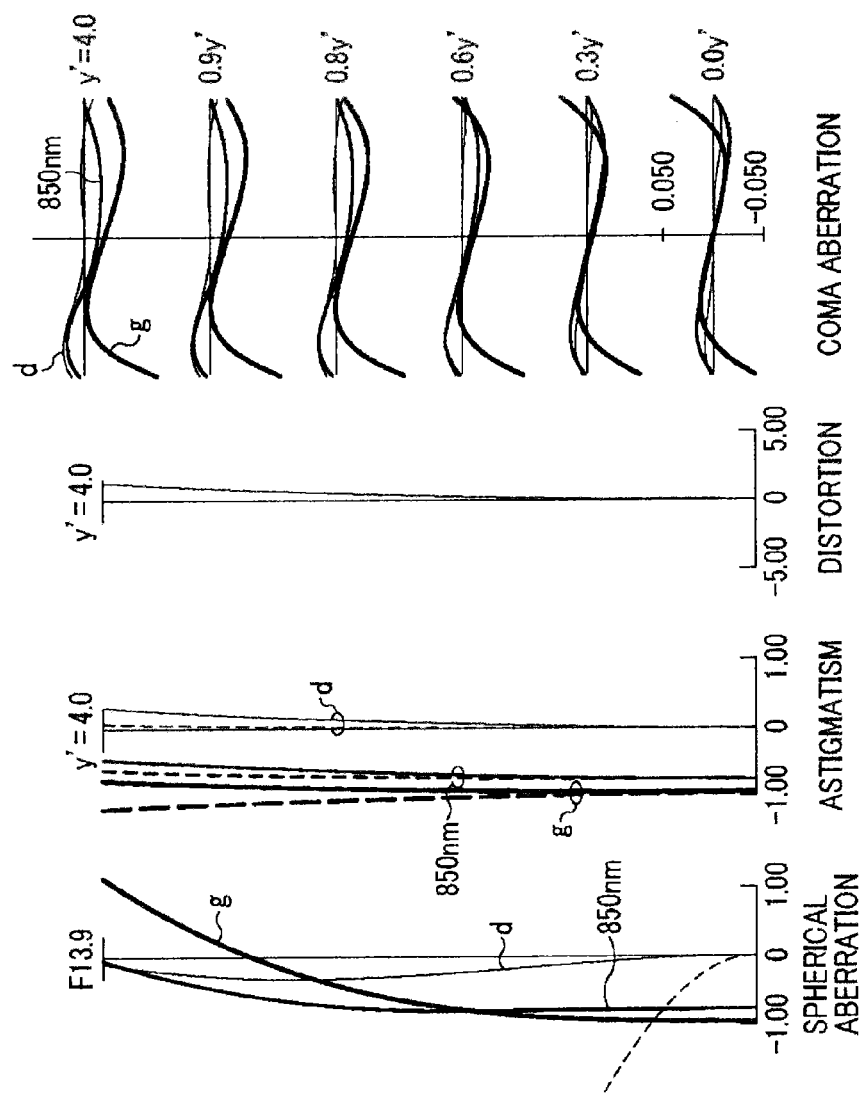
Figure 33:
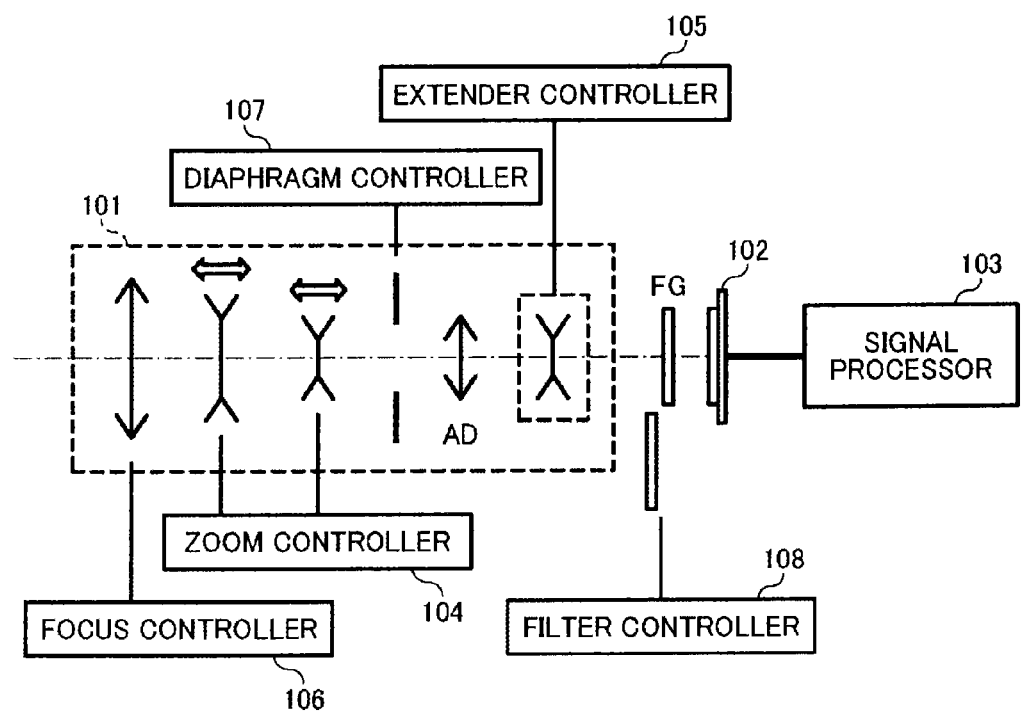

FIG. 5 is a diagram that schematically illustrates the configuration of the optical system in an extender-including state (a state in which an extender is inserted) of the zoom lens according to Example 1 that is the first embodiment of the present invention and a zoom locus accompanied with zooming. FIG. 5 illustrate respectively cross-sectional views at the wide angle end, the intermediate focal length, and the telephoto end along the optical axis;

FIG. 6 is a diagram of aberration curves that illustrate the spherical aberration, the astigmatism, the distortion aberration, and the coma aberration at the wide angle end in the extender-including state of the zoom lens according to Example 1 of the present invention illustrated in FIG. 5;

FIG. 7 is a diagram of aberration curves that illustrate the spherical aberration, the astigmatism, the distortion aberration, and the coma aberration at the intermediate focal length in the extender-including state of the zoom lens according to Example 1 of the present invention illustrated in FIG. 5;

FIG. 8 is a diagram of aberration curves that illustrate the spherical aberration, the astigmatism, the distortion aberration, and the coma aberration at the telephoto end in the extender-including state of the zoom lens according to Example 1 of the present invention illustrated in FIG. 5;

FIG. 9 is a diagram that schematically illustrate the configuration of an optical system in a no-extender state (a state in which an extender is not inserted) of a zoom lens in Example 2 according to a second embodiment of the present invention and a zoom locus accompanied with zooming. FIG. 9 illustrates respectively cross-sectional views at a wide angle end, an intermediate focal length, and a telephoto end along the optical axis;

FIG. 10 is a diagram of aberration curves that illustrate the spherical aberration, the astigmatism, the distortion aberration, and the coma aberration at the wide angle end in the no-extender state of the zoom lens according to Example 2 of the present invention illustrated in FIG. 9;

FIG. 11 is a diagram of aberration curves that illustrate the spherical aberration, the astigmatism, the distortion aberration, and the coma aberration at the intermediate focal length in the no-extender state of the zoom lens according to Example 2 of the present invention illustrated in FIG. 9;

FIG. 12 is a diagram of aberration curves that illustrate the spherical aberration, the astigmatism, the distortion aberration, and the coma aberration at the telephoto end in the no-extender state of the zoom lens according to Example 2 of the present invention illustrated in FIG. 9;

FIG. 13 is a diagram that schematically illustrate the configuration of the optical system in an extender-including state (a state in which an extender is inserted) of the zoom lens according to Example 2 according to the second embodiment of the present invention and a zoom locus accompanied with zooming. FIG. 13 illustrate respectively cross-sectional views at the wide angle end, the intermediate focal length, and the telephoto end along the optical axis;

FIG. 14 is a diagram of aberration curves that illustrate the spherical aberration, the astigmatism, the distortion aberration, and the coma aberration at the wide angle end in the extender-including state of the zoom lens according to Example 2 of the present invention illustrated in FIG. 13;

FIG. 15 is a diagram of aberration curves that illustrate the spherical aberration, the astigmatism, the distortion aberration, and the coma aberration at the intermediate focal length in the extender-including state of the zoom lens according to Example 2 of the present invention illustrated in FIG. 13;

FIG. 16 is a diagram of aberration curves that illustrate the spherical aberration, the astigmatism, the distortion aberration, and the coma aberration at the telephoto end in the extender-including state of the zoom lens according to Example 2 of the present invention illustrated in FIG. 13;

FIG. 17 is a diagram that schematically illustrate the configuration of an optical system in a no-extender state (a state in which an extender is not inserted) of a zoom lens in Example 3 according to a third embodiment of the present invention and a zoom locus accompanied with zooming. FIG. 17 illustrate respectively cross-sectional views at a wide angle end, an intermediate focal length, and a telephoto end along the optical axis;

FIG. 18 is a diagram of aberration curves that illustrate the spherical aberration, the astigmatism, the distortion aberration, and the coma aberration at the wide angle end in the no-extender state of the zoom lens according to Example 3 of the present invention illustrated in FIG. 17;

FIG. 19 is a diagram of aberration curves that illustrate the spherical aberration, the astigmatism, the distortion aberration, and the coma aberration at the intermediate focal length in the no-extender state of the zoom lens according to Example 3 of the present invention illustrated in FIG. 17;

FIG. 20 is a diagram of aberration curves that illustrate the spherical aberration, the astigmatism, the distortion aberration, and the coma aberration at the telephoto end in the no-extender state of the zoom lens according to Example 3 of the present invention illustrated in FIG. 17;

FIG. 21 is a diagram that schematically illustrate the configuration of the optical system in an extender-including state (a state in which an extender is inserted) of the zoom lens in Example 3 according to the third embodiment of the present invention and a zoom locus accompanied with zooming. FIG. 21 illustrate respectively cross-sectional views at the wide angle end, the intermediate focal length, and the telephoto end along the optical axis;

FIG. 22 is a diagram of aberration curves that illustrate the spherical aberration, the astigmatism, the distortion aberration, and the coma aberration at the wide angle end in the extender-including state of the zoom lens according to Example 3 of the present invention illustrated in FIG. 21;

FIG. 23 is a diagram of aberration curves that illustrate the spherical aberration, the astigmatism, the distortion aberration, and the coma aberration at the intermediate focal length in the extender-including state of the zoom lens according to Example 3 of the present invention illustrated in FIG. 21;

FIG. 24 is a diagram of aberration curves that illustrate the spherical aberration, the astigmatism, the distortion aberration, and the coma aberration at the telephoto end in the extender-including state of the zoom lens according to Example 3 of the present invention illustrated in FIG. 21;

FIG. 25 is a diagram that schematically illustrate the configuration of an optical system in a no-extender state (a state in which an extender is not inserted) of a zoom lens in Example 4 according to a fourth embodiment of the present invention and a zoom locus accompanied with zooming. FIG. 25 illustrate respectively cross-sectional views at a wide angle end, an intermediate focal length, and a long focus end along the optical axis;

FIG. 26 is a diagram of aberration curves that illustrate the spherical aberration, the astigmatism, the distortion aberration, and the coma aberration at the wide angle end in the no-extender state of the zoom lens according to Example 4 of the present invention illustrated in FIG. 25;

FIG. 27 is a diagram of aberration curves that illustrate the spherical aberration, the astigmatism, the distortion aberration, and the coma aberration at the intermediate focal length in the no-extender state of the zoom lens according to Example 4 of the present invention illustrated in FIG. 25;

FIG. 28 is a diagram of aberration curves that illustrate the spherical aberration, the astigmatism, the distortion aberration, and the coma aberration at the telephoto end in the no-extender state of the zoom lens according to Example 4 of the present invention illustrated in FIG. 25;

FIG. 29 is a diagram that schematically illustrate the configuration of the optical system in an extender-including state (a state in which an extender is inserted) of the zoom lens in Example 4 according to the fourth embodiment of the present invention and a zoom locus accompanied with zooming. FIG. 29 illustrate respectively cross-sectional views at the wide angle end, the intermediate focal length, and the telephoto end along the optical axis;

FIG. 30 is a diagram of aberration curves that illustrate the spherical aberration, the astigmatism, the distortion aberration, and the coma aberration at the wide angle end in the extender-including state of the zoom lens according to Example 4 of the present invention illustrated in FIG. 29;

FIG. 31 is a diagram of aberration curves that illustrate the spherical aberration, the astigmatism, the distortion aberration, and the coma aberration at the intermediate focal length in the extender-including state of the zoom lens according to Example 4 of the present invention illustrated in FIG. 29;

FIG. 32 is a diagram of aberration curves that illustrate the spherical aberration, the astigmatism, the distortion aberration, and the coma aberration at the telephoto end in the extender-including state of the zoom lens according to Example 4 of the present invention illustrated in FIG. 29; and FIG. 33 is a block diagram that schematically illustrates the functional configuration of a digital camera as an imaging apparatus of Example 5 according to a fifth embodiment of the present invention.

DETAILED DESCRIPTION OF THE INVENTION

Hereinafter, zoom lenses according to the present invention will be described in detail with reference to the drawings based on embodiments according to the present invention. Before specific examples are described, first, the characteristics of a zoom lens according to the present invention will be described.

According to an embodiment of the present invention, there is provided a zoom lens that is configured by sequentially arranging, from the object side to the image side, a first lens group having positive refractive power, a second lens group having negative refractive power, a third lens group having negative refractive power, and a fourth lens group having positive refractive power. When zooming is performed, the second lens group is positioned to the object-most side at a wide angle end, and the third lens group is positioned to the image-most side at a telephoto end, and the zoom lens moves the second lens group and the third lens group in accordance with the zooming operation and has the following characteristics.

More specifically, the zoom lens according to an embodiment of the present invention includes a diffraction optical element in the first lens group and includes a negative lens in at least one of the second lens group and the third lens group. When the refractive index of a material composing the negative lens is denoted by nd, the Abbe number of the material composing the negative lens is denoted by vd, and the partial dispersion ratio of the material composing the negative lens is denoted by $\theta_{C,A'}$, the negative lens satisfies the following conditional expressions [1], [2], and [3].

$$1.50 < nd < 1.75 \quad [1]$$

$$60.0 < vd < 75.0 \quad [2]$$

$$\theta_{C,A'} - 0.0015 \times vd < 0.2550 \quad [3]$$

Here, the partial dispersion ratio $\theta_{C,A'}$ is $\theta_{C,A'} = (n_C - n_{A'})/(n_F - n_C)$, wherein $n_F$, $n_C$, and $n_{A'}$ are the refractive indices of the material composing the negative lens for an F line, a C line, and an A' line.

According to the zoom lens of the embodiment of the present invention, in addition to the configuration described above, an extender lens group may be arranged to be insertable/detachable to/from the image side of the fourth lens group. The extender lens group is a kind of a tele-conversion lens used for causing the focal length of the entire system to transit to the longer side without changing distances between each lens group of the first lens group to the fourth lens group and an image surface.

In one example, in the zoom lens according to the embodiment of the present invention, when the focal length of the entire system at the telephoto end is denoted by $f_T$, and the focal length of a diffraction part of the diffraction optical element is denoted by $f_{DOE}$, it is preferable to satisfy the following conditional expression: [4-1] $0.01 < f_T/f_{DOE} < 0.05$.

In one example, in a case where the zoom lens is configured to include the extender lens group, the focal length $f_{TC}$ of the entire system at the telephoto end in a state, in which the extender lens group is inserted, it is preferable to satisfy the following conditional expression [4-2] $0.02 < f_{TC}/f_{DOE} < 0.10$, in which the focal length of a diffraction part of the diffraction optical element is denoted by $f_{DOE}$.

In one example, in the zoom lens according to the embodiment of the present invention, it is preferable that the first lens group include one or more positive lenses, and, when an average value $v_{1GP}$ of Abbe numbers of materials of the positive lenses included in the first lens group satisfies the following conditional expression [5].

$$75 < v_{1GP} < 96 \quad [5]$$

In one example, in the zoom lens according to the embodiment of the present invention, it is preferable that negative lenses be included in both the second lens group and the third lens group, the negative lenses satisfying Conditional Expressions [1] to [3] described above.

In one example, in the zoom lens according to the embodiment of the present invention, it is preferable that the following conditional expression [6] be satisfied when a gap between the third lens group and the fourth lens group at the wide angle end is denoted by $D_{34W}$, a gap between the third lens group and the fourth lens group at the telephoto end is denoted by $D_{34T}$, and the focal length of the entire system at the wide angle end is denoted by $f_w$.

$$2.5 < (D_{34W} - D_{34T})/f_w < 6.0. \quad [6]$$

In one example, in the zoom lens according to the embodiment of the present invention, it is preferable that a state in which the magnification of the third lens group is zero be included during zooming from the wide angle end to the telephoto end.

In one example, in the zoom lens according to the embodiment of the present invention, it is preferable that the following conditional expression [7] be satisfied when a distance from an object-most side surface to an image-most side surface of the fourth lens group along an optical axis is denoted by $L_4$, and an air-equivalent length that is a distance from the object-most side surface of the fourth lens group to the image surface along the optical axis and, in a case where an optical element having no refractive power is included on the image side of the fourth lens group, is acquired by assuming the optical element not to be present is denoted by $T_{4F-I}$.

$$0.2 < L_4/T_{4F-I} < 0.5 \quad [7]$$

In one example, in the zoom lens according to the embodiment of the present invention, it is preferable that the second lens group be configured by three or less lenses, and the third lens group is configured by two or less lenses.

Furthermore, in the zoom lens according to the embodiment of the present invention, the first lens group may be configured by, from the object side, sequentially arranging three lenses including a negative meniscus lens having a concave surface directed toward the image side, a first positive lens bonded to the negative meniscus lens, and a second positive lens having a convex surface, which has refractive power stronger than the image side, directed toward the object side, and a diffraction surface is formed on a bonded interface between the negative meniscus lens and the first positive lens.

In another example, in the zoom lens according to the embodiment of the present invention, the first lens group and the fourth lens group may be fixed instead of moving with respect to the image surface at the time of zooming.

According to another embodiment of the present invention, there is provided an imaging apparatus that includes any one of the above-described zoom lenses as an imaging optical system.

In one example, according to a further another embodiment of the present invention, there is provided a monitoring video camera that includes any one of the above-described zoom lenses as an imaging optical system.

Next, the principle of the zoom lens according to the embodiment of the present invention having the characteristics described above will be described in detail.

In a zoom lens configured by four lens groups of positive-negative-negative-positive such as the zoom lens according to the embodiment of the present invention, generally, the second lens group is configured as a so-called variator that is responsible for a main zooming action, and the zooming action can be shared also by the third lens group. Accordingly, the zoom lens is appropriate for a high zoom ratio. Thus, in the zoom lens according to the embodiment of the present invention, the second lens group is positioned to the object-most side at the wide angle end, and the third lens group is positioned to the image-most side at the telescope end, and, by moving the second lens group and the third lens group, the third lens group represents a sufficient zooming action, whereby implementation of a high zoom ratio is achieved.

When zooming from the wide angle end to the telephoto end is performed, a gap between the second lens group and the third lens group decreases once, takes an extreme value at the intermediate range of zooming, and thereafter increases again. While the second lens group and the third lens group integrally act as a variator that is responsible for a zooming action, it may be regarded that, by changing a gap therebetween, the position of the image surface is compensated so as to achieve the function of a so-called compensator.

In addition, in the zoom lens according to the embodiment of the present invention, the diffraction optical element is used in the first lens group, and a negative lens formed using a material satisfying the following conditional expressions [1] to [3] is configured to be included in at least one of the second lens group and the third lens group.

$$1.50 < nd < 1.75 \quad [1]$$

$$60.0 < vd < 75.0 \quad [2]$$

$$\theta_{C,A} - 0.0015 \times vd < 0.2550 \quad [3]$$

Here, nd represents the refractive index of a material composing the negative lens, vd represents the Abbe number of the material composing the negative lens, and $\theta_{C,A'}$ represents the partial dispersion ratio of the material composing the negative lens.

In addition, the partial dispersion ratio $\theta_{C,A'}$ is $\theta_{C,A'}=(n_C-n_{A'})/(n_F-n_C)$, and $n_F$, $n_C$, and $n_{A'}$ are refractive indices of the material composing the negative lens for an F line, a C line, and an A' line.

In order to achieve a high zoom ratio, particularly, when the focal length of the telephoto end is to be lengthened, it is difficult to correct the second-order spectrum of the axial chromatic aberration at the telephoto side.

In addition, when chromatic aberration of up to the near-infrared region as well as the visible region is to be corrected, the degree of the difficulty further rises. According to the embodiment of the present invention, while the chromatic aberration of the telephoto region is corrected by arranging the diffraction optical element in the first lens group in which the on-axis marginal ray height increases at the telephoto side, the correction is not sufficient for realizing the correction of chromatic aberration of up to the near-infrared region over the entire area of a large zoom range.

Thus, in the zoom lens according to the embodiment of the present invention, the negative lens that is formed by using a material having a refractive index, an Abbe number, and abnormal dispersibility of the ranges satisfying the conditional expressions [1] to [3] is arranged in at least one of the second lens group and the third lens group. By configuring as such, the chromatic aberration of the visible region to the near-infrared region can be sufficiently corrected over the entire area of a zoom range of over 25 times.

Since relatively high refractive power is required for the variator that is responsible for the zoom action, when the refractive index nd of the material composing the negative lens is 1.50 or less, the correction of monochromatic aberration is insufficient. In addition, when the Abbe number vd of the material composing the negative lens is 60.0 or less, a basic correction of the chromatic aberration is insufficient. Furthermore, regarding the partial dispersion ratio $\theta_{C,A'}$ of the material composing the negative lens, when $\theta_{C,A'}-0.0015 \times vd$ is 0.2550 or more, a correction of the second-order spectrum of the chromatic aberration is insufficient. Particularly, in an area of the wide angle end to the intermediate focal length in which it is difficult to acquire the effect of the correction of chromatic aberration using the diffraction optical element, such an effect is high. Meanwhile, a material having upper limits or more of the conditional expressions [1] and [2] relating to the refractive index nd and the Abbe number vd is considered not to be present, and even if such a material is present, the material is very special and highly priced, which makes the material impractical.

In addition, as an example of the zoom lens according to the embodiment of the present invention, in addition to the configuration of the zoom lens of the above-described embodiment, the focal length of the entire system is configured to transit in a direction extending the focal length of the entire system without changing the distances between each lens group of the first lens group to the fourth lens group and the image surface using the extender lens group that is arranged to be insertable/detachable to/from the image side of the fourth lens group. The reason for employing such a configuration is that the extender lens group is built in the zoom lens. In a configuration in which distances between each lens group of the first lens group to the fourth lens group and the image surface change in accordance with the insertion or detachment of the extender lens group, it is necessary to move the first lens group to the fourth lens group so as to maintain the in-focus state in accordance with the insertion/detachment of the extender group, and accordingly, a very complicated mechanism is required. In addition, by arranging the extender lens group not in the middle of the fourth lens group but on the image side of the fourth lens group, the assembly precision of the fourth lens group is maintained in an easy manner.

In the zoom lens according to the embodiment of the present invention, since the focal length transits to a further longer side by using the extender lens group, the axial chromatic aberration needs to be corrected more sufficiently. The reason for this is that, for example, when the magnification (lateral magnification) of the extender lens group is two, the F value (F number) becomes twice, and the focal depth becomes almost twice, but the axial chromatic aberration is longitudinal aberration and increases by the square, whereby the amount of the aberration becomes four times.

In addition, in the zoom lens according to the embodiment of the present invention, it is preferable that the diffraction optical element arranged in the first lens group satisfy the following conditional expression [4-1].

$$0.01 < f_T/f_{DOE} < 0.05 \qquad [4\text{-}1]$$

Here, $f_T$ represents the focal length of the entire system at the telephoto end, and $f_{DOE}$ represents the focal length of a diffraction part of the diffraction optical element.

Here, the focal length $f_{DOE}$ of the diffraction part of the diffraction optical element is represented as $f_{DOE}=-1/(2\times C2)$.

When the refractive power of the diffraction optical element is weak such that $f_T/f_{DOE}$ is 0.01 or less, it is difficult to sufficiently correct the chromatic aberration in the telephoto region. On the other hand, when the refractive power of the diffraction optical element is strong such that $f_T/f_{DOE}$ is 0.05 or more, the correction of the chromatic aberration at the telephoto side is excessive, which is neither preferable. In a case where the extender lens group is included, in the zoom lens according to the embodiment of the present invention, it is preferable that the diffraction optical element arranged in the first lens group satisfy the following conditional expression [4-2].

$$0.02 < f_{TC}/f_{DOE} < 0.10 \qquad [4\text{-}2]$$

Here, $f_{TC}$ represents the focal length of the entire system at the telephoto end in a state in which the extender lens group is inserted, and $f_{DOE}$ represents the focal length of the diffraction part of the diffraction optical element.

Here, the focal length $f_{DOE}$ of the diffraction part of the diffraction optical element is represented as $f_{DOE}=-1/(2\times C2)$.

When the refractive power of the diffraction optical element is weak such that $f_{TC}/f_{DOE}$ is 0.02 or less, it is difficult to sufficiently correct the chromatic aberration in the telephoto region. On the other hand, when the refractive power of the diffraction optical element is strong such that $f_{TC}/f_{DOE}$ is 0.10 or more, the correction of the chromatic aberration at the telephoto side is excessive, which is neither preferable.

In addition, in the zoom lens according to the embodiment of the present invention, it is preferable that the positive lens included in the first lens group satisfy the following conditional expression [5].

$$75 < \nu_{1GP} < 96 \qquad [5]$$

Here, $\nu_{1GP}$ represents the average value of Abbe numbers of materials of the positive lenses included in the first lens group.

In a case where the average number $v_{1GP}$ of the Abbe numbers of the materials of the positive lenses is 75 or less, even when the diffraction optical element is arranged in the first lens group, the correction of the chromatic aberration of the telephoto region may be easily insufficient. Meanwhile, a material having a $v_{1GP}$ of 96 or more is not generally present, or even when such a material is present, the material is special and is highly priced, which makes the material impractical.

In addition, it is more preferable to satisfy the following conditional expression [5'].

$$80 < v_{1GP} < 96 \quad [5']$$

In addition, it is more preferable that the negative lens that is formed by using the material satisfying the conditional expressions [1] to [3] described above be arranged in both the second lens group and the third lens group.

While axial and non-axial rays of light separately pass through the second lens group in the wide angle region, the axial and non-axial rays of light pass through almost the same position in the telephoto region. For the third lens group, there is not a difference between the passing of axial and non-axial rays of light between the wide angle region and the telephoto region as large as that for the second lens group. By arranging the negative lenses formed by using the materials satisfying the above-described conditional expressions [1] to [3] in both the two lens groups, the correction effects thereof are combined, and it becomes easy to take the balance of the corrections of the chromatic aberration over the entire area of the zoom range.

In order to configure the zoom lens according to the embodiment of the present invention to be more appropriate to a high zoom ratio, it is preferable to satisfy the following conditional expression [6].

$$2.5 < (D_{34W} - D_{34T})/f_w < 6.0 \quad [6]$$

Here, $D_{34W}$ represents a gap between the third lens group and the fourth lens group at the wide angle end, $D_{34T}$ represents a gap between the third lens group and the fourth lens group at the telephoto end, and $f_w$ represents the focal length of the entire system at the wide angle end.

When $(D_{34W} - D_{34T})/f_w$ is 2.5 or less in the conditional expression [6], the contribution of the third lens group to zooming is small, and, when $(D_{34W} - D_{34T})/f_w$ is 6.0 or more, the contribution of the second lens group to zooming is small, and, in both cases, a trouble may be easily caused in the aberration correction. In addition, in the zoom lens of this type, while the open F value in the telephoto region may be configured to be regulated not by the aperture diaphragm (stop) but by the effective diameter of the first lens group, in such a case, by configuring $(D_{34W} - D_{34T})/f_w$ to be larger than 2.5, there is an effect of decreasing the effective diameter of the third lens group, which is advantageous for the aberration correction.

In addition, in the zoom lens according to the embodiment of the present invention, it is preferable that a state in which the magnification of the third lens group is zero be included during the zooming process from the wide angle end to the telephoto end.

The state in which the magnification of the third lens group is zero is a state in which combined refractive power of the first lens group and the second lens group becomes zero. The signs of the magnifications of the second lens group and the third lens group are reversed at this state as a boundary (when the magnification of the third lens group is zero, the magnification of the second lens group is the infinity). By configuring the zoom lens to include this state, the contributions of the second lens group and the third lens group to the zooming are balanced, and a more sufficient aberration correction can be realized.

In addition, in the zoom lens according to the embodiment of the present invention, regarding the arrangement of the fourth lens group that is responsible for a main imaging action, it is preferable to satisfy the following conditional expression [7].

$$0.2 < L_4/T_{4F-I} < 0.5 \quad [7]$$

Here, $L_4$ represents a distance from an object-most side surface to an image-most side surface of the fourth lens group along an optical axis, and $T_{4F-I}$ represents an air-equivalent length that is a distance from the object-most side surface of the fourth lens group to the image surface along the optical axis and, in a case where an optical element having no refractive power is included on the image side of the fourth lens group, is acquired by assuming the optical element not to be present.

In the conditional expression [7], when $L_4/T_{4F-I}$ is 0.2 or less, the degree of freedom relating to the configuration of the fourth lens group is lowered, and there are cases where it is difficult to perform various aberration corrections.

On the other hand, when $L_4/T_{4F-I}$ is 0.5 or more, a sufficient space is not secured between the fourth lens group and the image surface, and there is a trouble in arranging switching mechanisms such as an infrared light cutoff filter and a visible light cutoff filter, or a ghost due to the reflection from each surface or filter disposed inside of the fourth lens group may be easily generated, which is not preferable. In addition, in a case where the extender lens group is present, the degree of freedom relating to the configuration of the extender lens group is lowered, and a ghost may be easily generated due to the reflection from each surface or filter disposed inside the extender lens group, which is not preferable.

Furthermore, it is more preferable to satisfy the following conditional expression [7'].

$$0.2 < L_4/T_{4F-I} < 0.4 \quad [7']$$

In addition, in the zoom lens according to the embodiment of the present invention, it is preferable that the second lens group be configured by three or less lenses, and the third lens group be configured by two or less lenses.

Furthermore, in the zoom lens according to the embodiment of the present invention, it is preferable that the first lens group be configured by three lenses by sequentially arranging, from the object side, a negative meniscus lens having a concave surface directed toward the image side, a first positive lens bonded to the negative meniscus lens, and a second positive lens having a convex surface, which has refractive power stronger than the image side, directed toward the object side, and the diffraction surface be formed on a bonded interface between the negative meniscus lens and the first positive lens.

By employing the configuration as described above, the effect of the present invention is clearly exhibited, and a zoom lens having a further small size and a light weight can be provided.

In addition, in order to effectively exhibit the effect of the present invention, more specifically, it is preferable to configure the second lens group to have a three-lens configuration of a negative lens—a positive lens—a negative lens sequentially from the object side and to configure the third lens group to have a two-lens configuration of a negative lens—a positive lens sequentially from the object side.

Furthermore, in the zoom lens according to the embodiment of the present invention, it is preferable that the first lens group and the fourth lens group be fixedly arranged instead of moving with respect to the image surface at the time of zooming.

As the zoom lens used for a video camera such as a so-called TV camera, also in the aspect of the convenience of hand-held capturing or the like, generally, it is preferable that the entire length be fixed, and the weight balance not change at the time of zooming, and it can be realized by configuring the first lens group and the fourth lens group not to be moved. In addition, a small number of moving groups is advantageous also in terms of the mechanism and leads to a decrease in the number of components, a light weight, and the improvement of reliability.

In addition, the fourth lens group includes at least three positive lenses, and it is preferable to satisfy the following conditional expression [8].

$$75 < v_{4GP} < 96 \quad [8]$$

Here, $v_{4GP}$ represents an average value of Abbe numbers of the at least three positive lenses.

By configuring the fourth lens group as such, particularly, in the wide angle region of the zoom range, the chromatic aberration of the visible region to the near-infrared region can be more sufficiently corrected.

In addition, it is preferable that the refractive power of each lens group satisfy the following conditional expressions [9] to [12].

$$6.0 < f_1/f_W < 12.0 \quad [9]$$

$$-5.0 < f_2/f_W < -2.0 \quad [10]$$

$$-4.5 < f_3/f_W < -1.5 \quad [11]$$

$$1.5 < f_4/f_W < 4.5 \quad [12]$$

Here, $f_1$ represents the focal length of the first lens group, $f_2$ represents the focal length of the second lens group, $f_3$ represents the focal length of the third lens group, $f_4$ represents the focal length of the fourth lens group, and $f_W$ represents the focal length of the entire system at the wide angle end.

By keeping the refractive power of each lens group in the ranges of the conditional expressions [9] to [12], a more appropriate zoom lens having a zoom ratio of over 25 times and a half field angle of about 0.5 degrees is acquired.

In the zoom lens according to the embodiment of the present invention, as a method for focusing at a finite distance, various methods may be considered. As a simplest method, focusing can be performed by moving the first lens group.

In addition, it is preferable that the extender lens group be configured by sequentially disposing from the object side an extender lens front group that is configured by sequentially arranging a positive lens—a positive lens—a negative lens from the object side and an extender lens rear group that is configured by sequentially arranging a positive lens—a negative lens from the object side.

The extender lens front group has positive refractive power as a whole, and the extender lens rear group has negative refractive power as a whole, and the focal length of the entire system can be caused to transit to the longer side without changing the distances between each lens group of the first lens group to the fourth lens group and the image surface. In addition, by respectively configuring the front group and the rear group using a plurality of lenses as described above, the aberration of the extender lens group can be corrected more sufficiently.

In addition, it is preferable that the refractive power of the extender lens group satisfy the following conditional expression [13].

$$-2.5 < f_E/f_W < -0.7 \quad [13]$$

Here, $f_E$ represents the focal length of the extender lens group, and $f_W$ represents the focal length of the entire system at the wide angle end.

By keeping the refractive power of the extender lens group in the range of the conditional expression [13], the extender lens group is more appropriate for a built-in extender of about two times.

In the zoom lens according to the embodiment of the present invention, as a method for focusing at a finite distance, various methods may be considered. As a simplest method, focusing can be performed by moving the first lens group.

EMBODIMENTS AND EXAMPLES

Next, further more specific embodiments of a zoom lens, an imaging apparatus, and a monitoring video camera according to the present invention and examples thereof will be described. Here, first to fourth embodiments as specific embodiments of the zoom lens according to the present invention will be described based on Examples 1 to 4 as specific examples.

FIGS. 1 to 8 illustrate a zoom lens according to Example 1 as a first embodiment of the present invention. FIGS. 1 to 4 illustrate a state in which an extender lens group is not inserted on an optical path but is retracted from the inside of the optical path, and FIGS. 5 to 8 illustrate a state in which an extender lens group EX is inserted on an optical path between a fourth lens group 4G and an image surface. FIGS. 9 to 16 illustrate a zoom lens according to Example 2 as a second embodiment of the present invention. FIGS. 9 to 12 illustrate a state in which an extender lens group is not inserted on an optical path but is retracted from the inside of the optical path, and FIGS. 13A to 16 illustrate a state in which an extender lens group EX is inserted on an optical path between a fourth lens group 4G and an image surface. FIGS. 17 to 24 illustrate a zoom lens according to Example 3 as a third embodiment of the present invention. FIGS. 17 to 20 illustrate a state in which an extender lens group is not inserted on an optical path but is retracted from the inside of the optical path, and FIGS. 21A to 24 illustrate a state in which an extender lens group EX is inserted on an optical path between a fourth lens group 4G and an image surface.

FIGS. 25 to 32 illustrate a zoom lens according to Example 4 as a fourth embodiment of the present invention. FIGS. 25 to 28 illustrate a state in which an extender lens group is not inserted on an optical path but is retracted from the inside of the optical path, and FIGS. 29 to 32 illustrate a state in which an extender lens group EX is inserted on an optical path between a fourth lens group 4G and an image surface.

According to all the zoom lenses of Examples 1 to 4, from the object side to the image side, a first lens group having positive refractive power and including a diffraction optical element, a second lens group having negative refractive power, a third lens group having negative refractive power, and a fourth lens group having positive refractive power are sequentially arranged so as to configure the zoom lenses each having a so-called four-group configuration of positive-negative-negative-positive, and the extender lens group EX that is disposed so as to be insertable/detachable to/from the image side of the fourth lens group G4 on the optical path and changes the focal length of the entire system to the longer side without changing a distance between each of the first lens group G1 to the fourth lens group G4 and the image surface is included.

In addition, in Examples 1, 2, and 4 respectively corresponding to the first, second, and fourth embodiments, a maximum image height is 4.0 mm, and, in Example 3 corresponding to the third embodiment, a maximum image height is 4.5 mm.

In each example as each embodiment, a parallel-plate shaped optical element is arranged on the image-surface side of the fourth lens group G4 in a case where the extender lens group EX is not inserted on the optical path on the image-surface side of the fourth lens group G4 and is arranged on the image-surface side of the extender lens group EX in a case where the extender lens group EX is inserted on the optical path on the image-surface side of the fourth lens group G4. As the parallel-plate shaped optical element, any one of various filters such as an optical low-pass filter and an infrared cut filter or a cover glass (sealing glass) of a light reception imaging device such as a complementary metal oxide semiconductor (CMOS) image sensor or a charge coupled device (CCD) image sensor is considered. Hereinafter, the parallel-plate shaped optical element will be represented as an equivalent transparent parallel plate and will be generally referred to as an FG such as a filter. In addition, as a parallel-plate shaped optical element arranged between the third and fourth lens groups G3 and G4, an ND (neutral density—darkening) filter for light amount adjustment is considered. Hereinafter, the parallel-plate shaped optical element will be represented as an equivalent transparent parallel plate and will be generally referred to as an adjustment filter ND.

In addition, as the materials of the lenses, in all the examples including Examples 1 to 4 of the first to fourth embodiments, while a resin material is used for a diffraction part included in the first lens group, optical glass is used for the other parts. The glass material of the optical glass used in each example including Examples 1 to 4 is represented by an optical glass kind name of a product manufactured by OHARA Inc.

The aberration is sufficiently corrected in each example of Examples 1 to 4, and each example can respond to an imaging device having a resolution of two million pixels or more. By configuring the zoom lens in accordance with the present invention, it is apparent based on each of Examples 1 to 4 that, while a sufficient decrease in the size is achieved, chromatic aberration of up to the near-infrared region is corrected so as to acquire excellent image performance.

Symbols that are common to Examples 1 to 4 mean the following.
f: focal length of entire system
F: F value (F number)
ω: half field angle
r: radius of curvature
d: spacing
nd: refractive index
vd: Abbe number
$\theta_{C,A'}$: partial dispersion ratio=$(n_C-n_{A'})/(n_F-n_C)$
$C_2$: second-order coefficient of phase function
$C_4$: fourth-order coefficient of phase function
K: conic constant of aspherical surface expression
$A_4$: fourth-order coefficient of aspherical surface expression
$A_6$: sixth-order coefficient of aspherical surface expression
$A_8$: eighth-order coefficient of aspherical surface expression Here, the diffraction surface used here is defined by the following Expression [21] of the phase function when the reference wavelength is denoted by λ, and the height from the optical axis is denoted by h. In addition, first-order diffraction light is used as imaging light, and the refractive power of the diffraction part is $-2 \cdot C_2$.

$$\phi(h) = \frac{2\pi}{\lambda}(C_2 \cdot h^2 + C_4 \cdot h^4) \quad [21]$$

In addition, in Example 4 as the fourth embodiment, an aspherical surface is used, and the shape of the aspherical surface used here is defined by the following aspherical surface expression [22] by using the conic constant K and the aspherical surface coefficients $A_4$ to $A_8$ of each order when the radius of paraxial curvature is denoted by R and the height from the optical axis is H with X as an aspherical surface amount in the optical axis direction, and the shape is specified by applying the radius R of paraxial curvature, the conic constant K, and the aspherical surface coefficients $A_4$ to $A_8$.

[22]

$$X = \frac{(1/R) \cdot H^2}{1 + \sqrt{\left(1 - (1+K) \cdot \left(\frac{H}{R}\right)^2\right)}} + A_4 \cdot H^4 + A_6 \cdot H^6 + A_8 \cdot H^8 \quad [22]$$

Next, specific embodiments and examples that are based on the present invention described above will be described in detail.

Example 1 of the first embodiment to Example 4 of the fourth embodiment of the present invention described below are examples of specific configurations according to numerical examples of the zoom lens according to the present invention.

First Embodiment

First, a zoom lens according to a specific example of Example 1 as the first embodiment of the present invention described above will be described in detail.

Example 1

Example 1 is an example (numerical example) of a specific configuration of the zoom lens according to the first embodiment of the present invention.

FIGS. 1 to 8 illustrate the zoom lens according to Example 1 as the first embodiment of the present invention. FIGS. 1 to 4 illustrate a state in which an extender lens group is not inserted on an optical path but is retracted from the inside of the optical path, and FIGS. 5 to 8 illustrate a state in which an extender lens group EX is inserted on an optical path between a fourth lens group G4 and an image surface.

Figure 1:
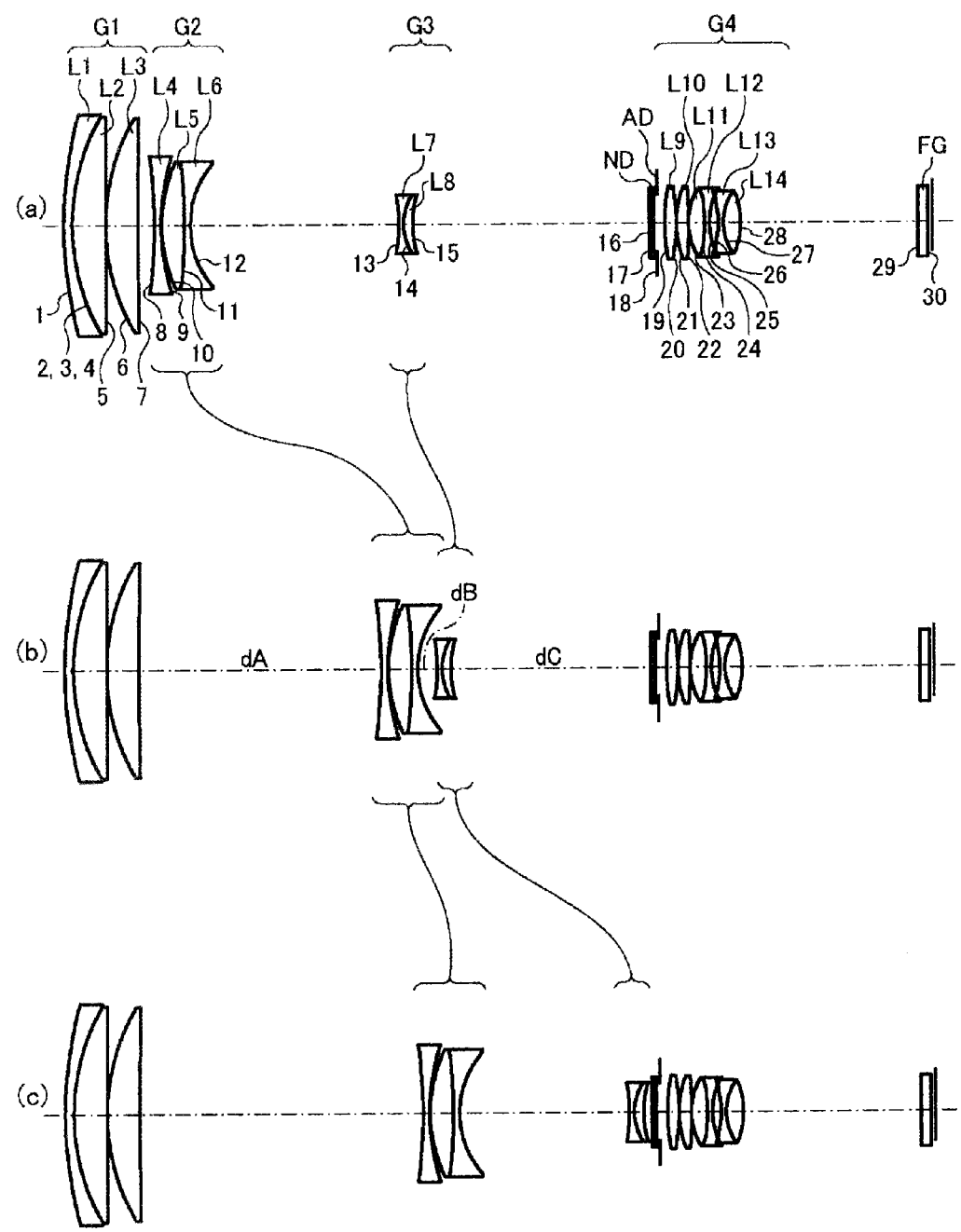

FIG. 1 is a diagram that schematically illustrate the configuration of the optical system and a zoom locus accompanied with zooming in a state in which the extender lens group EX is not inserted on the optical path, that is, an extender lens group EX not-present state. FIG. 5 are diagrams that schematically illustrate the configuration of the optical system and a zoom locus accompanied with zooming in a state in which the extender lens group EX is inserted on the optical path between the fourth lens group G4 and the image surface, that is, an extender lens group EX-including state. In these diagrams, FIGS. 1(a) and 5(a), FIGS. 1(b) and 5(b), and FIGS. 1(c) and 5(c) respectively illustrate the arrangement configurations of the optical system in states of the wide angle end (short focus end), the intermediate focal length, and the telephoto end (long focus end).

FIG. 1 schematically illustrates the lens configurations of the optical system of the zoom lens of Example 1 according to the first embodiment of the present invention in the extender lens group EX not-present state and a zoom locus accompanied with zooming from the short focus end such as the wide angle end, to the long focus end such as the telephoto end through a predetermined intermediate focal length. FIG. 1(a) is a cross-sectional view at the short focus end such as the wide angle end along the optical axis. FIG. 1(b) is a cross-sectional view at the predetermined intermediate focal length along the optical axis. FIG. 1(c) is a cross-sectional view at the long focus end such as the telephoto end along the optical axis.

FIGS. 5(a), 5(b), and 5(c) schematically illustrate the lens configurations of the optical system of the zoom lens of Example 1 according to the first embodiment of the present invention in the extender lens group EX-including state and a zoom locus accompanied with zooming from the short focus end, in other words, the wide angle end to the long focus end, in other words, the telephoto end through a predetermined intermediate focal length. FIG. 5(a) is a cross-sectional view at the short focus end, in other words, the wide angle end along the optical axis, FIG. 5(b) is a cross-sectional view at the predetermined intermediate focal length along the optical axis, and FIG. 5(c) is a cross-sectional view at the long focus end, in other words, the telephoto end along the optical axis. In FIGS. 1(a) to 1(c) and FIGS. 5(a) to 5(c) representing the lens group arrangements of Example 1, the left side is the object (subject) side, and the right side is the image side (imaging device side).

In the zoom lenses illustrated in FIGS. 1(a) to 1(c) and FIGS. 5(a) to 5(c), from the object side to the image side, a first lens group G1 having positive refractive power, a second lens group G2 having negative refractive power, a third lens group G3 having negative refractive power, and a fourth lens group G4 having positive refractive power are sequentially arranged. In addition, the extender lens group EX is arranged so as to be insertable/detachable to/from the image side of the fourth lens group G4, and an adjustment filter ND and an aperture diaphragm AD are arranged between the third lens group G3 and the fourth lens group G4.

The first lens group G1 is configured by sequentially arranging a first lens L1, a second lens L2, and a third lens L3 from the object side to the image side. The second lens group G2 is configured by sequentially arranging a fourth lens L4, a fifth lens L5, and a sixth lens L6 from the object side to the image side. The third lens group G3 is configured by sequentially arranging a seventh lens L7 and an eighth lens L8 from the object side to the image side. The fourth lens group G4 is configured by sequentially arranging a ninth lens L9, a tenth lens L10, an eleventh lens L11, a twelfth lens L12, a thirteenth lens L13, and a fourteenth lens L14 from the object side to the image side. In addition, the extender lens group EX, as illustrated in FIGS. 5(a) to 5(c), is configured by an extender lens front group EXF configured by a first lens E1, a second lens E2, and a third lens E3 sequentially from the object side to the image side and an extender lens rear group EXR configured by a fourth lens E4 and a fifth lens E5. The extender lens front group EXF has positive refractive power as a whole, and the extender lens rear group EXR has negative refractive power as a whole. In addition, between the third lens group G3 and the fourth lens group G4, from the object side to the image side, the adjustment filter ND and the aperture diaphragm AD are sequentially arranged so as to be interposed. Furthermore, the filter and the like FG are interposed, in the extender lens group EX not-present state, between the fourth lens group G4 and the image surface and, in the extender lens group EX-including state, between the extender lens group EX and the image surface.

The first lens group G1 to the fourth lens group G4 are respectively supported by an appropriate common support frame or the like for each group and are integrally operated for each group at the time of performing an operation such as a zooming operation, and the aperture diaphragm AD operates integrally with the fourth lens group G4. In FIGS. 1(a) to 1(c), the surface number of each optical surface is also illustrated. In a case where the focal length is extended by supporting the extender lens group EX using a drive mechanism used for inserting/detaching the extender lens group EX to/from the appropriate support frame and the optical axis or the like, the extender lens group EX is inserted on the optical axis between the fourth lens group G4 and the filter and the like FG. On the other hand, in a case where the focal length is not extended, the extender lens group EX is retracted from the optical path between the fourth lens group G4 and the filter and the like FG. In FIGS. 5(a) to 5(c), the surface number of each optical face is also illustrated.

Each reference numeral illustrated in FIGS. 1(a) to 1(c) and FIGS. 5(a) to 5(c) is independently used for each example so as to avoid the complication of description according to an increase in the number of digits of the reference numeral. Thus, even when a reference numeral that is common to a drawing relating to any other embodiment is assigned, it does not necessarily represent a configuration that is common to the other embodiment.

When zooming from the wide angle end (short focus end) to the telephoto end (long focus end) is performed, the first lens group G1 and the fourth lens group G4 are fixedly positioned without moving, and the second lens group G2 and the third lens group G3 move such that a gap dA between the first lens group G1 and the second lens group G2 increases, a gap dB between the second lens group G2 and the third lens group G3 once decreases at the intermediate focal length and thereafter increases, and a gap between the third lens group G3 and the fourth lens group G4 decreases.

Now, a further detailed lens configuration of the zoom lens according to Example 1 illustrated in FIGS. 1(a) to 1(c) and FIGS. 5(a) to 5(c) will be described.

In the first lens group G1, from the object side to the image side, a first lens L1 that is configured by a negative meniscus lens having an concave surface directed toward the image side, a diffraction optical element that is configured to include a first resin layer formed by using a thin resin material and a second resin layer formed by using a thin resin layer, a second lens L2 configured by a positive meniscus lens having a convex surface directed toward the object side, and a third lens L3 that is configured by a positive meniscus having a convex surface directed toward the object side are sequentially arranged. Two lenses including the first lens L1 and the second lens L2 are integrally bonded by being closely put together with the first resin layer and the second resin layer being interposed between so as to form a cemented lens. Here, a diffractive surface is formed on the boundary face between the first resin layer and the second resin layer, and the cemented lens as a diffractive optical element is configured by the first lens L1, the first resin layer, the second resin layer, and the second lens L2 that are integrally bonded.

In the second lens group G2, from the object side to the image side, a fourth lens L4 that is configured by a biconcave lens having a concave surface, which has a curvature larger than the object-side surface, directed toward the image side, a fifth lens L5 that is configured by a biconvex lens having a convex surface, which has a curvature larger than the image-surface side, directed toward the object side, and a sixth lens L6 that is configured by a biconcave lens having a concave surface, which has a curvature larger than the object-side surface, directed toward the image side are sequentially arranged. Two lenses including the fifth lens L5 and the sixth lens L6 are integrally bonded by being closely put together so as to form a cemented lens that is formed by two-lens bonding.

In the third lens group G3, from the object side to the image side, a seventh lens L7 that is configured by a biconcave lens having a concave surface, which has a curvature larger than the object-side surface, directed toward the image side and an eighth lens L8 that is configured by a positive meniscus lens having a convex surface directed toward the object side are sequentially arranged. Two lenses including the seventh lens L7 and the eighth lens L8 are integrally bonded by being closely put together so as to form a cemented lens that is formed by two-lens bonding.

The adjustment filter ND that is configured by an optical amount adjustment filter such as an ND (neutral density) darkening filter having a parallel plate shape is arranged to be interposed between the third lens group G3 and the fourth lens group G4, and the aperture diaphragm AD is arranged to be interposed between the adjustment filter ND and the fourth lens group G4.

In the fourth lens group G4, from the object side to the image side, a ninth lens L9 that is configured by a biconvex lens having a convex surface, which has a curvature larger than the object-side surface, directed toward the image side, a tenth lens L10 that is configured by a biconvex lens having a convex surface, which has a curvature larger than the image-side surface, directed toward the object side, an eleventh lens L11 that is configured by a biconvex lens having a convex surface, which has a curvature larger than the image-side surface, directed toward the object side, a twelfth lens L12 that is configured by a biconcave lens having a concave surface, which has a curvature larger than the object-side surface, directed toward the image side, a thirteenth lens L13 that is configured by a biconcave lens having a concave surface, which has a curvature larger than the object-side surface, directed toward the image side, and a fourteenth lens L14 that is configured by a biconvex lens having a convex surface, which has a curvature larger than the image-side surface, directed toward the object side are sequentially arranged.

Two lenses including the eleventh lens L11 and the twelfth lens L12 are integrally bonded by being closely put together so as to form a cemented lens that is formed by two-lens bonding. In addition, two lenses including the thirteenth lens L13 and the fourteenth lens L14 are integrally bonded by being closely put together so as to form a cemented lens that is formed by two-lens bonding.

Referring to FIG. 5, in the extender lens group EX, from the object side to the image side, a first lens E1 that is configured by a biconvex lens having a convex surface, which has a curvature larger than the image-side surface, directed toward the object side, a second lens E2 that is configured by a positive meniscus lens having a concave surface directed toward the object side, a third lens E3 that is configured by a biconcave lens having a concave surface, which has a curvature larger than the image-side surface, directed toward the object side, a fourth lens E4 that is configured by a positive meniscus lens having a convex surface directed toward the image side, and a fifth lens E5 that is configured by a biconcave lens having a concave surface, which has a curvature larger than the image-side surface, directed toward the object side are sequentially arranged. Two lenses including the second lens E2 and the third lens E3 are integrally bonded by being closely put together so as to form a cemented lens that is formed by two-lens bonding. In addition, two lenses including the fourth lens E4 and the fifth lens E5 are integrally bonded by being closely put together so as to form a cemented lens that is formed by two-lens bonding. As described above, in a case where the focal length is extended, this extender lens group EX is inserted on the optical axis between the fourth lens group G4 and the filter and the like FG. On the other hand, in a case where the focal length is not extended, this extender lens group EX is retracted from the optical path between the fourth lens group G4 and the filter and the like FG.

Various optical filters each having a parallel plate shape and a filter and the like FG such as the cover glass of a light reception imaging device are arranged on the image-surface side of the fourth lens group G4 in a case where the extender lens group EX is not inserted on the optical path disposed on the image-surface side of the fourth lens group G4 and are arranged on the image-surface side of the extender lens group EX in a case where the extender lens group EX is inserted on the optical path disposed on the image-surface side of the fourth lens group G4.

In this case, as illustrated in FIGS. 1(a) to 1(c) and FIGS. 5(a) to 5(c), the first lens group G1 and the fourth lens group G4 are fixedly positioned without moving in accordance with zooming from the wide angle end (short focus end) to the telephoto end (long focus end). The second lens group G2 moves much from the object side to the image side from the wide angle end to the intermediate focal length and moves a little from the object side to the image side from the intermediate focal length to the telephoto end. In addition, the third lens group G3 moves a little from the object side to the image side from the wide angle end to the intermediate focal length and moves much from the object side to the image side from the intermediate focal length to the telephoto end.

This Example 1 will be described with reference to the extender lens group EX not-present state illustrated in FIGS. 1(a) to 1(c) and the extender lens group EX-including state illustrated in FIGS. 5(a) to 5(c) in a divisional manner.

Example 1

Extender Not-Present

First, in the extender lens group EX not-present state, illustrated in FIGS. 1A to 1C, of Example 1, the focal length f of the entire optical system, the F number, and the half field angle $\omega$ respectively change in the ranges of f=17.1 to 487, F=4.01 to 6.96, and $\omega$=14.1 to 0.470. The optical characteristics of each optical element are as illustrated in the following

TABLE 1

OPTICAL CHARACTERISTICS

| SURFACE NUMBER | r | d | nd | vd | $\theta_{C, A'}$ | MATERIAL/GLASS TYPE | REMARK | |
|---|---|---|---|---|---|---|---|---|
| 01 | 144.855 | 2.50 | 1.83400 | 37.16 | 0.3245 | OHARA S-LAH60 | L1 | G1 |
| 02 | 76.469 | 0.10 | 1.64310 | 38.82 | 0.3124 | RESIN MATERIAL | P1 | |
| 03# | 76.469 | 0.10 | 1.61505 | 26.54 | 0.2831 | RESIN MATERIAL | P2 | |
| 04 | 76.469 | 10.59 | 1.48749 | 70.24 | 0.3633 | OHARA S-FSL5 | L2 | |
| 05 | 19773.507 | 0.20 | | | | | | |
| 06 | 74.791 | 10.29 | 1.43875 | 94.94 | 0.3529 | OHARA S-FPL53 | L3 | |
| 07 | 1414.256 | VARIABLE dA | | | | | | |
| 08 | −168.994 | 2.00 | 1.61800 | 63.33 | 0.3454 | OHARA S-PHM52 | L4 | G2 |
| 09 | 73.668 | 0.20 | | | | | | |
| 10 | 50.000 | 7.46 | 1.80000 | 29.84 | 0.3117 | OHARA S-NBH55 | L5 | |
| 11 | −161.070 | 2.00 | 1.74320 | 49.34 | 0.3414 | OHARA S-LAM60 | L6 | |
| 12 | 33.127 | VARIABLE dB | | | | | | |
| 13 | −55.514 | 1.50 | 1.60300 | 65.44 | 0.3498 | OHARA S-PHM53 | L7 | G3 |
| 14 | 19.259 | 2.83 | 1.85026 | 32.27 | 0.3145 | OHARA S-LAH71 | L8 | |
| 15 | 34.731 | VARIABLE dC | | | | | | |
| 16 | ∞ | 1.00 | 1.51633 | 64.14 | | ADJUSTMENT FILTER | ND | |
| 17 | ∞ | 0.90 | | | | | | |
| 18 | DIAPHRAGM | 2.50 | | | | | AD | |
| 19 | 68.120 | 3.62 | 1.49700 | 81.54 | 0.3501 | OHARA S-FPL51 | L9 | G4 |
| 20 | −64.999 | 0.20 | | | | | | |
| 21 | 36.048 | 3.73 | 1.49700 | 81.54 | 0.3501 | OHARA S-FPL51 | L10 | |
| 22 | −253.146 | 0.20 | | | | | | |
| 23 | 25.441 | 4.97 | 1.49700 | 81.54 | 0.3501 | OHARA S-FPL51 | L11 | |
| 24 | −53.850 | 1.55 | 1.83400 | 37.16 | 0.3245 | OHARA S-LAH60 | L12 | |
| 25 | 23.762 | 2.83 | | | | | | |
| 26 | −34.001 | 1.50 | 1.48749 | 70.24 | 0.3633 | OHARA S-FSL5 | L13 | |
| 27 | 20.000 | 5.40 | 1.54072 | 47.23 | 0.3353 | OHARA S-TIL2 | L14 | |
| 28 | −30.706 | 57.344 | | | | | | |
| 29 | ∞ | 3.50 | 1.51633 | 64.14 | | FILTER AND THE LIKE | FG | |
| 30 | ∞ | 1.000 | | | | | | |

In Table 1, an optical surface represented with "# (hash mark; number sign)" being attached to the surface number is a diffraction surface. In addition, in Table 1, the material of each lens is also represented. These are similar in the other examples.

In other words, in Table 1, the third surface to which "#" is attached is a diffraction surface, and the parameters of the diffraction surface represented in Expression [21] are as follows.

Here, $C_2$ is the coefficient of the second-order term of the phase relation of the diffraction surface, and $C_4$ is the coefficient of the fourth-order term of the phase relation.
Diffraction Surface: Third Surface $\lambda = 587.56$ (nm)

$C_2 = -1.80594 \times 10^{-5}$ $C_4 = 1.02994 \times 10^{-9}$

In the extender not-present state of this Example 1, the focal length f of the entire optical system, a variable gap dA between the first lens group G1 and the second lens group G2, a variable gap dB between the second lens group G2 and the third lens group G3, and a gap dC between the third lens group G3 and the adjustment filter ND at each of the wide angle end (short focus end), the intermediate focal length, and the telephoto end (long focus end) change in accordance with zooming as in the following Table 2.

TABLE 2

VARIABLE GAP

| VARIABLE GAP | WIDE ANGLE END f = 17.07 | INTERMEDIATE FOCAL LENGTH f = 91.34 | TELEPHOTO END f = 487.3 |
|---|---|---|---|
| dA | 5.400 | 77.984 | 91.096 |
| dB | 66.759 | 6.083 | 54.757 |
| dC | 76.794 | 64.886 | 3.100 |

In the extender not-present state of this Example 1, the focal length f of the entire optical system, the magnification of the second lens group G2, the magnification of the third lens group G3, and the magnification of the fourth lens group G4 at each of the wide angle end (short focus end), the intermediate focal length, and the telephoto end (long focus end) change in accordance with zooming as in the following Table 3.

TABLE 3

MAGNIFICATION OF EACH LENS GROUP

| | MAGNIFICATION | | |
|---|---|---|---|
| | WIDE ANGLE END f = 17.07 | INTERMEDIATE FOCAL LENGTH f = 91.34 | TELEPHOTO END f = 487.3 |
| SECOND LENS GROUP G2 | −0.821 | 14.545 | 3.320 |
| THIRD LENS GROUP G3 | 0.206 | −0.0623 | −1.455 |
| FOURTH LENS GROUP G4 | −0.680 | −0.680 | −0.680 |

In this case, values corresponding to Conditional Expressions [1] to [3], Conditional Expression [4-1], Conditional Expression [5], Conditional Expression [6], Conditional Expression [7], Conditional Expression [8], and Conditional Expressions [9] to [12] are as follows, and each of Conditional Expressions [1] to [3], Conditional Expression [4-1], Conditional Expression [5], Conditional Expression [6], Conditional Expression [7], Conditional Expression [8], and Conditional Expressions [9] to [12] is satisfied.

<Conditional Expression Numerical Values>

$nd=1.61800(L4)$ $nd=1.60300(L7)$ [1]:

$vd=63.33(L4)$ $vd=65.44(L7)$ [2]:

$\theta_{C,A'}-0.0015 \times vd-0.255=-0.0046$ ... OHARA S-PHM52(L4)

Figure 2:
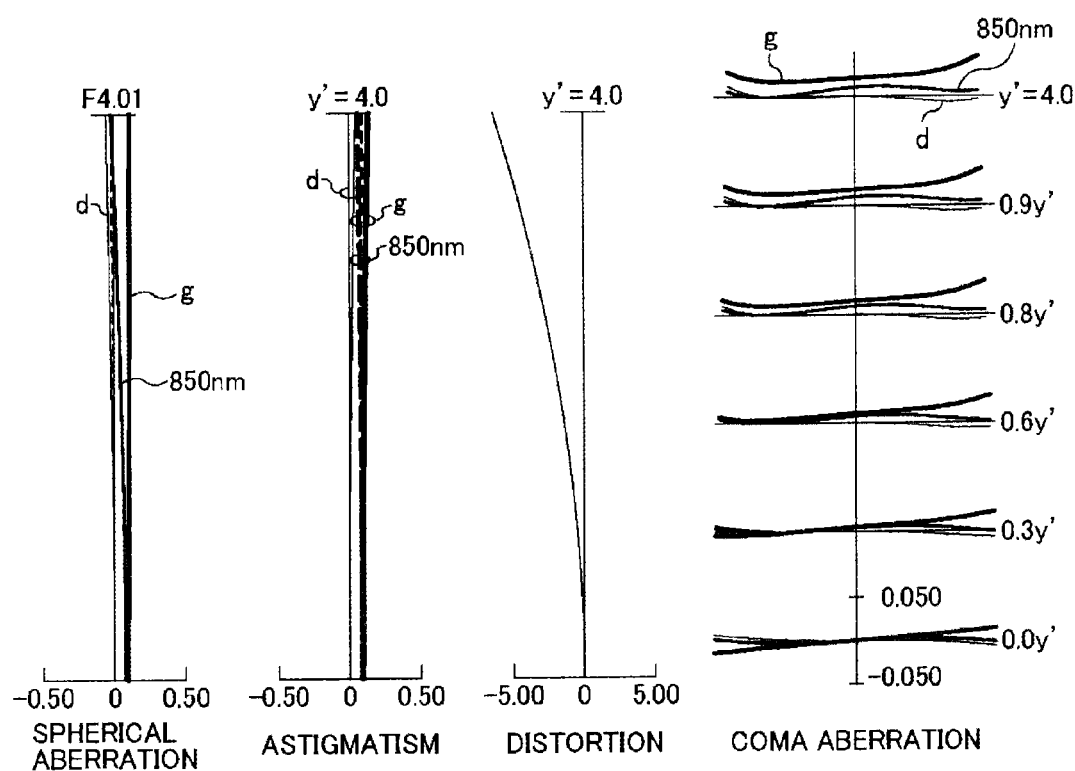
FIG. 2 is a diagram of aberration curves that illustrate the spherical aberration, the astigmatism, the distortion aberration, and the coma aberration at the wide angle end (short focal end) in the no-extender state of the zoom lens according to Example 1 of the present invention illustrated in FIG. 1.
Figure 3:
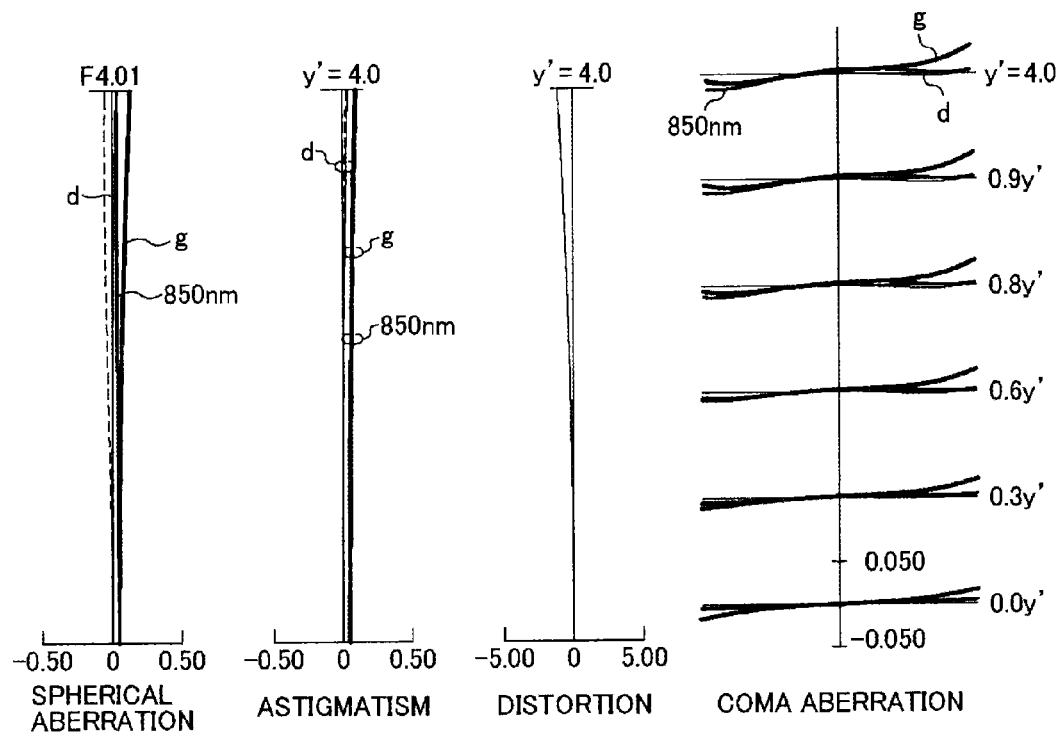
FIG. 3 is a diagram of aberration curves that illustrate the spherical aberration, the astigmatism, the distortion aberration, and the coma aberration at the intermediate focal length in the no-extender state of the zoom lens according to Example 1 of the present invention illustrated in FIG. 1.
Figure 4:
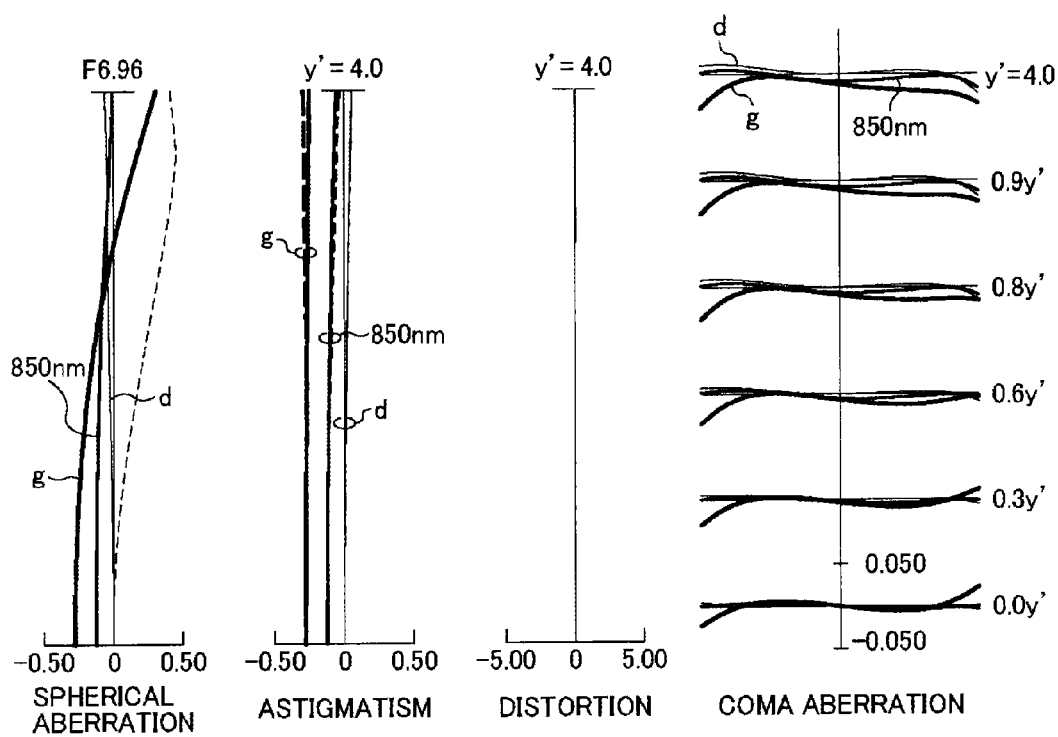
FIG. 4 is a diagram of aberration curves that illustrate the spherical aberration, the astigmatism, the distortion aberration, and the coma aberration at the telephoto end (long focal end) in the no-extender state of the zoom lens according to Example 1 of the present invention illustrated in FIG. 1.

$\theta_{C,A'}-0.0015 \times vd-0.255=-0.0034$ ... OHARA S-PHM53(L7) [3]:

$f_T/f_{DOE}=0.0176$ [4-1]:

$v_{1GP}=82.6$ [5]:

$(D_{34W}-D_{34T})/f_W=4.32$ [6]:

$L_4/T_{4F-I}=0.284$ [7]:

$v_{4GP}=81.5$ [8]:

$f_1/f_W=8.68$ [9]:

$f_2/f_W=-3.30$ [10]:

$f_3/f_W=-2.60$ [11]:

$f_4/f_W=-2.75$ [12]:

In addition, FIGS. 2, 3, and 4 respectively illustrate aberration diagrams of the spherical aberration, the astigmatism, the distortion aberration, and the lateral aberration at each of the wide angle end (short focus end), the intermediate focal length, and the telephoto end (long focus end) in the extender not-present state of Example 1. In such aberration diagrams, a broken line of the spherical aberration diagram represents a sine condition. In addition, in the astigmatism diagram, a solid line represents the sagittal, and a broken line represents the meridional. These are similarly applied to the aberration diagrams of the other examples.

Example 1

Including Extender

Next, in the extender lens group EX-including state illustrated in FIGS. 5A to 5C in which the extender lens group EX is inserted to the image side of the fourth lens group G4 in the extender lens group EX not-present configuration of Example 1 described above, the focal length f of the entire optical system, the F number, and the half field angle ω respectively change in the ranges of f=33.9 to 968, F=7.96 to 13.8, and ω=6.78 to 0.235. The optical characteristics of each optical element are as illustrated in the following Table 4.

TABLE 4

| OPTICAL CHARACTERISTICS ||||||||
|---|---|---|---|---|---|---|---|
| SURFACE NUMBER | r | d | nd | vd | $\theta_{C,A'}$ | MATERIAL/GLASS TYPE | REMARK |
| 01 | 144.855 | 2.50 | 1.83400 | 37.16 | 0.3245 | OHARA S-LAH60 | L1 G1 |
| 02 | 76.469 | 0.10 | 1.64310 | 38.82 | 0.3124 | RESIN MATERIAL | P1 |
| 03# | 76.469 | 0.10 | 1.61505 | 26.54 | 0.2831 | RESIN MATERIAL | P2 |
| 04 | 76.469 | 10.59 | 1.48749 | 70.24 | 0.3633 | OHARA S-FSL5 | L2 |
| 05 | 19773.507 | 0.20 | | | | | |
| 06 | 74.791 | 10.29 | 1.43875 | 94.94 | 0.3529 | OHARA S-FPL53 | L3 |
| 07 | 1414.256 | VARIABLE dA | | | | | |
| 08 | −168.994 | 2.00 | 1.61800 | 63.33 | 0.3454 | OHARA S-PHM52 | L4 G2 |
| 09 | 73.668 | 0.20 | | | | | |
| 10 | 50.000 | 7.46 | 1.80000 | 29.84 | 0.3117 | OHARA S-NBH55 | L5 |
| 11 | −161.070 | 2.00 | 1.74320 | 49.34 | 0.3414 | OHARA S-LAM60 | L6 |
| 12 | 33.127 | VARIABLE dB | | | | | |
| 13 | −55.514 | 1.50 | 1.60300 | 65.44 | 0.3498 | OHARA S-PHM53 | L7 G3 |
| 14 | 19.259 | 2.83 | 1.85026 | 32.27 | 0.3145 | OHARA S-LAH71 | L8 |
| 15 | 34.731 | VARIABLE dC | | | | | |
| 16 | ∞ | 1.00 | 1.51633 | 64.14 | | ADJUSTMENT FILTER | ND |
| 17 | ∞ | 0.90 | | | | | |
| 18 | DIAPHRAGM | 2.50 | | | | | AD |
| 19 | 68.120 | 3.62 | 1.49700 | 81.54 | 0.3501 | OHARA S-FPL51 | L9 G4 |
| 20 | −64.999 | 0.20 | | | | | |
| 21 | 36.048 | 3.73 | 1.49700 | 81.54 | 0.3501 | OHARA S-FPL51 | L10 |
| 22 | −253.146 | 0.20 | | | | | |
| 23 | 25.441 | 4.97 | 1.49700 | 81.54 | 0.3501 | OHARA S-FPL51 | L11 |
| 24 | −53.850 | 1.55 | 1.83400 | 37.16 | 0.3245 | OHARA S-LAH60 | L12 |
| 25 | 23.762 | 2.83 | | | | | |
| 26 | −34.001 | 1.50 | 1.48749 | 70.24 | 0.3633 | OHARA S-FSL5 | L13 |
| 27 | 20.000 | 5.40 | 1.54072 | 47.23 | 0.3353 | OHARA S-TIL2 | L14 |
| 28 | −30.706 | 4.963 | | | | | |
| 29 | 19.259 | 3.82 | 1.49700 | 81.54 | 0.3501 | OHARA S-FPL51 | E1 EX |
| 30 | −95.908 | 2.72 | | | | | |
| 31 | 170.947 | 2.68 | 1.48749 | 70.24 | 0.3633 | OHARA S FSL5 | E2 |
| 32 | −20.944 | 1.50 | 1.60562 | 43.71 | 0.3289 | OHARA S-BAM4 | E3 |
| 33 | 38.745 | 8.16 | | | | | |

TABLE 4-continued

OPTICAL CHARACTERISTICS

| SURFACE NUMBER | r | d | nd | vd | $\theta_{C,A'}$ | MATERIAL/GLASS TYPE | REMARK |
|---|---|---|---|---|---|---|---|
| 34 | −277.384 | 2.77 | 1.84666 | 23.78 | 0.3035 | OHARA S-TIH53 | E4 |
| 35 | −7.574 | 1.50 | 1.80610 | 40.93 | 0.3289 | OHARA S-LAH53 | E5 |
| 36 | 9.852 | 29.221 | | | | | |
| 37 | ∞ | 3.50 | 1.51633 | 64.14 | | FILTER AND THE LIKE | FG |
| 38 | ∞ | 1.000 | | | | | |

In Table 4, the first lens group G1 to the fourth lens group G4 are completely the same as those illustrated in Table 1, and the extender lens group EX is arranged to be inserted between the fourth lens group G4 and the filter and the like FG. Thus, a diffraction surface in which "#" is represented to be attached to the surface number is the same as that of the case illustrated in Table 1. In addition, the material of each lens is also represented in Table 4. These are similar in the other examples.

In other words, in Table 4, the third surface to which "#" is attached is a diffraction surface, and the parameters of the diffraction surface represented in Expression [21] are the same as those described with reference to Table 1 as follows.
Diffraction Surface: Third Surface $\lambda = 587.56$ (nm)

$C_2 = -1.80594 \times 10^{-5}$ $C_4 = 1.02994 \times 10^{-9}$

In the extender-including state of this Example 1, the focal length f of the entire optical system, a variable gap dA between the first lens group G1 and the second lens group G2, a variable gap dB between the second lens group G2 and the third lens group G3, and a gap dC between the third lens group G3 and the adjustment filter ND at each of the wide angle end (short focus end), the intermediate focal length, and the telephoto end (long focus end) change in accordance with zooming as in the following Table 5, to be almost similar to Table 2. Here, substantially, differences between Table 5 and Table 2 are only the focal lengths f of the entire optical system at the wide angle end, the intermediate focal length and the telephoto end.

TABLE 5

VARIABLE GAP

| VARIABLE GAP | WIDE ANGLE END f = 33.92 | INTERMEDIATE FOCAL LENGTH f = 181.5 | TELEPHOTO END f = 968.1 |
|---|---|---|---|
| dA | 5.400 | 77.984 | 91.096 |
| dB | 66.759 | 6.083 | 54.757 |
| dC | 76.794 | 64.886 | 3.100 |

In the extender-including state of this Example 1, the focal length f of the entire optical system, the magnification of the second lens group G2, the magnification of the third lens group G3, the magnification of the fourth lens group G4, and the magnification of the extender lens group EX at each of the wide angle end, the intermediate focal length, and the telephoto end change in accordance with zooming as in the following Table 6.

TABLE 6

MAGNIFICATION OF EACH LENS GROUP

| | MAGNIFICATION | | |
|---|---|---|---|
| | WIDE ANGLE END f = 33.92 | INTERMEDIATE FOCAL LENGTH f = 181.5 | TELEPHOTO END f = 968.1 |
| SECOND LENS GROUP G2 | −0.821 | 14.545 | 3.320 |
| THIRD LENS GROUP G3 | 0.206 | −0.0623 | −1.455 |
| FOURTH LENS GROUP G4 | −0.680 | −0.680 | −0.680 |
| EXTENDER EX | 1.987 | 1.987 | 1.987 |

In this case, values corresponding to Conditional Expressions [4-2] and [13] are as follows, and each of Conditional Expression [4-2] and Conditional Expression [13] is satisfied.
<Conditional Expression Numerical Values>

$f_{TC}/f_{DOE} = 0.0350$      [4-2]:

$f_E/f_W = -1.44$      [13]:

In addition, FIGS. 6, 7, and 8 respectively illustrate aberration diagrams of the spherical aberration, the astigmatism, the distortion aberration, and the lateral aberration at each of the wide angle end, the intermediate focal length, and the telephoto end (long focus end) in the extender-including state of Example 1. In such aberration diagrams, a broken line of the spherical aberration diagram represents a sine condition. In addition, in the astigmatism diagram, a solid line represents the sagittal, and a broken line represents the meridional. These are similarly applied to the aberration diagrams of the other examples.

Second Embodiment

Next, a zoom lens according to a specific example of Example 2 as the second embodiment of the present invention described above will be described in detail.

Example 2

Example 2 is an example (numerical example) of a specific configuration of the zoom lens according to the second embodiment of the present invention.

FIGS. 9 to 16 illustrate the zoom lens according to Example 2 as the second embodiment of the present invention. FIGS. 9 to 12 illustrate a state in which an extender lens group is not inserted on an optical path but is retracted from the inside of the optical path, and FIGS. 13 to 16 illustrate a state in which an extender lens group EX is inserted on an optical path between a fourth lens group G4 and an image surface.

FIGS. 9(a), 9(b), and 9(c) are diagrams that schematically illustrate the configuration of the optical system and a zoom locus accompanied with zooming in a state in which the extender lens group EX is not inserted on the optical path but is retracted from the inside of the optical path, in other words, an extender lens group EX not-present state, and FIGS. 13(a), 13(b), and 13(c) are diagrams that schematically illustrate the configuration of the optical system and a zoom locus accompanied with zooming in a state in which the extender lens group EX is inserted on the optical path between the fourth lens group 4G and the image surface, in other words, an extender lens group EX-including state. In these diagrams, FIGS. 9(a) and 13(a), FIGS. 9(b) and 13(b), and FIGS. 9(c) and 13(c) respectively illustrate the arrangement configurations of the optical system in states of the wide angle end (short focus end), the intermediate focal length, and the telephoto end (long focus end).

In other words, FIGS. 9(a), 9(b), and 9(c) schematically illustrate the lens configurations of the optical system of the zoom lens of Example 2 according to the second embodiment of the present invention in the extender lens group EX not-present state and a zoom locus accompanied with zooming from the short focus end, in other words, the wide angle end to the long focus end, in other words, the telephoto end through a predetermined intermediate focal length. FIG. 9(a) is a cross-sectional view at the short focus end, in other words, the wide angle end along the optical axis, FIG. 9(b) is a cross-sectional view at the predetermined intermediate focal length along the optical axis, and FIG. 9(c) is a cross-sectional view at the long focus end, in other words, the telephoto end along the optical axis.

In addition, FIGS. 13(a), 13(b), and 13(c) schematically illustrate the lens configurations of the optical system of the zoom lens of Example 2 according to the second embodiment of the present invention in the extender lens group EX-including state and a zoom locus accompanied with zooming from the short focus end, in other words, the wide angle end to the long focus end, in other words, the telephoto end through a predetermined intermediate focal length. FIG. 13(a) is a cross-sectional view at the short focus end, in other words, the wide angle end along the optical axis, FIG. 13(b) is a cross-sectional view at the predetermined intermediate focal length along the optical axis, and FIG. 13(c) is a cross-sectional view at the long focus end, in other words, the telephoto end along the optical axis. In FIGS. 9(a) to 9(c) and FIGS. 13(a) to 13(c) representing the lens group arrangements of Example 2, the left side is the object (subject) side, and the right side is the image side (imaging device side).

In the zoom lenses illustrated in FIGS. 9(a) to 9(c) and FIGS. 13(a) to 13(c), from the object side to the image side, a first lens group G1 having positive refractive power, a second lens group G2 having negative refractive power, a third lens group G3 having negative refractive power, and a fourth lens group G4 having positive refractive power are sequentially arranged. In addition, the extender lens group EX is arranged so as to be insertable/detachable to/from the image side of the fourth lens group G4, and an adjustment filter ND and an aperture diaphragm AD are arranged between the third lens group G3 and the fourth lens group G4.

The first lens group G1 is configured by sequentially arranging a first lens L1, second lens L2, and a third lens L3 from the object side to the image side. The second lens group G2 is configured by sequentially arranging a fourth lens L4, a fifth lens L5, and a sixth lens L6 from the object side to the image side. The third lens group G3 is configured by sequentially arranging a seventh lens L7 and an eighth lens L8 from the object side to the image side. The fourth lens group G4 is configured by sequentially arranging a ninth lens L9, a tenth lens L10, an eleventh lens L11, a twelfth lens L12, a thirteenth lens L13, and a fourteenth lens L14 from the object side to the image side. In addition, the extender lens group EX, as illustrated in FIGS. 13(a) to 13(c), is configured by an extender lens front group EXF configured by a first lens E1, a second lens E2, and a third lens E3 sequentially from the object side to the image side and an extender lens rear group EXR configured by a fourth lens E4 and a fifth lens E5. The extender lens front group EXF has positive refractive power as a whole, and the extender lens rear group EXR has negative refractive power as a whole. In addition, between the third lens group G3 and the fourth lens group G4, from the object side to the image side, the adjustment filter ND and the aperture diaphragm AD are sequentially arranged so as to be interposed. Furthermore, the filter and the like FG are interposed, in the extender lens group EX not-present state, between the fourth lens group G4 and the image surface and, in the extender lens group EX-including state, between the extender lens group EX and the image surface.

The first lens group G1 to the fourth lens group G4 are respectively supported by an appropriate common support frame or the like for each group and are integrally operated for each group at the time of performing an operation such as a zooming operation, and the aperture diaphragm AD operates integrally with the fourth lens group G4. In FIGS. 9(a) to 9(c), the surface number of each optical surface is also illustrated. In a case where the focal length is extended by supporting the extender lens group EX using a drive mechanism used for inserting/detaching the extender lens group EX to/from the appropriate support frame and the optical axis or the like, the extender lens group EX is inserted on the optical axis between the fourth lens group G4 and the filter and the like FG. On the other hand, in a case where the focal length is not extended, the extender lens group EX is retracted from the optical path between the fourth lens group G4 and the filter and the like FG. In FIGS. 13(a) to 13(c), the surface number of each optical face is also illustrated.

When zooming from the wide angle end (short focus end) to the telephoto end (long focus end) is performed, the first lens group G1 and the fourth lens group G4 are fixedly positioned without moving, and the second lens group G2 and the third lens group G3 move such that a gap dA between the first lens group G1 and the second lens group G2 increases, a gap dB between the second lens group G2 and the third lens group G3 once decreases at the intermediate focal length and thereafter increases, and a gap between the third lens group G3 and the fourth lens group G4 decreases.

Now, a further detailed lens configuration of the zoom lens according to Example 2 illustrated in FIGS. 9(a) to 9(c) and FIGS. 13(a) to 13(c) will be described.

In the first lens group G1, from the object side to the image side, a first lens L1 that is configured by a negative meniscus lens having an concave surface directed toward the image side, a diffraction optical element that is configured to include a first resin layer formed by using a thin resin material and a second resin layer formed by using a thin resin layer, a second lens L2 configured by a positive meniscus lens having a convex surface directed toward the object side, and a third lens L3 that is configured by a positive meniscus having a convex surface directed toward the object side are sequentially arranged. Two lenses including the first lens L1 and the second lens L2 are integrally bonded by being closely put together with the first resin layer and the second resin layer being interposed between so as to form a cemented lens. Here, a diffractive surface is formed on the boundary face between the first resin layer and the second resin layer, and the cemented lens as a diffractive optical element is configured by the first lens L1, the first resin layer, the second resin layer, and the second lens L2 that are integrally bonded.

In the second lens group G2, from the object side to the image side, a fourth lens L4 that is configured by a biconcave lens having a concave surface, which has a curvature larger than the object-side surface, directed toward the image side, a fifth lens L5 that is configured by a biconvex lens having a convex surface, which has a curvature larger than the image-surface side, directed toward the object side, and a sixth lens L6 that is configured by a biconcave lens having a concave surface, which has a curvature larger than the object-side surface, directed toward the image side are sequentially arranged. Two lenses including the fifth lens L5 and the sixth lens L6 are integrally bonded by being closely put together so as to form a cemented lens that is formed by two-lens bonding.

In the third lens group G3, from the object side to the image side, a seventh lens L7 that is configured by a biconcave lens having a concave surface, which has a curvature larger than the object-side surface, directed toward the image side and an eighth lens L8 that is configured by a positive meniscus lens having a convex surface directed toward the object side are sequentially arranged. Two lenses including the seventh lens L7 and the eighth lens L8 are integrally bonded by being closely put together so as to form a cemented lens that is formed by two-lens bonding.

The adjustment filter ND that is configured by an optical amount adjustment filter such as an ND (neutral density) darkening filter having a parallel plate shape is arranged to be interposed between the third lens group G3 and the fourth lens group G4, and the aperture diaphragm AD is arranged to be interposed between the adjustment filter ND and the fourth lens group G4.

In the fourth lens group G4, from the object side to the image side, a ninth lens L9 that is configured by a biconvex lens having a convex surface, which has a curvature larger than the object-side surface, directed toward the image side, a tenth lens L10 that is configured by a biconvex lens having a convex surface, which has a curvature larger than the image-side surface, directed toward the object side, an eleventh lens L11 that is configured by a biconvex lens having a convex surface, which has a curvature larger than the image-side surface, directed toward the object side, a twelfth lens L12 that is configured by a biconcave lens having a concave surface, which has a curvature larger than the object-side surface, directed toward the image side, a thirteenth lens L13 that is configured by a biconcave lens having a concave surface, which has a curvature larger than the object-side surface, directed toward the image side, and a fourteenth lens L14 that is configured by a biconvex lens having a convex surface, which has a curvature larger than the image-side surface, directed toward the object side are sequentially arranged.

Two lenses including the eleventh lens L11 and the twelfth lens L12 are integrally bonded by being closely put together so as to form a cemented lens that is formed by two-lens bonding. In addition, two lenses including the thirteenth lens L13 and the fourteenth lens L14 are integrally bonded by being closely put together so as to form a cemented lens that is formed by two-lens bonding.

Referring to FIG. 13, in the extender lens group EX, from the object side to the image side, a first lens E1 that is configured by a biconvex lens having a convex surface, which has a curvature larger than the image-side surface, directed toward the object side, a second lens E2 that is configured by a positive meniscus lens having a concave surface directed toward the object side, a third lens E3 that is configured by a biconcave lens having a concave surface, which has a curvature larger than the object-side surface, directed toward the image side, a fourth lens E4 that is configured by a biconvex lens having a convex surface, which has a curvature larger than the object-side surface, directed toward the image side, and a fifth lens E5 that is configured by a biconcave lens having a concave surface, which has a curvature larger than the image-side surface, directed toward the object side are sequentially arranged. Two lenses including the second lens E2 and the third lens E3 are integrally bonded by being closely put together so as to form a cemented lens that is formed by two-lens bonding. In addition, two lenses including the fourth lens E4 and the fifth lens E5 are integrally bonded by being closely put together so as to form a cemented lens that is formed by two-lens bonding. As described above, in a case where the focal length is extended, this extender lens group EX is inserted on the optical axis between the fourth lens group G4 and the filter and the like FG. On the other hand, in a case where the focal length is not extended, this extender lens group EX is retracted from the optical path between the fourth lens group G4 and the filter and the like FG.

Various optical filters each having a parallel plate shape and a filter and the like FG such as the cover glass of a light reception imaging device are arranged on the image-surface side of the fourth lens group G4 in a case where the extender lens group EX is not inserted on the optical path disposed on the image-surface side of the fourth lens group G4 and are arranged on the image-surface side of the extender lens group EX in a case where the extender lens group EX is inserted on the optical path disposed on the image-surface side of the fourth lens group G4.

In this case, as illustrated in FIGS. 9A to 9C and FIGS. 13A to 13C, in accordance with zooming from the wide angle end (short focus end) to the telephoto end (long focus end), the first lens group G1 and the fourth lens group G4 are fixedly positioned without moving, the second lens group G2 moves much from the object side to the image side from the wide angle end to the intermediate focal length and moves a little from the object side to the image side from the intermediate focal length to the telephoto end, and the third lens group G3 moves a little from the object side to the image side from the wide angle end to the intermediate focal length and moves much from the object side to the image side from the intermediate focal length to the telephoto end.

This Example 2 will be described with reference to the extender lens group EX not-present state illustrated in FIGS. 9A to 9C and the extender lens group EX-including state illustrated in FIGS. 13A to 13C in a divisional manner.

Example 2

Extender Not-Present

First, in the extender lens group EX not-present state, illustrated in FIGS. 9A to 9C, of Example 2, the focal length f of the entire optical system, the F number, and the half field angle ω respectively change in the ranges of f=17.1 to 486, F=4.00 to 6.95, and ω=14.2 to 0.471. The optical characteristics of each optical element are as illustrated in the following

TABLE 7

OPTICAL CHARACTERISTICS

| SURFACE NUMBER | r | d | nd | vd | $\theta_{C, A'}$ | MATERIAL/GLASS TYPE | REMARK | |
|---|---|---|---|---|---|---|---|---|
| 01 | 138.534 | 2.50 | 1.83400 | 37.16 | 0.3245 | OHARA S-LAH60 | L1 | G1 |
| 02 | 75.010 | 0.10 | 1.64310 | 38.82 | 0.3124 | RESIN MATERIAL | P1 | |
| 03# | 75.010 | 0.10 | 1.61505 | 26.54 | 0.2831 | RESIN MATERIAL | P2 | |
| 04 | 75.010 | 10.72 | 1.48749 | 70.24 | 0.3633 | OHARA S-FSL5 | L2 | |
| 05 | 9346.827 | 0.20 | | | | | | |
| 06 | 73.420 | 10.32 | 1.43875 | 94.94 | 0.3529 | OHARA S-FPL53 | L3 | |
| 07 | 1141.217 | VARIABLE dA | | | | | | |
| 08 | −211.333 | 2.00 | 1.59522 | 67.73 | 0.3431 | OHARA S-FPM2 | L4 | G2 |
| 09 | 85.820 | 0.20 | | | | | | |
| 10 | 50.000 | 8.57 | 1.68893 | 31.07 | 0.3142 | OHARA S-TIM28 | L5 | |
| 11 | −72.415 | 2.00 | 1.74320 | 49.34 | 0.3414 | OHARA S-LAM60 | L6 | |
| 12 | 32.269 | VARIABLE dB | | | | | | |
| 13 | −46.892 | 1.50 | 1.59522 | 67.73 | 0.3431 | OHARA S-FPM2 | L7 | G3 |
| 14 | 16.804 | 2.86 | 1.85026 | 32.27 | 0.3145 | OHARA S-LAH71 | L8 | |
| 15 | 29.833 | VARIABLE dC | | | | | | |
| 16 | ∞ | 1.00 | 1.51633 | 64.14 | | ADJUSTMENT FILTER | ND | |
| 17 | ∞ | 0.90 | | | | | | |
| 18 | DIAPHRAGM | 2.50 | | | | | AD | |
| 19 | 71.102 | 3.88 | 1.43875 | 94.94 | 0.3529 | OHARA S-FPL53 | L9 | G4 |
| 20 | −49.574 | 0.20 | | | | | | |
| 21 | 33.482 | 3.99 | 1.49700 | 81.54 | 0.3501 | OHARA S-FPL51 | L10 | |
| 22 | −174.686 | 0.21 | | | | | | |
| 23 | 23.063 | 4.97 | 1.49700 | 81.54 | 0.3501 | OHARA S-FPL51 | L11 | |
| 24 | −59.924 | 3.33 | 1.83400 | 37.16 | 0.3245 | OHARA S-LAH60 | L12 | |
| 25 | 20.958 | 2.86 | | | | | | |
| 26 | −31.574 | 1.50 | 1.48749 | 70.24 | 0.3633 | OHARA S-FSL5 | L13 | |
| 27 | 20.000 | 5.03 | 1.54814 | 45.78 | 0.3331 | OHARA S-TIL1 | L14 | |
| 28 | −31.180 | 51.371 | | | | | | |
| 29 | ∞ | 3.50 | 1.51633 | 64.14 | | FILTER AND THE LIKE | FG | |
| 30 | ∞ | 1.000 | | | | | | |

In Table 7, an optical surface represented with "#" being attached to the surface number is a diffraction surface. In addition, in Table 7, the material of each lens is also represented. These are similar in the other examples.

In other words, in Table 7, the third surface to which "#" is attached is a diffraction surface, and the parameters of the diffraction surface represented in Expression [21] are as follows.

Diffraction Surface: Third Surface $\lambda = 587.56$ (nm)

$C_2 = -2.05523 \times 10^{-5}$ $C_4 = 8.88676 \times 10^{-10}$

In the extender not-present state of this Example 2, the focal length f of the entire optical system, a variable gap dA between the first lens group G1 and the second lens group G2, a variable gap dB between the second lens group G2 and the third lens group G3, and a gap dC between the third lens group G3 and the adjustment filter ND at each of the wide angle end (short focus end), the intermediate focal length, and the telephoto end (long focus end) change in accordance with zooming as in the following Table 8.

TABLE 8

| VARIABLE GAP | WIDE ANGLE END f = 17.08 | INTERMEDIATE FOCAL LENGTH f = 91.53 | TELEPHOTO END f = 486.2 |
|---|---|---|---|
| dA | 7.192 | 75.842 | 89.762 |
| dB | 65.781 | 6.155 | 43.715 |
| dC | 63.691 | 54.667 | 3.187 |

In the extender not-present state of this Example 2, the focal length f of the entire optical system, the magnification of the second lens group G2, the magnification of the third lens group G3, and the magnification of the fourth lens group G4 at each of the wide angle end (short focus end), the intermediate focal length, and the telephoto end (long focus end) change in accordance with zooming as in the following Table 9.

TABLE 9

MAGNIFICATION OF EACH LENS GROUP

| | MAGNIFICATION | | |
|---|---|---|---|
| | WIDE ANGLE END f = 17.08 | INTERMEDIATE FOCAL LENGTH f = 91.53 | TELEPHOTO END f = 486.2 |
| SECOND LENS GROUP G2 | −0.787 | 19.702 | 3.137 |
| THIRD LENS GROUP G3 | 0.194 | −0.0415 | −1.383 |
| FOURTH LENS GROUP G4 | −0.777 | −0.777 | −0.777 |

In this case, values corresponding to Conditional Expressions [1] to [3], Conditional Expression [4-1], Conditional Expression [5], Conditional Expression [6], Conditional Expression [7], Conditional Expression [8], and Conditional Expressions [9] to [12] are as follows, and each of Conditional Expressions [1] to [3], Conditional Expression [4-1], Conditional Expression [5], Conditional Expression [6], Conditional Expression [7], Conditional Expression [8], and Conditional Expressions [9] to [12] is satisfied.

<Conditional Expression Numerical Values>

$nd = 1.59522 (L4; L7)$     [1]:

$vd = 67.73 (L4; L7)$     [2]:

$\theta_{C,A'}$-0.0015×vd-0.255=-0.0135 ... OHARA S-FPM2(L4;L7)    [3]:

$f_T/f_{DOE}$=0.0200    [4-1]:

$v_{1GP}$=82.6    [5]:

$(D_{34W}-D_{34T})/f_W$=3.54    [6]:

$L_4/T_{4F-I}$=0.322    [7]:

$v_{4GP}$=86.0    [8]:

$f_1/f_W$=8.45    [9]:

$f_2/f_W$=-3.04    [10]:

$f_3/f_W$=-2.25    [11]:

$f_4/f_W$=2.48    [12]:

diagram represents a sine condition. In addition, in the astigmatism diagram, a solid line represents the sagittal, and a broken line represents the meridional. These are similarly applied to the aberration diagrams of the other examples.

Example 2

Including Extender

Next, in the extender lens group EX-including state illustrated in FIGS. 13A to 13C in which the extender lens group EX is inserted to the image side of the fourth lens group G4 in the extender lens group EX not-present configuration of Example 2 described above, the focal length f of the entire optical system, the F number, and the half field angle ω respectively change in the ranges of f=33.5 to 954, F=7.85 to 13.6, and ω=6.85 to 0.237. The optical characteristics of each optical element are as illustrated in the following Table 10.

TABLE 10

OPTICAL CHARACTERISTICS

| SURFACE NUMBER | r | d | nd | vd | $\theta_{C,A'}$ | MATERIAL/GLASS TYPE | REMARK | |
|---|---|---|---|---|---|---|---|---|
| 01 | 138.534 | 2.50 | 1.83400 | 37.16 | 0.3245 | OHARA S-LAH60 | L1 | G1 |
| 02 | 75.010 | 0.10 | 1.64310 | 38.82 | 0.3124 | RESIN MATERIAL | P1 | |
| 03# | 75.010 | 0.10 | 1.61505 | 26.54 | 0.2831 | RESIN MATERIAL | P2 | |
| 04 | 75.010 | 10.72 | 1.48749 | 70.24 | 0.3633 | OHARA S-FSL5 | L2 | |
| 05 | 9346.827 | 0.20 | | | | | | |
| 06 | 73.420 | 10.32 | 1.43875 | 94.94 | 0.3529 | OHARA S-FPL53 | L3 | |
| 07 | 1141.217 | VARIABLE dA | | | | | | |
| 08 | -211.333 | 2.00 | 1.59522 | 67.73 | 0.3431 | OHARA S-FPM2 | L4 | G2 |
| 09 | 85.820 | 0.20 | | | | | | |
| 10 | 50.000 | 8.57 | 1.68893 | 31.07 | 0.3142 | OHARA S-TIM28 | L5 | |
| 11 | -72.415 | 2.00 | 1.74320 | 49.34 | 0.3414 | OHARA S-LAM60 | L6 | |
| 12 | 32.269 | VARIABLE dB | | | | | | |
| 13 | -46.892 | 1.50 | 1.59522 | 67.73 | 0.3431 | OHARA S-FPM2 | L7 | G3 |
| 14 | 16.804 | 2.86 | 1.85026 | 32.27 | 0.3145 | OHARA S-LAH71 | L8 | |
| 15 | 29.833 | VARIABLE dC | | | | | | |
| 16 | ∞ | 1.00 | 1.51633 | 64.14 | | ADJUSTMENT FILTER | ND | |
| 17 | ∞ | 0.90 | | | | | | |
| 18 | DIAPHRAGM | 2.50 | | | | | AD | |
| 19 | 71.102 | 3.88 | 1.43875 | 94.94 | 0.3529 | OHARA S-FPL53 | L9 | G4 |
| 20 | -49.574 | 0.20 | | | | | | |
| 21 | 33.482 | 3.99 | 1.49700 | 81.54 | 0.3501 | OHARA S-FPL51 | L10 | |
| 22 | -174.686 | 0.21 | | | | | | |
| 23 | 23.063 | 4.97 | 1.49700 | 81.54 | 0.3501 | OHARA S-FPL51 | L11 | |
| 24 | -59.924 | 3.33 | 1.83400 | 37.16 | 0.3245 | OHARA S-LAH60 | L12 | |
| 25 | 20.958 | 2.86 | | | | | | |
| 26 | -31.574 | 1.50 | 1.48749 | 70.24 | 0.3633 | OHARA S-FSL5 | L13 | |
| 27 | 20.000 | 5.03 | 1.54814 | 45.78 | 0.3331 | OHARA S-TIL1 | L14 | |
| 28 | -31.180 | 4.086 | | | | | | |
| 29 | 20.373 | 3.68 | 1.49700 | 81.54 | 0.3501 | OHARA S-FPL51 | E1 | EX |
| 30 | -91.838 | 1.88 | | | | | | |
| 31 | -198.726 | 2.43 | 1.48749 | 70.24 | 0.3633 | OHARA S-FSL5 | E2 | |
| 32 | -33.723 | 2.38 | 1.65844 | 50.88 | 0.3370 | OHARA S-BSM25 | E3 | |
| 33 | 32.345 | 11.37 | | | | | | |
| 34 | 345.188 | 2.70 | 1.80518 | 25.42 | 0.3054 | OHARA S-TIH6 | E4 | |
| 35 | -6.641 | 1.56 | 1.80610 | 40.93 | 0.3289 | OHARA S-LAH53 | E5 | |
| 36 | 9.719 | 21.285 | | | | | | |
| 37 | ∞ | 3.50 | 1.51633 | 64.14 | | FILTER AND THE LIKE | FG | |
| 38 | ∞ | 1.000 | | | | | | |

In addition, FIGS. 10, 11, and 12 respectively illustrate aberration diagrams of the spherical aberration, the astigmatism, the distortion aberration, and the lateral aberration at each of the wide angle end (short focus end), the intermediate focal length, and the telephoto end (long focus end) in the extender not-present state of Example 2. In such aberration diagrams, a broken line of the spherical aberration In Table 10, the first lens group G1 to the fourth lens group G4 are completely the same as those illustrated in Table 7, and the extender lens group EX is arranged to be inserted between the fourth lens group G4 and the filter and the like FG. Thus, a diffraction surface in which "#" is represented to be attached to the surface number is the same as that of the case illustrated in Table 7. In addition, the material of each lens is also represented in Table 10. These are similar in the other examples.

In other words, in Table 10, the third surface to which "#" is attached is a diffraction surface, and the parameters of the diffraction surface represented in Expression [21] are the same as those described with reference to Table 7 as follows.
Diffraction Surface: Third Surface $\lambda = 587.56$ (nm)

$C_2 = -2.05523 \times 10^{-5}$ $C_4 = 8.88676 \times 10^{-10}$

In the extender-including state of this Example 2, the focal length f of the entire optical system, a variable gap dA between the first lens group G1 and the second lens group G2, a variable gap dB between the second lens group G2 and the third lens group G3, and a gap dC between the third lens group G3 and the adjustment filter ND at each of the wide angle end (short focus end), the intermediate focal length, and the telephoto end (long focus end) change in accordance with zooming as in the following Table 11, to be almost similar to Table 8.

Here, substantially, differences between Table 11 and Table 8 are only the focal lengths f of the entire optical system at the wide angle end, the intermediate focal length and the telephoto end.

TABLE 11

| VARIABLE GAP | WIDE ANGLE END f = 33.50 | INTERMEDIATE FOCAL LENGTH f = 179.5 | TELEPHOTO END f = 953.7 |
|---|---|---|---|
| dA | 7.192 | 75.842 | 89.762 |
| dB | 65.781 | 6.155 | 43.715 |
| dC | 63.691 | 54.667 | 3.187 |

In the extender-including state of this Example 2, the focal length f of the entire optical system, the magnification of the second lens group G2, the magnification of the third lens group G3, the magnification of the fourth lens group G4, and the magnification of the extender lens group EX at each of the wide angle end, the intermediate focal length, and the telephoto end change in accordance with zooming as in the following Table 12.

TABLE 12

MAGNIFICATION OF EACH LENS GROUP

| | MAGNIFICATION | | |
|---|---|---|---|
| | WIDE ANGLE END f = 33.50 | INTERMEDIATE FOCAL LENGTH f = 179.5 | TELEPHOTO END f = 953.7 |
| SECOND LENS GROUP G2 | −0.787 | 19.702 | 3.137 |
| THIRD LENS GROUP G3 | 0.194 | −0.0415 | −1.383 |
| FOURTH LENS GROUP G4 | −0.777 | −0.777 | −0.777 |
| EXTENDER EX | 1.962 | 1.962 | 1.962 |

In this case, values corresponding to Conditional Expressions [4-2] and [13] are as follows, and each of Conditional Expression [4-2] and Conditional Expression [13] is satisfied.

<Conditional Expression Numerical Values>

$f_{TC}/f_{DOE} = 0.0392$ [4-2]:

$f_E/f_W = -1.15$ [13]:

In addition, FIGS. 14, 15, and 16 respectively illustrate aberration diagrams of the spherical aberration, the astigmatism, the distortion aberration, and the lateral aberration at each of the wide angle end, the intermediate focal length, and the telephoto end (long focus end) in the extender-including state of Example 2. In such aberration diagrams, a broken line of the spherical aberration diagram represents a sine condition. In addition, in the astigmatism diagram, a solid line represents the sagittal, and a broken line represents the meridional. These are similarly applied to the aberration diagrams of the other examples.

Third Embodiment

Next, a zoom lens according to a specific example of Example 3 as the third embodiment of the present invention described above will be described in detail.

Example 3

Example 3 is an example (numerical example) of a specific configuration of the zoom lens according to the third embodiment of the present invention.

FIGS. 17 to 24 illustrate the zoom lens according to Example 3 as the third embodiment of the present invention. FIGS. 17 to 20 illustrate a state in which an extender lens group is not inserted on an optical path but is retracted from the inside of the optical path, and FIGS. 21 to 24 illustrate a state in which an extender lens group EX is inserted on an optical path between a fourth lens group 4G and an image surface.

FIGS. 17(a), 17(b), and 17(c) are diagrams that schematically illustrate the configuration of the optical system in a state in which the extender lens group EX is not inserted on the optical path but is retracted from the inside of the optical path, in other words, an extender lens group EX not-present state, and FIGS. 21(a), 21(b), and 21(c) are diagrams that schematically illustrate the configuration of the optical system and a zoom locus accompanied with zooming in a state in which the extender lens group EX is inserted on the optical path between the fourth lens group 4G and the image surface, in other words, an extender lens group EX-including state. In these diagrams, FIGS. 17(a) and 21(a), FIGS. 17(b) and 21(b), and FIGS. 17(c) and 21(c) respectively illustrate the arrangement configurations of the optical system in states of the wide angle end (short focus end), the intermediate focal length, and the telephoto end (long focus end).

In other words, FIGS. 17(a), 17(b), and 17(c) schematically illustrate the lens configurations of the optical system of the zoom lens of Example 3 according to the third embodiment of the present invention in the extender lens group EX not-present state and a zoom locus accompanied with zooming from the short focus end, in other words, the wide angle end to the long focus end, in other words, the telephoto end through a predetermined intermediate focal length. FIG. 17(a) is a cross-sectional view at the short focus end, in other words, the wide angle end along the optical axis, FIG. 17(b) is a cross-sectional view at the predetermined intermediate focal length along the optical axis, and FIG. 17(c) is a cross-sectional view at the long focus end, in other words, the telephoto end along the optical axis. In addition, FIGS. 21(a), 21(b), and 21(c) schematically illustrate the lens configurations of the optical system of the zoom lens of Example 3 according to the third embodiment of the present invention in the extender lens group EX-including state and a zoom locus accompanied with zooming from the short focus end, in other words, the wide angle end to the long focus end, in other words, the telephoto end through a predetermined intermediate focal length. FIG. 21(a) is a cross-sectional view at the short focus end, in other words, the wide angle end along the optical axis, FIG. 21(b) is a cross-sectional view at the predetermined intermediate focal length along the optical axis, and FIG. 21(c) is a cross-sectional view at the long focus end, in other words, the telephoto end along the optical axis. In FIGS. 17(a) to 17(c) and FIGS. 21(a) to 21(c) representing the lens group arrangements of Example 3, the left side is the object (subject) side, and the right side is the image side (imaging device side).

In the zoom lenses illustrated in FIGS. 17(a) to 17(c) and FIGS. 21(a) to 21(c), from the object side to the image side, a first lens group G1 having positive refractive power, a second lens group G2 having negative refractive power, a third lens group G3 having negative refractive power, and a fourth lens group G4 having positive refractive power are sequentially arranged. In addition, the extender lens group EX is arranged so as to be insertable/detachable to/from the image side of the fourth lens group G4, and an adjustment filter ND and an aperture diaphragm AD are arranged between the third lens group G3 and the fourth lens group G4.

The first lens group G1 is configured by sequentially arranging a first lens L1, a second lens L2, and a third lens L3 from the object side to the image side. The second lens group G2 is configured by sequentially arranging a fourth lens L4, a fifth lens L5, and a sixth lens L6 from the object side to the image side. The third lens group G3 is configured by sequentially arranging a seventh lens L7 and an eighth lens L8 from the object side to the image side. The fourth lens group G4 is configured by sequentially arranging a ninth lens L9, a tenth lens L10, an eleventh lens L11, a twelfth lens L12, a thirteenth lens L13, and a fourteenth lens L14 from the object side to the image side. In addition, the extender lens group EX, as illustrated in FIGS. 21(a) to 21(c), is configured by an extender lens front group EXF configured by a first lens E1, a second lens E2, and a third lens E3 sequentially from the object side to the image side and an extender lens rear group EXR configured by a fourth lens E4 and a fifth lens E5.

The extender lens front group EXF has positive refractive power as a whole, and the extender lens rear group EXR has negative refractive power as a whole. In addition, between the third lens group G3 and the fourth lens group G4, from the object side to the image side, the adjustment filter ND and the aperture diaphragm AD are sequentially arranged so as to be interposed. Furthermore, the filter and the like FG are interposed, in the extender lens group EX not-present state, between the fourth lens group G4 and the image surface and, in the extender lens group EX-including state, between the extender lens group EX and the image surface.

The first lens group G1 to the fourth lens group G4 are respectively supported by an appropriate common support frame or the like for each group and are integrally operated for each group at the time of performing an operation such as a zooming operation, and the aperture diaphragm AD operates integrally with the fourth lens group G4. In FIGS. 17(a) to 17(c), the surface number of each optical surface is also illustrated. In a case where the focal length is extended by supporting the extender lens group EX using a drive mechanism used for inserting/detaching the extender lens group EX to/from the appropriate support frame and the optical axis or the like, the extender lens group EX is inserted on the optical axis between the fourth lens group G4 and the filter and the like FG. On the other hand, in a case where the focal length is not extended, the extender lens group EX is retracted from the optical path between the fourth lens group G4 and the filter and the like FG. In FIGS. 21(a) to (c), the surface number of each optical face is also illustrated.

When zooming from the wide angle end (short focus end) to the telephoto end (long focus end) is performed, the first lens group G1 and the fourth lens group G4 are fixedly positioned without moving. In addition, the second lens group G2 and the third lens group G3 move such that a gap dA between the first lens group G1 and the second lens group G2 increases, a gap dB between the second lens group G2 and the third lens group G3 once decreases at the intermediate focal length and thereafter increases, and a gap between the third lens group G3 and the fourth lens group G4 decreases.

Now, a further detailed lens configuration of the zoom lens according to Example 3 illustrated in FIGS. 17(a) to 17(c) and FIGS. 21(a) to 21(c) will be described.

In the first lens group G1, from the object side to the image side, a first lens L1 that is configured by a negative meniscus lens having an concave surface directed toward the image side, a diffraction optical element that is configured to include a first resin layer formed by using a thin resin material and a second resin layer formed by using a thin resin layer, a second lens L2 configured by a positive meniscus lens having a convex surface directed toward the object side, and a third lens L3 that is configured by a positive meniscus having a convex surface directed toward the object side are sequentially arranged. Two lenses including the first lens L1 and the second lens L2 are integrally bonded by being closely put together with the first resin layer and the second resin layer being interposed between so as to form a cemented lens. Here, a diffractive surface is formed on the boundary face between the first resin layer and the second resin layer, and the cemented lens as a diffractive optical element is configured by the first lens L1, the first resin layer, the second resin layer, and the second lens L2 that are integrally bonded.

In the second lens group G2, from the object side to the image side, a fourth lens L4 that is configured by a biconcave lens having a concave surface, which has a curvature larger than the object-side surface, directed toward the image side, a fifth lens L5 that is configured by a biconvex lens having a convex surface, which has a curvature larger than the image-surface side, directed toward the object side, and a sixth lens L6 that is configured by a biconcave lens having a concave surface, which has a curvature larger than the object-side surface, directed toward the image side are sequentially arranged. Two lenses including the fifth lens L5 and the sixth lens L6 are integrally bonded by being closely put together so as to form a cemented lens that is formed by two-lens bonding.

In the third lens group G3, from the object side to the image side, a seventh lens L7 that is configured by a biconcave lens having a concave surface, which has a curvature larger than the object-side surface, directed toward the image side and an eighth lens L8 that is configured by a positive meniscus lens having a convex surface directed toward the object side are sequentially arranged. Two lenses including the seventh lens L7 and the eighth lens L8 are integrally bonded by being closely put together so as to form a cemented lens that is formed by two-lens bonding.

The adjustment filter ND that is configured by an optical amount adjustment filter such as an ND (neutral density) darkening filter having a parallel plate shape is arranged to be interposed between the third lens group G3 and the fourth lens group G4. In addition, the aperture diaphragm AD is arranged to be interposed between the adjustment filter ND and the fourth lens group G4.

In the fourth lens group G4, from the object side to the image side, a ninth lens L9 that is configured by a biconvex lens having a convex surface, which has a curvature larger than the object-side surface, directed toward the image side, a tenth lens L10 that is configured by a biconvex lens having a convex surface, which has a curvature larger than the image-side surface, directed toward the object side, an eleventh lens L11 that is configured by a biconvex lens having a convex surface, which has a curvature larger than the image-side surface, directed toward the object side, a twelfth lens L12 that is configured by a biconcave lens having a concave surface, which has a curvature larger than the object-side surface, directed toward the image side, a thirteenth lens L13 that is configured by a biconcave lens having a concave surface, which has a curvature larger than the object-side surface, directed toward the image side, and a fourteenth lens L14 that is configured by a biconvex lens having a convex surface, which has a curvature larger than the image-side surface, directed toward the object side are sequentially arranged. Two lenses including the eleventh lens L11 and the twelfth lens L12 are integrally bonded by being closely put together so as to form a cemented lens that is formed by two-lens bonding. In addition, two lenses including the thirteenth lens L13 and the fourteenth lens L14 are integrally bonded by being closely put together so as to form a cemented lens that is formed by two-lens bonding.

In the extender lens group EX, from the object side to the image side, a first lens E1 that is configured by a biconvex lens having a convex surface, which has a curvature larger than the image-side surface, directed toward the object side, a second lens E2 that is configured by a positive meniscus lens having a concave surface directed toward the object side, a third lens E3 that is configured by a biconcave lens having a concave surface, which has a curvature larger than the image-side surface, directed toward the object side, a fourth lens E4 that is configured by a positive meniscus lens having a convex surface directed toward the image side, and a fifth lens E5 that is configured by a biconcave lens having a concave surface, which has a curvature larger than the image-side surface, directed toward the object side are sequentially arranged.

Two lenses including the second lens E2 and the third lens E3 are integrally bonded by being closely put together so as to form a cemented lens that is formed by two-lens bonding.

In addition, two lenses including the fourth lens E4 and the fifth lens E5 are integrally bonded by being closely put together so as to form a cemented lens that is formed by two-lens bonding. As described above, in a case where the focal length is extended, this extender lens group EX is inserted on the optical axis between the fourth lens group G4 and the filter and the like FG. On the other hand, in a case where the focal length is not extended, this extender lens group EX is retracted from the optical path between the fourth lens group G4 and the filter and the like FG.

Various optical filters each having a parallel plate shape and a filter and the like FG such as the cover glass of a light reception imaging device are arranged on the image-surface side of the fourth lens group G4 in a case where the extender lens group EX is not inserted on the optical path disposed on the image-surface side of the fourth lens group G4 and are arranged on the image-surface side of the extender lens group EX in a case where the extender lens group EX is inserted on the optical path disposed on the image-surface side of the fourth lens group G4.

In this case, as illustrated in FIGS. 17(a) to 17(c) and FIGS. 21(a) to 21(c), in accordance with zooming from the wide angle end (short focus end) to the telephoto end (long focus end), the first lens group G1 and the fourth lens group G4 are fixedly positioned without moving. In addition, the second lens group G2 moves much from the object side to the image side from the wide angle end to the intermediate focal length and moves a little from the object side to the image side from the intermediate focal length to the telephoto end, and the third lens group G3 moves a little from the object side to the image side from the wide angle end to the intermediate focal length and moves much from the object side to the image side from the intermediate focal length to the telephoto end.

This Example 3 will be described with reference to the extender lens group EX not-present state illustrated in FIGS. 17(a) to 17(c) and the extender lens group EX-including state illustrated in FIGS. 21(a) to 21(c) in a divisional manner.

Example 3

Extender Not-Present

First, in the extender lens group EX not-present state, illustrated in FIGS. 17(a) to 17(c), of Example 3, the focal length f of the entire optical system, the F number, and the half field angle ω respectively change in the ranges of f=17.1 to 487, F=4.01 to 6.96, and ω=16.0 to 0.529. The optical characteristics of each optical element are as illustrated in the following Table 13.

TABLE 13

| SURFACE NUMBER | r | d | nd | vd | $\theta_{C, A'}$ | MATERIAL/GLASS TYPE | REMARK | |
|---|---|---|---|---|---|---|---|---|
| 01 | 143.610 | 2.50 | 1.83400 | 37.16 | 0.3245 | OHARA S-LAH60 | L1 | G1 |
| 02 | 76.816 | 0.10 | 1.64310 | 38.82 | 0.3124 | RESIN MATERIAL | P1 | |
| 03# | 76.816 | 0.10 | 1.61505 | 26.54 | 0.2831 | RESIN MATERIAL | P2 | |
| 04 | 76.816 | 10.55 | 1.48749 | 70.24 | 0.3633 | OHARA S-FSL5 | L2 | |
| 05 | 15446.495 | 0.20 | | | | | | |
| 06 | 75.559 | 10.17 | 1.43875 | 94.94 | 0.3529 | OHARA S-FPL53 | L3 | |
| 07 | 1368.706 | VARIABLE dA | | | | | | |
| 08 | −146.028 | 2.00 | 1.59522 | 67.73 | 0.3431 | OHARA S-FPM2 | L4 | G2 |

TABLE 13-continued

OPTICAL CHARACTERISTICS

| SURFACE NUMBER | r | d | nd | vd | $\theta_{C,A'}$ | MATERIAL/GLASS TYPE | REMARK | |
|---|---|---|---|---|---|---|---|---|
| 09 | 42.654 | 0.20 | | | | | | |
| 10 | 40.000 | 6.73 | 1.80000 | 29.84 | 0.3117 | OHARA S-NBH55 | L5 | |
| 11 | −3191.505 | 2.00 | 1.67003 | 47.23 | 0.3338 | OHARA S-BAH10 | L6 | |
| 12 | 31.671 | VARIABLE dB | | | | | | |
| 13 | −50.487 | 1.50 | 1.60300 | 65.44 | 0.3498 | OHARA S-PHM53 | L7 | G3 |
| 14 | 18.890 | 2.94 | 1.85026 | 32.27 | 0.3145 | OHARA S-LAH71 | L8 | |
| 15 | 34.671 | VARIABLE dC | | | | | | |
| 16 | ∞ | 1.00 | 1.51633 | 64.14 | | ADJUSTMENT FILTER | ND | |
| 17 | ∞ | 0.90 | | | | | | |
| 18 | DIAPHRAGM | 2.50 | | | | | AD | |
| 19 | 80.235 | 3.47 | 1.49700 | 81.54 | 0.3501 | OHARA S-FPL51 | L9 | G4 |
| 20 | −73.028 | 0.20 | | | | | | |
| 21 | 57.165 | 3.63 | 1.49700 | 81.54 | 0.3501 | OHARA S-FPL51 | L10 | |
| 22 | −89.319 | 0.20 | | | | | | |
| 23 | 30.165 | 5.04 | 1.49700 | 81.54 | 0.3501 | OHARA S-FPL51 | L11 | |
| 24 | −38.510 | 1.50 | 1.83400 | 37.16 | 0.3245 | OHARA S-LAH60 | L12 | |
| 25 | 33.545 | 2.44 | | | | | | |
| 26 | −47.119 | 1.50 | 1.48749 | 70.24 | 0.3633 | OHARA S-FSL5 | L13 | |
| 27 | 20.000 | 5.95 | 1.54072 | 47.23 | 0.3353 | OHARA S-TIL2 | L14 | |
| 28 | −33.828 | 64.462 | | | | | | |
| 29 | ∞ | 3.50 | 1.51633 | 64.14 | | FILTER AND THE LIKE | FG | |
| 30 | ∞ | 1.000 | | | | | | |

In Table 13, an optical surface represented with "#" being attached to the surface number is a diffraction surface. In addition, in Table 13, the material of each lens is also represented. These are similar in the other examples.

In other words, in Table 13, the third surface to which "#" is attached is a diffraction surface, and the parameters of the diffraction surface represented in Expression [21] are as follows.

Diffraction Surface: Third Surface $\lambda = 587.56$ (nm)

$C_2 = -2.06961 \times 10^{-5}$ $C_4 = 1.17380 \times 10^{-9}$

In the extender not-present state of this Example 3, the focal length f of the entire optical system, a variable gap dA between the first lens group G1 and the second lens group G2, a variable gap dB between the second lens group G2 and the third lens group G3, and a gap dC between the third lens group G3 and the adjustment filter ND at each of the wide angle end (short focus end), the intermediate focal length, and the telephoto end (long focus end) change in accordance with zooming as in the following Table 14.

TABLE 14

VARIABLE GAP

| VARIABLE GAP | WIDE ANGLE END f = 17.07 | INTERMEDIATE FOCAL LENGTH f = 91.26 | TELEPHOTO END f = 487.2 |
|---|---|---|---|
| dA | 5.400 | 78.425 | 94.911 |
| dB | 71.253 | 6.594 | 44.438 |
| dC | 66.028 | 57.662 | 3.332 |

In the extender not-present state of this Example 3, the focal length f of the entire optical system, the magnification of the second lens group G2, the magnification of the third lens group G3, and the magnification of the fourth lens group G4 at each of the wide angle end (short focus end), the intermediate focal length, and the telephoto end (long focus end) change in accordance with zooming as in the following Table 15.

TABLE 15

MAGNIFICATION OF EACH LENS GROUP

| | MAGNIFICATION | | |
|---|---|---|---|
| | WIDE ANGLE END f = 17.07 | INTERMEDIATE FOCAL LENGTH f = 91.26 | TELEPHOTO END f = 487.2 |
| SECOND LENS GROUP G2 | −0.713 | −73.919 | 3.335 |
| THIRD LENS GROUP G3 | 0.207 | 0.0107 | −1.264 |
| FOURTH LENS GROUP G4 | −0.780 | −0.780 | −0.780 |

In this case, values corresponding to Conditional Expressions [1] to [3], Conditional Expression [4-1], Conditional Expression [5], Conditional Expression [6], Conditional Expression [7], Conditional Expression [8], and Conditional Expressions [9] to [12] are as follows, and each of Conditional Expressions [1] to [3], Conditional Expression [4-1], Conditional Expression [5], Conditional Expression [6], Conditional Expression [7], Conditional Expression [8], and Conditional Expressions [9] to [12] is satisfied.

<Conditional Expression Numerical Values>

$nd = 1.59522(L4)$ $nd = 1.60300(L7)$ [1]:

$vd = 67.73(L4)$ $vd = 65.44(L7)$ [2]:

$\theta_{C,A'} = -0.0015 \times vd - 0.255 = -0.0135 \ldots$ OHARA S-FPM2(L4)

$\theta_{C,A}$-0.0015×vd-0.255=-0.0034 ... OHARA S-PHM53(L7)  [3]

$f_T/f_{DOE}$=0.0202  [4-1]

$v_{1GP}$=82.6  [5]

$(D_{34W}-D_{34T})/f_W$=3.67  [6]

$L_4/T_{4F-I}$=0.261  [7]

$v_{4GP}$=81.5  [8]

$f_1/f_W$=8.68  [9]

$f_2/f_W$=-3.08  [10]

$f_3/f_W$=-2.50  [11]

$f_4/f_W$=2.74  [12]

In addition, FIGS. 18, 19, and 20 respectively illustrate aberration diagrams of the spherical aberration, the astigmatism, the distortion aberration, and the lateral aberration at each of the wide angle end (short focus end), the intermediate focal length, and the telephoto end (long focus end) in the extender not-present state of Example 3. In such aberration diagrams, a broken line of the spherical aberration diagram represents a sine condition. In addition, in the astigmatism diagram, a solid line represents the sagittal, and a broken line represents the meridional. These are similarly applied to the aberration diagrams of the other examples.

Example 3

Including Extender

Next, in the extender lens group EX-including state illustrated in FIGS. 21A to 21C in which the extender lens group EX is inserted to the image side of the fourth lens group G4 in the extender lens group EX not-present configuration of Example 3 described above, the focal length f of the entire optical system, the F number, and the half field angle ω respectively change in the ranges of f=33.9 to 968, F=7.96 to 13.8, and ω=6.78 to 0.235. The optical characteristics of each optical element are as illustrated in the following Table 16.

TABLE 16

| SURFACE NUMBER | r | d | nd | vd | $\theta_{C, A'}$ | MATERIAL/GLASS TYPE | REMARK | |
|---|---|---|---|---|---|---|---|---|
| 01 | 143.610 | 2.50 | 1.83400 | 37.16 | 0.3245 | OHARA S-LAH60 | L1 | G1 |
| 02 | 76.816 | 0.10 | 1.64310 | 38.82 | 0.3124 | RESIN MATERIAL | P1 | |
| 03# | 76.816 | 0.10 | 1.61505 | 26.54 | 0.2831 | RESIN MATERIAL | P2 | |
| 04 | 76.816 | 10.55 | 1.48749 | 70.24 | 0.3633 | OHARA S-FSL5 | L2 | |
| 05 | 15446.495 | 0.20 | | | | | | |
| 06 | 75.559 | 10.17 | 1.43875 | 94.94 | 0.3529 | OHARA S-FPL53 | L3 | |
| 07 | 1368.706 | VARIABLE dA | | | | | | |
| 08 | -146.028 | 2.00 | 1.59522 | 67.73 | 0.3431 | OHARA S-FPM2 | L4 | G2 |
| 09 | 42.654 | 0.20 | | | | | | |
| 10 | 40.000 | 6.73 | 1.80000 | 29.84 | 0.3117 | OHARA S-NBH55 | L5 | |
| 11 | -3191.505 | 2.00 | 1.67003 | 47.23 | 0.3338 | OHARA S-BAH10 | L6 | |
| 12 | 31.671 | VARIABLE dB | | | | | | |
| 13 | -50.487 | 1.50 | 1.60300 | 65.44 | 0.3498 | OHARA S-PHM53 | L7 | G3 |
| 14 | 18.890 | 2.94 | 1.85026 | 32.27 | 0.3145 | OHARA S-LAH71 | L8 | |
| 15 | 34.671 | VARIABLE dC | | | | | | |
| 16 | ∞ | 1.00 | 1.51633 | 64.14 | | ADJUSTMENT FILTER | ND | |
| 17 | ∞ | 0.90 | | | | | | |
| 18 | DIAPHRAGM | 2.50 | | | | | AD | |
| 19 | 80.235 | 3.47 | 1.49700 | 81.54 | 0.3501 | OHARA S-FPL51 | L9 | G4 |
| 20 | -73.028 | 0.20 | | | | | | |
| 21 | 57.165 | 3.63 | 1.49700 | 81.54 | 0.3501 | OHARA S-FPL51 | L10 | |
| 22 | -89.319 | 0.20 | | | | | | |
| 23 | 30.165 | 5.04 | 1.49700 | 81.54 | 0.3501 | OHARA S-FPL51 | L11 | |
| 24 | -38.510 | 1.50 | 1.83400 | 37.16 | 0.3245 | OHARA S-LAH60 | L12 | |
| 25 | 33.545 | 2.44 | | | | | | |
| 26 | -47.119 | 1.50 | 1.48749 | 70.24 | 0.3633 | OHARA S-FSL5 | L13 | |
| 27 | 20.000 | 5.95 | 1.54072 | 47.23 | 0.3353 | OHARA S-TIL2 | L14 | |
| 28 | -33.828 | 4.971 | | | | | | |
| 29 | 17.944 | 4.31 | 1.49700 | 81.54 | 0.3501 | OHARA S-FPL51 | E1 | EX |
| 30 | -80.952 | 1.67 | | | | | | |
| 31 | -197.901 | 2.82 | 1.48749 | 70.24 | 0.3633 | OHARA S-FSL5 | E2 | |
| 32 | -22.010 | 1.55 | 1.60562 | 43.71 | 0.3289 | OHARA S-BAM4 | E3 | |
| 33 | 48.486 | 7.51 | | | | | | |
| 34 | -66.664 | 2.85 | 1.84666 | 23.78 | 0.3035 | OHARA S-TIH53 | E4 | |
| 35 | -9.531 | 1.50 | 1.80400 | 46.58 | 0.3371 | OHARA S-LAH65V | E5 | |
| 36 | 11.184 | 37.282 | | | | | | |
| 37 | ∞ | 3.50 | 1.51633 | 64.14 | | FILTER AND THE LIKE | FG | |
| 38 | ∞ | 1.000 | | | | | | |

In Table 16, the first lens group G1 to the fourth lens group G4 are completely the same as those illustrated in Table 13, and the extender lens group EX is arranged to be inserted between the fourth lens group G4 and the filter and the like FG. Thus, a diffraction surface in which "#" is represented to be attached to the surface number is the same as that of the case illustrated in Table 13. In addition, the material of each lens is also represented in Table 16. These are similar in the other examples.

In other words, in Table 16, the third surface to which "#" is attached is a diffraction surface, and the parameters of the diffraction surface represented in Expression [21] are the same as those described with reference to Table 13 as follows.

Diffraction Surface: Third Surface $\lambda = 587.56$ (nm)

$C_2 = -1.06961 \times 10^{-5}$ $C_4 = 1.17380 \times 10^{-9}$

In the extender-including state of this Example 3, the focal length f of the entire optical system, a variable gap dA between the first lens group G1 and the second lens group G2, a variable gap dB between the second lens group G2 and the third lens group G3, and a gap dC between the third lens group G3 and the adjustment filter ND at each of the wide angle end (short focus end), the intermediate focal length, and the telephoto end (long focus end) change in accordance with zooming as in the following Table 17, to be almost similar to Table 14.

Here, substantially, differences between Table 17 and Table 14 are only the focal lengths f of the entire optical system at the wide angle end, the intermediate focal length and the telephoto end.

TABLE 17

VARIABLE GAP

| VARIABLE GAP | WIDE ANGLE END f = 33.79 | INTERMEDIATE FOCAL LENGTH f = 180.7 | TELEPHOTO END f = 964.7 |
|---|---|---|---|
| dA | 5.400 | 78.425 | 94.911 |
| dB | 71.253 | 6.594 | 44.438 |
| dC | 66.028 | 57.662 | 3.332 |

In the extender-including state of this Example 3, the focal length f of the entire optical system, the magnification of the second lens group G2, the magnification of the third lens group G3, the magnification of the fourth lens group G4, and the magnification of the extender lens group EX at each of the wide angle end, the intermediate focal length, and the telephoto end change in accordance with zooming as in the following Table 18.

TABLE 18

MAGNIFICATION OF EACH LENS GROUP

| | MAGNIFICATION | | |
|---|---|---|---|
| | WIDE ANGLE END f = 33.79 | INTERMEDIATE FOCAL LENGTH f = 180.7 | TELEPHOTO END f = 964.7 |
| SECOND LENS GROUP G2 | −0.713 | −73.919 | 3.335 |
| THIRD LENS GROUP G3 | 0.207 | 0.0107 | −1.264 |
| FOURTH LENS GROUP G4 | −0.780 | −0.780 | −0.780 |
| EXTENDER EX | 1.980 | 1.980 | 1.980 |

In this case, values corresponding to Conditional Expressions [4-2] and [13] are as follows, and each of Conditional Expression [4-2] and Conditional Expression [13] is satisfied.

<Conditional Expression Numerical Values>

$f_{TC}/f_{DOE} = 0.0399$ [4-2]:

$f_E/f_W = -1.76$ [13]:

In addition, FIGS. 22, 23, and 24 respectively illustrate aberration diagrams of the spherical aberration, the astigmatism, the distortion aberration, and the lateral aberration at each of the wide angle end, the intermediate focal length, and the telephoto end (long focus end) in the extender-including state of Example 3. In such aberration diagrams, a broken line of the spherical aberration diagram represents a sine condition. In addition, in the astigmatism diagram, a solid line represents the sagittal, and a broken line represents the meridional. These are similarly applied to the aberration diagrams of the other examples.

Fourth Embodiment

Next, a zoom lens according to a specific example of Example 4 as the fourth embodiment of the present invention described above will be described in detail.

Example 4

Example 4 is an example of a specific configuration of the zoom lens according to the fourth embodiment of the present invention.

FIGS. 25 to 32 illustrates the zoom lens according to Example 4 as the fourth embodiment of the present invention. FIGS. 25 to 28 illustrate a state in which an extender lens group is not inserted on an optical path but is retracted from the inside of the optical path, and FIGS. 29 to 32 illustrate a state in which an extender lens group EX is inserted on an optical path between a fourth lens group G4 and an image surface.

FIGS. 25(a), 25(b), and 25(c) are diagrams that schematically illustrate the configuration of the optical system and a zoom locus accompanied with zooming in a state in which the extender lens group EX is not inserted on the optical path but is retracted from the inside of the optical path, in other words, an extender lens group EX not-present state, and FIGS. 29(a), 29(b), and 29(c) are diagrams that schematically illustrate the configuration of the optical system and a zoom locus accompanied with zooming in a state in which the extender lens group EX is inserted on the optical path between the fourth lens group G4 and the image surface, in other words, an extender lens group EX-including state. In these diagrams, FIGS. 25(a) and 29(a), FIGS. 25(b) and 29(b), and FIGS. 25(c) and 29(c) respectively illustrate the arrangement configurations of the optical system in states of the wide angle end (short focus end), the intermediate focal length, and the telephoto end (long focus end).

In other words, FIGS. 25(a), 25(b), and 25(c) schematically illustrate the lens configurations of the optical system of the zoom lens of Example 4 according to the fourth embodiment of the present invention in the extender lens group EX not-present state and a zoom locus accompanied with zooming from the short focus end, in other words, the wide angle end to the long focus end, in other words, the telephoto end through a predetermined intermediate focal length. FIG. 25(a) is a cross-sectional view at the short focus end, in other words, the wide angle end along the optical axis, FIG. 25(b) is a cross-sectional view at the predetermined intermediate focal length along the optical axis, and FIG. 25(c) is a cross-sectional view at the long focus end, in other words, the telephoto end along the optical axis. In addition, FIGS. 29(a), 29(b), and 29(c) schematically illustrate the lens configurations of the optical system of the zoom lens of Example 4 according to the fourth embodiment of the present invention in the extender lens group EX-including state and a zoom locus accompanied with zooming from the short focus end, in other words, the wide angle end to the long focus end, in other words, the telephoto end through a predetermined intermediate focal length. FIG. 29(a) is a cross-sectional view at the short focus end, in other words, the wide angle end along the optical axis, FIG. 29(b) is a cross-sectional view at the predetermined intermediate focal length along the optical axis, and FIG. 29(c) is a cross-sectional view at the long focus end, in other words, the telephoto end along the optical axis. In FIGS. 25(a) to 25(c) and FIGS. 29(a) to 29(c) representing the lens group arrangements of Example 4, the left side is the object (subject) side, and the right side is the image side (imaging device side).

In the zoom lenses illustrated in FIGS. 25(a) to 25(c) and FIGS. 29(a) to 29(c), from the object side to the image side, a first lens group G1 having positive refractive power, a second lens group G2 having negative refractive power, a third lens group G3 having negative refractive power, and a fourth lens group G4 having positive refractive power are sequentially arranged. In addition, the extender lens group EX is arranged so as to be insertable/detachable to/from the image side of the fourth lens group G4, and an adjustment filter ND and an aperture diaphragm AD are arranged between the third lens group G3 and the fourth lens group G4.

The first lens group G1 is configured by sequentially arranging a first lens L1, a second lens L2, and a third lens L3 from the object side to the image side. The second lens group G2 is configured by sequentially arranging a fourth lens L4, a fifth lens L5, and a sixth lens L6 from the object side to the image side. The third lens group G3 is configured by sequentially arranging a seventh lens L7 and an eighth lens L8 from the object side to the image side. The fourth lens group G4 is configured by sequentially arranging a ninth lens L9, a tenth lens L10, an eleventh lens L11, a twelfth lens L12, a thirteenth lens L13, and a fourteenth lens L14 from the object side to the image side. In addition, the extender lens group EX, as illustrated in FIGS. 29(a) to 29(c), is configured by an extender lens front group EXF configured by a first lens E1, a second lens E2, and a third lens E3 sequentially from the object side to the image side and an extender lens rear group EXR configured by a fourth lens E4 and a fifth lens E5.

The extender lens front group EXF has positive refractive power as a whole, and the extender lens rear group EXR has negative refractive power as a whole. In addition, between the third lens group G3 and the fourth lens group G4, from the object side to the image side, the adjustment filter ND and the aperture diaphragm AD are sequentially arranged so as to be interposed. Furthermore, the filter and the like FG are interposed, in the extender lens group EX not-present state, between the fourth lens group G4 and the image surface and, in the extender lens group EX-including state, between the extender lens group EX and the image surface.

The first lens group G1 to the fourth lens group G4 are respectively supported by an appropriate common support frame or the like for each group and are integrally operated for each group at the time of performing an operation such as a zooming operation, and the aperture diaphragm AD operates integrally with the fourth lens group G4. In FIGS. 25(a) to 25(c), the surface number of each optical surface is also illustrated. In a case where the focal length is extended by supporting the extender lens group EX using a drive mechanism used for inserting/detaching the extender lens group EX to/from the appropriate support frame and the optical axis or the like, the extender lens group EX is inserted on the optical axis between the fourth lens group G4 and the filter and the like FG. On the other hand, in a case where the focal length is not extended, the extender lens group EX is retracted from the optical path between the fourth lens group G4 and the filter and the like FG. In FIGS. 29(a) to 29(c), the surface number of each optical face is also illustrated.

When zooming from the wide angle end (short focus end) to the telephoto end (long focus end) is performed, the first lens group G1 and the fourth lens group G4 are fixedly positioned without moving, and the second lens group G2 and the third lens group G3 move such that a gap dA between the first lens group G1 and the second lens group G2 increases, a gap dB between the second lens group G2 and the third lens group G3 once decreases at the intermediate focal length and thereafter increases, and a gap between the third lens group G3 and the fourth lens group G4 decreases.

Now, a further detailed lens configuration of the zoom lens according to Example 4 illustrated in FIGS. 25(a) to 25(c) and FIGS. 29(a) to 29(c) will be described.

In the first lens group G1, from the object side to the image side, a first lens L1 that is configured by a negative meniscus lens having an concave surface directed toward the image side, a diffraction optical element that is configured to include a first resin layer formed by using a thin resin material and a second resin layer formed by using a thin resin layer, a second lens L2 configured by a biconvex lens having a convex surface, which has a curvature larger than the image-side surface, directed toward the object side, and a third lens L3 that is configured by a positive meniscus having a convex surface directed toward the object side are sequentially arranged. Two lenses including the first lens L1 and the second lens L2 are integrally bonded by being closely put together with the first resin layer and the second resin layer being interposed between so as to form a cemented lens. Here, a diffractive surface is formed on the boundary face between the first resin layer and the second resin layer, and the cemented lens as a diffractive optical element is configured by the first lens L1, the first resin layer, the second resin layer, and the second lens L2 that are integrally bonded.

In the second lens group G2, from the object side to the image side, a fourth lens L4 that is configured by a biconcave lens having a concave surface, which has a curvature larger than the object-side surface, directed toward the image side, a fifth lens L5 that is configured by a biconvex lens having a convex surface, which has a curvature larger than the object side, directed toward the image side, and a sixth lens L6 that is configured by a biconcave lens having a concave surface, which has a curvature larger than the object-side surface, directed toward the image side are sequentially arranged. Two lenses including the fifth lens L5 and the sixth lens L6 are integrally bonded by being closely put together so as to form a cemented lens that is formed by two-lens bonding.

In the third lens group G3, from the object side to the image side, a seventh lens L7 that is configured by a biconcave lens having a concave surface, which has a curvature larger than the object-side surface, directed toward the image side and an eighth lens L8 that is configured by a positive meniscus lens having a convex surface directed toward the object side are sequentially arranged. Two lenses including the seventh lens L7 and the eighth lens L8 are integrally bonded by being closely put together so as to form a cemented lens that is formed by two-lens bonding.

The adjustment filter ND that is configured by an optical amount adjustment filter such as an ND (neutral density) darkening filter having a parallel plate shape is arranged to be interposed between the third lens group G3 and the fourth lens group G4, and the aperture diaphragm AD is arranged to be interposed between the adjustment filter ND and the fourth lens group G4.

In the fourth lens group G4, from the object side to the image side, a ninth lens L9 that is configured by a biconvex lens having a convex surface, which has a curvature larger than the image-side surface, directed toward the object side, a tenth lens L10 that is configured by a biconvex lens having a convex surface, which has a curvature larger than the image-side surface, directed toward the object side, an eleventh lens L11 that is configured by a biconvex lens having a convex surface, which has a curvature larger than the image-side surface, directed toward the object side, a twelfth lens L12 that is configured by a biconcave lens having a concave surface, which has a curvature larger than the object-side surface, directed toward the image side, a thirteenth lens L13 that is configured by a negative meniscus lens having a concave surface directed toward the image side, and a fourteenth lens L14 that is configured by a biconvex lens having a convex surface, which has a curvature larger than the image-side surface, directed toward the object side are sequentially arranged. Two lenses including the eleventh lens L11 and the twelfth lens L12 are integrally bonded by being closely put together so as to form a cemented lens that is formed by two-lens bonding. In addition, two lenses including the thirteenth lens L13 and the fourteenth lens L14 are integrally bonded by being closely put together so as to form a cemented lens that is formed by two-lens bonding.

In the extender lens group EX, from the object side to the image side, a first lens E1 that is configured by a biconvex lens having a convex surface, which has a curvature larger than the image-side surface, directed toward the object side, a second lens E2 that is configured by a biconvex lens having a convex surface, which has a curvature larger than the object-side surface, directed toward the image side, a third lens E3 that is configured by a biconcave lens having a concave surface, which has a curvature larger than the object-side surface, directed toward the image side, a fourth lens E4 that is configured by a positive meniscus lens having a convex surface directed toward the image side, and a fifth lens E5 that is configured by a biconcave lens having a concave surface, which has a curvature larger than the image-side surface, directed toward the object side are sequentially arranged.

Two lenses including the second lens E2 and the third lens E3 are integrally bonded by being closely put together so as to form a cemented lens that is formed by two-lens bonding. In addition, two lenses including the fourth lens E4 and the fifth lens E5 are integrally bonded by being closely put together so as to form a cemented lens that is formed by two-lens bonding. As described above, in a case where the focal length is extended, this extender lens group EX is inserted on the optical axis between the fourth lens group G4 and the filter and the like FG. On the other hand, in a case where the focal length is not extended, this extender lens group EX is retracted from the optical path between the fourth lens group G4 and the filter and the like FG.

Various optical filters each having a parallel plate shape and a filter and the like FG such as the cover glass of a light reception imaging device are arranged on the image-surface side of the fourth lens group G4 in a case where the extender lens group EX is not inserted on the optical path disposed on the image-surface side of the fourth lens group G4 and are arranged on the image-surface side of the extender lens group EX in a case where the extender lens group EX is inserted on the optical path disposed on the image-surface side of the fourth lens group G4.

In this case, as illustrated in FIGS. 25(a) to 25(c) and FIGS. 29(a) to 29(c), in accordance with zooming from the wide angle end (short focus end) to the telephoto end (long focus end), the first lens group G1 and the fourth lens group G4 are fixedly positioned without moving, the second lens group G2 moves much from the object side to the image side from the wide angle end to the intermediate focal length and moves a little from the object side to the image side from the intermediate focal length to the telephoto end, and the third lens group G3 moves a little from the object side to the image side from the wide angle end to the intermediate focal length and moves much from the object side to the image side from the intermediate focal length to the telephoto end.

This Example 4 will be described with reference to the extender lens group EX not-present state illustrated in FIGS. 25(a) to 25(c) and the extender lens group EX-including state illustrated in FIGS. 29(a) to 29(c) in a divisional manner.

Example 4

Extender Not-Present

First, in the extender lens group EX not-present state, illustrated in FIGS. 25(a) to 25(c), of Example 4, the focal length f of the entire optical system, the F number, and the half field angle ω respectively change in the ranges of f=17.1 to 487, F=3.95 to 6.96, and ω=14.0 to 0.470. The optical characteristics of each optical element are as illustrated in the following Table 19.

TABLE 19

| OPTICAL CHARACTERISTICS | | | | | | | | |
|---|---|---|---|---|---|---|---|---|
| SURFACE NUMBER | r | d | nd | vd | $\theta_{C, A'}$ | MATERIAL/GLASS TYPE | REMARK | |
| 01 | 157.716 | 2.50 | 1.83400 | 37.16 | 0.3245 | OHARA S-LAH60 | L1 | G1 |
| 02 | 80.188 | 0.10 | 1.64310 | 38.82 | 0.3124 | RESIN MATERIAL | P1 | |
| 03# | 80.188 | 0.10 | 1.61505 | 26.54 | 0.2831 | RESIN MATERIAL | P2 | |
| 04 | 80.188 | 10.84 | 1.48749 | 70.24 | 0.3633 | OHARA S-FSL5 | L2 | |

TABLE 19-continued

OPTICAL CHARACTERISTICS

| SURFACE NUMBER | r | d | nd | vd | $\theta_{C, A'}$ | MATERIAL/GLASS TYPE | REMARK | |
|---|---|---|---|---|---|---|---|---|
| 05 | −965.701 | 0.20 | | | | | | |
| 06 | 74.859 | 10.21 | 1.43875 | 94.94 | 0.3529 | OHARA S-FPL53 | L3 | |
| 07 | 1250.261 | VARIABLE dA | | | | | | |
| 08 | −1102.688 | 2.00 | 1.59522 | 67.73 | 0.3431 | OHARA S-FPM2 | L4 | G2 |
| 09 | 54.624 | 0.20 | | | | | | |
| 10 | 51.978 | 9.76 | 1.68893 | 31.07 | 0.3142 | OHARA S-TIM28 | L5 | |
| 11 | −48.077 | 2.00 | 1.85026 | 32.27 | 0.3331 | OHARA S-LAH51 | L6 | |
| 12 | 42.896 | VARIABLE dB | | | | | | |
| 13 | −47.465 | 1.50 | 1.59522 | 67.73 | 0.3431 | OHARA S-FPM2 | L7 | G3 |
| 14 | 16.926 | 2.87 | 1.85026 | 32.27 | 0.3145 | OHARA S-LAH71 | L8 | |
| 15 | 30.040 | VARIABLE dC | | | | | | |
| 16 | ∞ | 1.00 | 1.51633 | 64.14 | | ADJUSTMENT FILTER | ND | |
| 17 | ∞ | 0.90 | | | | | | |
| 18 | DIAPHRAGM | 2.50 | | | | | AD | |
| 19* | 25.662 | 4.50 | 1.43875 | 94.94 | 0.3529 | OHARA S-FPL53 | L9 | G4 |
| 20 | −107.684 | 0.20 | | | | | | |
| 21 | 39.448 | 3.48 | 1.49700 | 81.54 | 0.3501 | OHARA S-FPL51 | L10 | |
| 22 | −244.335 | 0.20 | | | | | | |
| 23 | 30.534 | 4.06 | 1.49700 | 81.54 | 0.3501 | OHARA S-FPL51 | L11 | |
| 24 | −65.075 | 3.64 | 1.80610 | 40.93 | 0.3289 | OHARA S-LAH53 | L12 | |
| 25 | 19.436 | 4.53 | | | | | | |
| 26 | 385.080 | 1.50 | 1.48749 | 70.24 | 0.3633 | OHARA S-FSL5 | L13 | |
| 27 | 20.000 | 3.89 | 1.54814 | 45.78 | 0.3331 | OHARA S-TIL1 | L14 | |
| 28 | −99.699 | 48.589 | | | | | | |
| 29 | ∞ | 3.50 | 1.51633 | 64.14 | | FILTER AND THE LIKE | FG | |
| 30 | ∞ | 1.000 | | | | | | |

In Table 19, an optical surface represented with "#" being attached to the surface number is a diffraction surface. In addition, in Table 19, the material of each lens is also represented. These are similar in the other examples.

In other words, in Table 19, the third surface to which "#" is attached is a diffraction surface, and the parameters of the diffraction surface represented in Expression [21] are as follows.

Diffraction Surface: Third Surface $\lambda = 587.56$ (nm)

$C_2 = -2.07977 \times 10^{-5}$ $C_4 = 9.76351 \times 10^{-10}$

In addition, in Table 19, the lens surface having a surface number to which "* (asterisk)" is represented to be attached is an aspherical surface.

In other words, in Table 19, a nineteenth surface that is an optical surface to which "*" is attached is an aspherical surface, and the parameters of the aspherical surface in Expression [22] are as follows.

Aspherical Surface: Nineteenth Surface $K = 0.0$ $A_4 = -7.21843 \times 10^{-6}$ $A_6 = -6.52396 \times 10^{-9}$ $A_8 = 4.67279 \times 10^{-12}$ In the extender not-present state of this Example 4, the focal length f of the entire optical system, a variable gap dA between the first lens group G1 and the second lens group G2, a variable gap dB between the second lens group G2 and the third lens group G3, and a gap dC between the third lens group G3 and the adjustment filter ND at each of the wide angle end (short focus end), the intermediate focal length, and the telephoto end (long focus end) change in accordance with zooming as in the following Table 20.

TABLE 20

VARIABLE GAP

| VARIABLE GAP | WIDE ANGLE END f = 17.05 | INTERMEDIATE FOCAL LENGTH f = 91.30 | TELEPHOTO END f = 487.3 |
|---|---|---|---|
| dA | 5.846 | 75.128 | 87.903 |
| dB | 65.173 | 6.100 | 47.276 |
| dC | 67.232 | 57.023 | 3.072 |

In the extender not-present state of this Example 4, the focal length f of the entire optical system, the magnification of the second lens group G2, the magnification of the third lens group G3, and the magnification of the fourth lens group G4 at each of the wide angle end (short focus end), the intermediate focal length, and the telephoto end (long focus end) change in accordance with zooming as in the following Table 21.

TABLE 21

MAGNIFICATION OF EACH LENS GROUP

| | MAGNIFICATION | | |
|---|---|---|---|
| | WIDE ANGLE END f = 17.05 | INTERMEDIATE FOCAL LENGTH f = 91.30 | TELEPHOTO END f = 487.3 |
| SECOND LENS GROUP G2 | −0.847 | 11.221 | 3.093 |
| THIRD LENS GROUP G3 | 0.188 | −0.758 | −1.469 |
| FOURTH LENS GROUP G4 | −0.749 | −0.749 | −0.749 |

In this case, values corresponding to Conditional Expressions [1] to [3], Conditional Expression [4-1], Conditional Expression [5], Conditional Expression [6], Conditional Expression [7], Conditional Expression [8], and Conditional Expressions [9] to [12] are as follows, and each of Conditional Expressions [1] to [3], Conditional Expression [4-1], Conditional Expression [5], Conditional Expression [6], Conditional Expression [7], Conditional Expression [8], and Conditional Expressions [9] to [12] is satisfied.

<Conditional Expression Numerical Values>

$nd=1.59522(L4;L7)$ [1]:

$vd=67.73(L4;L7)$ [2]:

$\theta_{C,A}-0.0015 \times vd-0.255=-0.0135$ ... OHARA S-FPM2(L4;L7) [3]:

$f_T/f_{DOE}=0.0203$ [4-1]:

$v_{1GP}=82.6$ [5]:

$(D_{34W}-D_{34T})/f_W=3.64$ [6]:

$L_4/T_{4F-I}=0.334$ [7]:

$v_{4GP}=86.0$ [8]:

$f_1/f_W=8.39$ [9]:

$f_2/f_W=-3.19$ [10]:

$f_3/f_W=-2.27$ [11]:

$f_4/f_W=2.47$ [12]:

In addition, FIGS. 26, 27, and 28 respectively illustrate aberration diagrams of the spherical aberration, the astigmatism, the distortion aberration, and the lateral aberration at each of the wide angle end (short focus end), the intermediate focal length, and the telephoto end (long focus end) in the extender not-present state of Example 4. In such aberration diagrams, a broken line of the spherical aberration diagram represents a sine condition. In addition, in the astigmatism diagram, a solid line represents the sagittal, and a broken line represents the meridional. These are similarly applied to the aberration diagrams of the other examples.

Example 4

Including Extender

Next, in the extender lens group EX-including state illustrated in FIGS. 29(a) to 29(c) in which the extender lens group EX is inserted to the image side of the fourth lens group G4 in the extender lens group EX not-present configuration of Example 4 described above, the focal length f of the entire optical system, the F number, and the half field angle ω respectively change in the ranges of f=33.9 to 968, F=7.96 to 13.8, and ω=6.78 to 0.235. The optical characteristics of each optical element are as illustrated in the following Table 22.

TABLE 22

| | OPTICAL CHARACTERISTICS | | | | | | | |
|---|---|---|---|---|---|---|---|---|
| SURFACE NUMBER | r | d | nd | vd | $\theta_{C,A'}$ | MATERIAL/GLASS TYPE | | REMARK |
| 01 | 157.716 | 2.50 | 1.83400 | 37.16 | 0.3245 | OHARA S-LAH60 | L1 | G1 |
| 02 | 80.188 | 0.10 | 1.64310 | 38.82 | 0.3124 | RESIN MATERIAL | P1 | |
| 03# | 80.188 | 0.10 | 1.61505 | 26.54 | 0.2831 | RESIN MATERIAL | P2 | |
| 04 | 80.188 | 10.84 | 1.48749 | 70.24 | 0.3633 | OHARA S-FSL5 | L2 | |
| 05 | −965.701 | 0.20 | | | | | | |
| 06 | 74.859 | 10.21 | 1.43875 | 94.94 | 0.3529 | OHARA S-FPL53 | L3 | |
| 07 | 1250.261 | VARIABLE dA | | | | | | |
| 08 | −1102.688 | 2.00 | 1.59522 | 67.73 | 0.3431 | OHARA S-FPM2 | L4 | G2 |
| 09 | 54.624 | 0.20 | | | | | | |
| 10 | 51.978 | 9.76 | 1.68893 | 31.07 | 0.3142 | OHARA S-TIM28 | L5 | |
| 11 | −48.077 | 2.00 | 1.85026 | 32.27 | 0.3331 | OHARA S-LAH51 | L6 | |
| 12 | 42.896 | VARIABLE dB | | | | | | |
| 13 | −47.465 | 1.50 | 1.59522 | 67.73 | 0.3431 | OHARA S-FPM2 | L7 | G3 |
| 14 | 16.926 | 2.87 | 1.85026 | 32.27 | 0.3145 | OHARA S-LAH71 | L8 | |
| 15 | 30.040 | VARIABLE dC | | | | | | |
| 16 | ∞ | 1.00 | 1.51633 | 64.14 | | ADJUSTMENT FILTER | | ND |
| 17 | ∞ | 0.90 | | | | | | |
| 18 | DIAPHRAGM | 2.50 | | | | | | AD |
| 19* | 25.662 | 4.50 | 1.43875 | 94.94 | 0.3529 | OHARA S-FPL53 | L9 | G4 |
| 20 | −107.684 | 0.20 | | | | | | |
| 21 | 39.448 | 3.48 | 1.49700 | 81.54 | 0.3501 | OHARA S-FPL51 | L10 | |
| 22 | −244.335 | 0.20 | | | | | | |
| 23 | 30.534 | 4.06 | 1.49700 | 81.54 | 0.3501 | OHARA S-FPL51 | L11 | |
| 24 | −65.075 | 3.64 | 1.80610 | 40.93 | 0.3289 | OHARA S-LAH53 | L12 | |
| 25 | 19.436 | 4.53 | | | | | | |
| 26 | 385.080 | 1.50 | 1.48749 | 70.24 | 0.3633 | OHARA S-FSL5 | L13 | |
| 27 | 20.000 | 3.89 | 1.54814 | 45.78 | 0.3331 | OHARA S-TIL1 | L14 | |
| 28 | −99.699 | 4.081 | | | | | | |
| 29 | 17.333 | 3.88 | 1.49700 | 81.54 | 0.3501 | OHARA S-FPL51 | E1 | EX |
| 30 | −196.841 | 0.87 | | | | | | |
| 31 | 106.050 | 3.93 | 1.48749 | 70.24 | 0.3633 | OHARA S-FSL5 | E2 | |
| 32 | −46.918 | 4.82 | 1.69350 | 53.20 | 0.3455 | OHARA S-LAL13 | E3 | |
| 33 | 19.815 | 5.45 | | | | | | |
| 34 | −145.623 | 4.36 | 1.78472 | 25.68 | 0.3059 | OHARA S-TIH11 | E4 | |
| 35 | −6.064 | 1.50 | 1.83481 | 42.72 | 0.3314 | OHARA S-LAH55 | E5 | |
| 36 | 10.300 | 19.697 | | | | | | |
| 37 | ∞ | 3.50 | 1.51633 | 64.14 | | FILTER AND THE LIKE | | FG |
| 38 | ∞ | 1.000 | | | | | | |

In Table 22, the first lens group G1 to the fourth lens group G4 are completely the same as those illustrated in Table 19, and the extender lens group EX is arranged to be inserted between the fourth lens group G4 and the filter and the like FG. Thus, a diffraction surface in which "#" is represented to be attached to the surface number and an aspherical surface in which "*" is represented to be attached to the surface number are the same as those of the case illustrated in Table 19. In addition, the material of each lens is also represented in Table 22. These are similar in the other examples.

In other words, in Table 22, the third surface to which "#" is attached is a diffraction surface, and the parameters of the diffraction surface represented in Expression [21] are the same as those described with reference to Table 13 as follows.

Diffraction Surface: Third Surface $\lambda = 587.56$ (nm)

$C_2 = -2.07977 \times 10^{-5}$ $C_4 = 9.76351 \times 10^{-10}$

In addition, in Table 22, the nineteenth surface to which "*" is attached is a diffraction surface, and the parameters of the aspherical surface in Expression [22] are the same as those described with reference to Table 19 as follows.

Aspherical Surface: Nineteenth Surface $K = 0.0$ $A_4 = -7.21843 \times 10^{-6}$ $A_6 = -6.52396 \times 10^{-9}$ $A_8 = 4.67279 \times 10^{-12}$ In the extender-including state of this Example 4, the focal length f of the entire optical system, a variable gap dA between the first lens group G1 and the second lens group G2, a variable gap dB between the second lens group G2 and the third lens group G3, and a gap dC between the third lens group G3 and the adjustment filter ND at each of the wide angle end (short focus end), the intermediate focal length, and the telephoto end (long focus end) change in accordance with zooming as in the following Table 23, to be almost similar to Table 20. Here, substantially, differences between Table 23 and Table 20 are only the focal lengths f of the entire optical system at the wide angle end, the intermediate focal length and the telephoto end.

TABLE 23

VARIABLE GAP

| VARIABLE GAP | WIDE ANGLE END f = 34.04 | INTERMEDIATE FOCAL LENGTH f = 182.3 | TELEPHOTO END f = 972.8 |
|---|---|---|---|
| dA | 5.846 | 75.128 | 87.903 |
| dB | 65.173 | 6.100 | 47.276 |
| dC | 67.232 | 57.023 | 3.072 |

In the extender-including state of this Example 4, the focal length f of the entire optical system, the magnification of the second lens group G2, the magnification of the third lens group G3, the magnification of the fourth lens group G4, and the magnification of the extender lens group EX at each of the wide angle end, the intermediate focal length, and the telephoto end change in accordance with zooming as in the following Table 24.

TABLE 24

MAGNIFICATION OF EACH LENS GROUP

| | MAGNIFICATION | | |
|---|---|---|---|
| | WIDE ANGLE END f = 34.04 | INTERMEDIATE FOCAL LENGTH f = 182.3 | TELEPHOTO END f = 972.8 |
| SECOND LENS GROUP G2 | -0.847 | 11.221 | 3.093 |
| THIRD LENS GROUP G3 | 0.188 | -0.0758 | -1.469 |
| FOURTH LENS GROUP G4 | -0.749 | -0.749 | -0.749 |
| EXTENDER EX | 1.996 | 1.996 | 1.996 |

In this case, values corresponding to Conditional Expressions [4-2] and [13] are as follows, and each of Conditional Expression [4-2] and Conditional Expression [13] is satisfied.

<Conditional Expression Numerical Values>

$f_{TC}/f_{DOE} = 0.0405$ [4-2]:

$f_E/f_W = 1.02$ [13]:

In addition, FIGS. 30, 31, and 32 respectively illustrate aberration diagrams of the spherical aberration, the astigmatism, the distortion aberration, and the lateral aberration at each of the wide angle end, the intermediate focal length, and the telephoto end (long focus end) in the extender-including state of Example 4. In such aberration diagrams, a broken line of the spherical aberration diagram represents a sine condition. In addition, in the astigmatism diagram, a solid line represents the sagittal, and a broken line represents the meridional. These are similarly applied to the aberration diagrams of the other examples.

Fifth Embodiment

Next, an imaging apparatus according to a fifth embodiment of the present invention in which one of the zoom lenses according to the first to fourth embodiments of the present invention described above is employed as an imaging optical system will be described.

Example 5

The imaging apparatus according to the fifth embodiment of the present invention will be described with reference to FIG. 33.

The imaging apparatus illustrated in FIG. 33 includes one of the zoom lenses according to the first to fourth embodiments of the present invention described above as an imaging optical system.

The imaging apparatus includes: an imaging lens 101; an imaging device 102; a signal processor 103, a zoom controller 104; an extender controller 105; a focus controller 106; a diaphragm controller 107; and a filter controller 108.

In this case, the imaging lens 101 is configured by using any one of the zoom lenses according to the first to fourth embodiments of the present invention described above. Generally, as the imaging device 102, an area sensor is used, for example, by using a complementary metal oxide semiconductor (CMOS) image sensor, a charge coupled device (CCD) image sensor, or the like. The imaging device 102 converts a subject image that is captured by the imaging lens 101 into an electrical image signal. The signal processor 103 processes the image signal acquired by the imaging device 102 so as to be converted into digital image information. The zoom controller 104 performs zooming of the imaging lens 101 that is the zoom lens. The extender controller 105 controls operation, such as operation of inserting/detaching the extender lens group EX included in the imaging lens 101 to/from the optical path.

The focus controller 106 drives a lens group, which is included in the imaging lens 101, contributing to focusing, thereby performing focusing operation control for allowing the subject to be in-focus. The diaphragm controller 107 variably operates the opening diameter of the aperture diaphragm AD included in the imaging lens 101. The filter controller 108 performs switching control among filters FG such as a visible light cutoff filter and an infrared light cutoff filter included in the imaging lens 101.

The imaging apparatus includes the imaging lens 101 and the imaging device 102 such as an area sensor. The imaging apparatus performs photoelectric conversion of an imaging target formed on the imaging device 102 by the imaging lens 101, that is, the optical image of a subject, and reads out the converted electric signal as an image signal. Accordingly, the imaging apparatus, such as a monitoring video camera, can be realized by using, the zoom lens according to any one of the above-described embodiments of the present invention as the imaging lens 101 which is one example of the imaging optical system.

The image signal output from the imaging device 102 is processed by the signal processor 103 so as to be converted into digital information. For the digital image information converted by the signal processor 103, any further image processing may be performed by any other image processor. Additionally or alternatively, the digital image information may be recorded in any desired memory such as a semiconductor memory, or be transmitted to the outside through a communication device. In addition, an image during a capture process, or an image that is recorded in a semiconductor memory may be displayed on a display such as a monitor.

The imaging lens 101 that is a zoom lens is operated for zooming by the zoom controller 104, the extender lens group EX is operated to be inserted/detached to/from the imaging lens 101 by the extender controller 105, and the imaging lens 101 is operated to be in-focus by the focus controller 106. The F number can be controlled by changing the opening diameter of the aperture diaphragm AD by using the diaphragm controller 107. Furthermore, switching among an infrared light cutoff filter, a visible light cutoff filter, and the like may be operated by the filter controller 108.

In the imaging apparatus as described above, any one of the zoom lenses according to any one of the above-described embodiments may be used as the imaging lens 101. Accordingly, an imaging apparatus, which have small sizes and provide high image quality using an imaging device of two million pixels or more, responding to seamless imaging of a visible region to a near-infrared region can be realized.

In one example, there is provided a zoom lens including, a first lens group provided with a diffraction optical element and having positive refractive power, a second lens group having negative refractive power, a third lens group having negative refractive power, and a fourth lens group having positive refractive power, which are sequentially arranged from an object side to an image side. The second lens group and the third lens group are moved in accordance with zooming between a wide angle end and a telephoto end such that the second lens group is positioned to the object-most side at the wide angle end, and the third lens group is positioned to the image-most side at the telephoto end. At least one of the second lens group and the third lens group includes a negative lens satisfying the following conditional expressions:

$$1.50 < nd < 1.75 \quad [1]$$

$$60.0 < vd < 75.0 \quad [2]$$

$$\theta_{C,A'} - 0.0015 \times vd < 0.2550 \quad [3]$$

in which nd denotes refractive index of a material composing the negative lens, vd denotes the Abbe number of the material composing the negative lens, and $\theta_{C,A'}$ denotes partial dispersion ratio of the material composing the negative lens. The partial dispersion ratio $\theta_{C,A'}$ is represented as $\theta_{C,A'} = (n_C - n_{A'})/(n_F - n_C)$ with the refractive indices of the material composing the negative lens for an F line, a C line, and an A' line being denoted by $n_F$, $n_C$, and $n_{A'}$.

Accordingly, the zoom lens can be configured to have a zoom ratio of over 25 times, a small number of constituent lenses, the chromatic aberration of the visible region to the near-infrared region being sufficiently corrected, and resolving power corresponding to an imaging device of at least two million pixels or more.

In one example, there is provided a zoom lens including, a first lens group provided with a diffraction optical element and having positive refractive power, a second lens group having negative refractive power, a third lens group having negative refractive power, and a fourth lens group having positive refractive power, which are sequentially arranged from an object side to an image side. The zoom lens further includes an extender lens group causing the focal length of the entire system to transit to the longer side without changing distances between each lens group of the first lens group to the fourth lens group, having an image surface being arranged to be insertable/detachable to/from the image side of the fourth lens group. The second lens group and the third lens group are moved in accordance with zooming between a wide angle end and a telephoto end such that the second lens group is positioned to the object-most side at the wide angle end, and the third lens group is positioned to the image-most side at the telephoto end. At least one of the second lens group and the third lens group includes a negative lens satisfying the following conditional expressions [1], [2], and [3].

$$1.50 < nd < 1.75; \quad [1]$$

$$60.0 < vd < 75.0; \text{ and} \quad [2]$$

$$\theta_{C,A'} - 0.0015 \times vd < 0.2550, \quad [3]$$

in which nd denotes refractive index of a material composing the negative lens, vd denotes the Abbe number of the material composing the negative lens, and $\theta_{C,A'}$ denotes the partial dispersion ratio of the material composing the negative lens, and the partial dispersion ratio $\theta_{C,A'}$ is represented as $\theta_{C,A'} = (n_C - n_{A'})/(n_F - n_C)$ with the refractive indices of the material composing the negative lens for an F line, a C line, and an A' line being denoted by $n_F$, $n_C$, and $n_{A'}$.

Accordingly, the zoom lens can be configured to have a zoom ratio of over 25 times, an extender of about two time built therein, a small number of constituent lenses, the chromatic aberration of the visible region to the near-infrared region being sufficiently corrected, and resolving power corresponding to an imaging device of at least two million pixels or more.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

For example, the imaging apparatus having the zoom lens of any one of the above-described embodiments as an imaging optical system includes a video camera, a television camera, etc., which may be used for monitoring, for example.

What is claimed is:

1. A zoom lens comprising:
a first lens group provided with a diffraction optical element and having positive refractive power, a second lens group having negative refractive power, a third lens group having negative refractive power, and a fourth lens group having positive refractive power, which are sequentially arranged, from an object side to an image side,
wherein the second lens group and the third lens group are moved in accordance with zooming between a wide angle end and a telephoto end such that the second lens group is positioned to the object-most side at the wide angle end, and the third lens group is positioned to the image-most side at the telephoto end,
wherein at least one of the second lens group and the third lens group includes a negative lens satisfying the following conditional expressions:

$$1.50 < nd < 1.75; \quad [1]$$

$$60.0 < vd < 75.0; \text{ and} \quad [2]$$

$$\theta_{C,A'} - 0.0015 \times vd < 0.2550, \quad [3]$$

in which nd denotes the refractive index of a material composing the negative lens, vd denotes the Abbe number of the material composing the negative lens, and $\theta_{C,A'}$ denotes the partial dispersion ratio of the material composing the negative lens, and the partial dispersion ratio $\theta_{C,A'}$ is represented as $\theta_{C,A'} = (n_C - n_{A'})/(n_F - n_C)$ with the refractive indices of the material composing the negative lens for an F line, a C line, and an A' line being denoted by $n_F$, $n_C$, and $n_{A'}$.

2. The zoom lens according to claim 1, wherein the focal length $f_T$ of the entire zoom lens at the telephoto end satisfies the following conditional expression:

$$0.01 < f_T/f_{DOE} < 0.05, \quad [4-1]$$

in which $f_{DOE}$ denotes the focal length of a diffraction part of the diffraction optical element.

3. The zoom lens according to claim 1, wherein the first lens group includes one or more positive lenses, and an average value $v_{1GP}$ of Abbe numbers of materials of the positive lenses included in the first lens group satisfies the conditional expression:

$$75 < v_{1GP} < 96. \quad [5]$$

4. The zoom lens according to claim 1, wherein negative lenses are included in both the second lens group and the third lens group, the negative lenses satisfying Conditional Expressions [1] to [3].

5. The zoom lens according to claim 1, wherein the difference in gap $D_{34W} - D_{34T}$ satisfies the conditional expression:

$$2.5 < (D_{34W} - D_{34T})/f_w < 6.0, \quad [6]$$

in which, $D_{34W}$ denotes a gap between the third lens group and the fourth lens group at the wide angle end, $D_{34T}$ denotes a gap between the third lens group and the fourth lens group at the telephoto end, and $f_w$ denotes the focal length of the entire zoom lens at the wide angle end.

6. The zoom lens according to claim 1, wherein a state in which combined refractive power of the first lens group and the second lens group becomes zero is included during zooming from the wide angle end to the telephoto end.

7. The zoom lens according to claim 1, wherein the ratio $L_4/T_{4F-I}$ satisfies the following conditional expression:

$$0.2 < L_4/T_{4F-I} < 0.5 \quad [7]$$

in which $L_4$ denotes a distance from an object-most side surface to an image-most side surface of the fourth lens group along an optical axis, and
$T_{4F-I}$ denotes an air-equivalent length, which is a distance from the object-most side surface of the fourth lens group to the image surface along the optical axis, in a case where an optical element having no refractive power is included on the image side of the fourth lens group, being acquired by assuming the optical element not to be present.

8. The zoom lens according to claim 1, wherein the second lens group is configured by three or less lenses, and the third lens group is configured by two or less lenses.

9. The zoom lens according to claim 1, wherein
the first lens group includes, sequentially from the object side:
a negative meniscus lens having a concave surface directed toward the image side;
a first positive lens bonded to the negative meniscus lens; and
a second positive lens having a convex surface, which has refractive power stronger than the image side, directed toward the object side, and
the diffraction surface of the diffraction optical element is formed on a bonded interface between the negative meniscus lens and the first positive lens.

10. The zoom lens according to claim 1, wherein the first lens group and the fourth lens group are fixed instead of moving with respect to the image surface at the time of zooming.

11. A zoom lens comprising:
a first lens group provided with a diffraction optical element and having positive refractive power, a second lens group having negative refractive power, a third lens group having negative refractive power, and a fourth lens group having positive refractive power, which are sequentially arranged from an object side to an image side; and
an extender lens group having an image surface being arranged to be insertable or detachable to or from the image side of the fourth lens group, and to cause the focal length of the entire zoom lens to transit to the longer side without changing distances between each lens group of the first lens group to the fourth lens group,
wherein the second lens group and the third lens group are moved in accordance with zooming between a wide angle end and a telephoto end such that the second lens group is positioned to the object-most side at the wide angle end, and the third lens group is positioned to the image-most side at the telephoto end, wherein at least one of the second lens group and the third lens group includes a negative lens satisfying the following conditional expressions:

$$1.50 < nd < 1.75; \quad [1]$$

$$60.0 < vd < 75.0; \text{ and} \quad [2]$$

$$\theta_{C,A'} - 0.0015 \times vd < 0.2550, \quad [3]$$

in which nd denotes the refractive index of a material composing the negative lens, vd denotes the Abbe number of the material composing the negative lens, and $\theta_{C,A'}$ denotes the partial dispersion ratio of the material composing the negative lens, and the partial dispersion ratio $\theta_{C,A'}$ is represented as $\theta_{C,A'} = (n_C - n_{A'})/(n_F - n_C)$ with the refractive indices of the material composing the negative lens for an F line, a C line, and an A' line being denoted by $n_F$, $n_C$, and $n_{A'}$.

12. The zoom lens according to claim 11, wherein the focal length $f_{TC}$ of the entire zoom lens at the telephoto end in a state, in which the extender lens group is inserted, satisfies the conditional expression:

$$0.02 < f_{TC}/f_{DOE} < 0.10, \quad [4\text{-}2]$$

in which $f_{DOE}$ denotes the focal length of a diffraction part of the diffraction optical element.

13. The zoom lens according to claim 11, wherein the first lens group includes one or more positive lenses, and an average value $v_{1GP}$ of Abbe numbers of materials of the positive lenses included in the first lens group satisfies the conditional expression:

$$75 < v_{1GP} < 96. \quad [5]$$

14. The zoom lens according to claim 11, wherein negative lenses are included in both the second lens group and the third lens group, the negative lenses satisfying Conditional Expressions [1] to [3].

15. The zoom lens according to claim 11, wherein the difference in gap $D_{34W} - D_{34T}$ satisfies the conditional expression:

$$2.5 < (D_{34W} - D_{34T})/f_w < 6.0, \quad [6]$$

in which, $D_{34W}$ denotes a gap between the third lens group and the fourth lens group at the wide angle end, $D_{34T}$ denotes a gap between the third lens group and the fourth lens group at the telephoto end, and $f_w$ denotes the focal length of the entire zoom lens at the wide angle end.

16. The zoom lens according to claim 11, wherein a state in which combined refractive power of the first lens group and the second lens group becomes zero is included during zooming from the wide angle end to the telephoto end.

17. The zoom lens according to claim 11, wherein the ratio $L_4/T_{4F\text{-}I}$ satisfies the following conditional expression:

$$0.2 < L_4/T_{4F\text{-}I} < 0.5 \quad [7]$$

in which $L_4$ denotes a distance from an object-most side surface to an image-most side surface of the fourth lens group along an optical axis, and $T_{4F\text{-}I}$ denotes an air-equivalent length, which is a distance from the object-most side surface of the fourth lens group to the image surface along the optical axis, in a case where an optical element having no refractive power is included on the image side of the fourth lens group, being acquired by assuming the optical element not to be present.

18. The zoom lens according to claim 11, wherein the second lens group is configured by three or less lenses, and the third lens group is configured by two or less lenses.

19. The zoom lens according to claim 11, wherein
the first lens group includes, sequentially from the object side:
a negative meniscus lens having a concave surface directed toward the image side;
a first positive lens bonded to the negative meniscus lens; and
a second positive lens having a convex surface, which has refractive power stronger than the image side, directed toward the object side, and
the diffraction surface of the diffraction optical element is formed on a bonded interface between the negative meniscus lens and the first positive lens.

20. The zoom lens according to claim 11, wherein the first lens group and the fourth lens group are fixed instead of moving with respect to the image surface at the time of zooming.

* * * * *